(12) United States Patent
Bill

(10) Patent No.: US 7,921,369 B2
(45) Date of Patent: Apr. 5, 2011

(54) MOOD-BASED ORGANIZATION AND DISPLAY OF INSTANT MESSENGER BUDDY LISTS

(75) Inventor: David S. Bill, San Francisco, CA (US)

(73) Assignee: AOL Inc., Dulles, VA (US)

(*) Notice: Subject to any disclaimer, the term of this patent is extended or adjusted under 35 U.S.C. 154(b) by 1489 days.

(21) Appl. No.: 11/321,063

(22) Filed: Dec. 30, 2005

(65) Prior Publication Data

US 2006/0170945 A1   Aug. 3, 2006

Related U.S. Application Data

(63) Continuation-in-part of application No. 11/025,881, filed on Dec. 30, 2004, now Pat. No. 7,764,311.

(51) Int. Cl.
*G06F 3/00* (2006.01)
*G06F 3/048* (2006.01)
*G06F 15/16* (2006.01)

(52) U.S. Cl. ......... 715/753; 715/756; 715/810; 709/206

(58) Field of Classification Search .................. 709/206; 715/753, 758, 810

See application file for complete search history.

(56) References Cited

U.S. PATENT DOCUMENTS

| | | |
|---|---|---|
| 5,086,394 A | 2/1992 | Shapira |
| 5,276,905 A | 1/1994 | Hurst et al. |
| 5,327,486 A | 7/1994 | Wolff et al. |
| 5,533,110 A | 7/1996 | Pinard et al. |
| 5,548,637 A | 8/1996 | Heller et al. |
| 5,557,659 A | 9/1996 | Hyde-Thomson |
| 5,608,786 A | 3/1997 | Gordon |
| 5,721,906 A | 2/1998 | Siefert |
| 5,742,905 A | 4/1998 | Pepe et al. |
| 5,774,670 A | 6/1998 | Montulli |
| 5,793,365 A | 8/1998 | Tang et al. |
| 5,802,470 A | 9/1998 | Gaulke et al. |

(Continued)

FOREIGN PATENT DOCUMENTS

EP   0862304 A2   9/1998

(Continued)

OTHER PUBLICATIONS

"AOL technology: turning complicated things into engaging services", 1996 Annual Report, 22 pages.

(Continued)

*Primary Examiner* — Tadeese Hailu
*Assistant Examiner* — Nicholas S Ulrich
(74) *Attorney, Agent, or Firm* — Finnegan, Henderson, Farabow, Garrett & Dunner LLP

(57) ABSTRACT

A mood state may be modeled using mood information for a content selection (e.g., a digitally-encoded song) and/or by using mood information determined by how a user is interacting with a media player. For example, a playlist engine on a host may determine that a particular song is associated with an uplifting mood, thus determining that a user who has selected that particular song currently is in an uplifting mood, and correspondingly may select additional songs and advertisements consistent with, or responsive to, the uplifting mood. Mood information also may be used to present a mood state of users (e.g., co-users) in a network for display in a graphical user interface (GUI). For example, a user's screen name appearing in an America Online (AOL) Instant Messenger's Buddy List may indicate a determined user's mood, such as "happy", "sad", "silly", or "angry."

20 Claims, 30 Drawing Sheets

U.S. PATENT DOCUMENTS

| | | |
|---|---|---|
| 5,850,594 A | 12/1998 | Cannon et al. |
| 5,867,162 A | 2/1999 | O'Leary et al. |
| 5,870,744 A | 2/1999 | Sprague |
| 5,872,521 A | 2/1999 | Lopatukin et al. |
| 5,878,219 A | 3/1999 | Vance, Jr. et al. |
| 5,893,091 A | 4/1999 | Hunt et al. |
| 5,893,099 A | 4/1999 | Schreiber et al. |
| 5,920,692 A | 7/1999 | Nguyen et al. |
| 5,940,488 A | 8/1999 | DeGrazia et al. |
| 5,948,058 A | 9/1999 | Kudoh et al. |
| 5,951,643 A | 9/1999 | Shelton et al. |
| 5,951,652 A | 9/1999 | Ingrassia, Jr. et al. |
| 5,954,798 A | 9/1999 | Shelton et al. |
| 5,960,173 A | 9/1999 | Tang et al. |
| 5,987,113 A | 11/1999 | James |
| 5,991,791 A | 11/1999 | Siefert |
| 6,009,413 A | 12/1999 | Webber et al. |
| 6,012,051 A | 1/2000 | Sammon, Jr. et al. |
| 6,014,638 A | 1/2000 | Burge et al. |
| 6,026,403 A | 2/2000 | Siefert |
| 6,026,429 A | 2/2000 | Jones et al. |
| 6,065,047 A | 5/2000 | Carpenter et al. |
| 6,073,138 A | 6/2000 | de l'Etraz et al. |
| 6,081,830 A | 6/2000 | Schindler |
| 6,085,223 A | 7/2000 | Carino, Jr. et al. |
| 6,088,435 A | 7/2000 | Barber et al. |
| 6,151,584 A | 11/2000 | Papierniak et al. |
| 6,161,130 A | 12/2000 | Horvitz et al. |
| 6,166,730 A | 12/2000 | Goode et al. |
| 6,175,831 B1 | 1/2001 | Weinreich et al. |
| 6,199,103 B1 | 3/2001 | Sakaguchi et al. |
| 6,260,148 B1 | 7/2001 | Aggarwal et al. |
| 6,269,369 B1 | 7/2001 | Robertson |
| 6,301,609 B1 | 10/2001 | Aravamudan et al. |
| 6,324,541 B1 | 11/2001 | de l'Etraz et al. |
| 6,330,590 B1 | 12/2001 | Cotten |
| 6,347,332 B1 | 2/2002 | Malet et al. |
| 6,359,622 B1* | 3/2002 | Hayes-Roth ............. 345/474 |
| 6,374,290 B1 | 4/2002 | Scharber et al. |
| 6,389,127 B1 | 5/2002 | Vardi et al. |
| 6,389,372 B1 | 5/2002 | Glance et al. |
| 6,404,438 B1* | 6/2002 | Hatlelid et al. ............ 345/473 |
| 6,415,318 B1 | 7/2002 | Aggarwal et al. |
| 6,421,709 B1 | 7/2002 | McCormick et al. |
| 6,425,012 B1 | 7/2002 | Trovato et al. |
| 6,430,604 B1 | 8/2002 | Ogle et al. |
| 6,446,112 B1 | 9/2002 | Bunney et al. |
| 6,449,344 B1 | 9/2002 | Goldfinger et al. |
| 6,507,866 B1 | 1/2003 | Barchi |
| 6,525,747 B1 | 2/2003 | Bezos |
| 6,535,586 B1 | 3/2003 | Cloutier et al. |
| 6,549,937 B1 | 4/2003 | Auerbach et al. |
| 6,571,234 B1 | 5/2003 | Knight et al. |
| 6,584,220 B2 | 6/2003 | Lantrip et al. |
| 6,615,241 B1 | 9/2003 | Miller et al. |
| 6,640,230 B1 | 10/2003 | Alexander et al. |
| 6,677,968 B1 | 1/2004 | Appelman |
| 6,731,308 B1 | 5/2004 | Tang et al. |
| 6,750,881 B1 | 6/2004 | Appelman |
| 6,771,991 B1* | 8/2004 | Gupta et al. .................. 455/566 |
| 6,788,769 B1 | 9/2004 | Waites |
| 6,800,031 B2 | 10/2004 | Di Cesare |
| 6,912,563 B1 | 6/2005 | Parker et al. |
| 6,914,564 B2 | 7/2005 | Appelman et al. |
| 6,933,432 B2 | 8/2005 | Shteyn et al. |
| 6,993,532 B1 | 1/2006 | Platt et al. |
| 7,234,117 B2* | 6/2007 | Zaner et al. ................... 715/758 |
| 7,359,688 B2* | 4/2008 | Seo et al. .................. 455/218 |
| 7,463,897 B2* | 12/2008 | Kock .......................... 455/466 |
| 7,496,623 B2* | 2/2009 | Szeto et al. ................. 709/203 |
| 7,685,237 B1* | 3/2010 | Weaver et al. ............... 709/205 |
| 7,707,520 B2* | 4/2010 | Ashtekar et al. ............ 715/855 |
| 2001/0005861 A1 | 6/2001 | Mousseau et al. |
| 2002/0015061 A1 | 2/2002 | Maguire |
| 2002/0021307 A1 | 2/2002 | Glenn et al. |
| 2002/0042816 A1 | 4/2002 | Bae |
| 2002/0065894 A1 | 5/2002 | Dalal et al. |
| 2002/0083060 A1 | 6/2002 | Wang et al. |
| 2002/0083136 A1 | 6/2002 | Whitten, II |
| 2002/0091667 A1 | 7/2002 | Jaipuria et al. |
| 2002/0103801 A1 | 8/2002 | Lysons |
| 2002/0116463 A1 | 8/2002 | Hart |
| 2002/0116641 A1 | 8/2002 | Mastrianni |
| 2002/0130898 A1 | 9/2002 | Ogawa et al. |
| 2002/0133369 A1 | 9/2002 | Johnson |
| 2002/0175953 A1 | 11/2002 | Lin |
| 2002/0181703 A1 | 12/2002 | Logan et al. |
| 2002/0184089 A1 | 12/2002 | Tsou et al. |
| 2002/0188838 A1 | 12/2002 | Welder |
| 2002/0199095 A1 | 12/2002 | Bandini et al. |
| 2003/0004855 A1 | 1/2003 | Dutta et al. |
| 2003/0004872 A1 | 1/2003 | Gardi et al. |
| 2003/0014407 A1 | 1/2003 | Blatter et al. |
| 2003/0023875 A1 | 1/2003 | Hursey et al. |
| 2003/0028524 A1 | 2/2003 | Keskar et al. |
| 2003/0028595 A1 | 2/2003 | Vogt et al. |
| 2003/0033420 A1 | 2/2003 | Eyal et al. |
| 2003/0037112 A1 | 2/2003 | Fitzpatrick et al. |
| 2003/0040904 A1 | 2/2003 | Whitman et al. |
| 2003/0043201 A1 | 3/2003 | Abdelhadi et al. |
| 2003/0050916 A1 | 3/2003 | Ortega et al. |
| 2003/0060728 A1 | 3/2003 | Mandigo |
| 2003/0065721 A1 | 4/2003 | Roskind |
| 2003/0065788 A1* | 4/2003 | Salomaki ...................... 709/227 |
| 2003/0078919 A1 | 4/2003 | Suzuki et al. |
| 2003/0105822 A1 | 6/2003 | Gusler et al. |
| 2003/0108241 A1 | 6/2003 | Colmenarez et al. |
| 2003/0131061 A1 | 7/2003 | Newton et al. |
| 2003/0140103 A1 | 7/2003 | Szeto et al. |
| 2003/0164844 A1 | 9/2003 | Kravitz et al. |
| 2003/0167324 A1 | 9/2003 | Farnham et al. |
| 2003/0191816 A1 | 10/2003 | Landress et al. |
| 2003/0196205 A1 | 10/2003 | Chiu et al. |
| 2003/0210265 A1* | 11/2003 | Haimberg ..................... 345/758 |
| 2003/0221541 A1 | 12/2003 | Platt |
| 2003/0236582 A1 | 12/2003 | Zamir et al. |
| 2004/0002310 A1 | 1/2004 | Herley et al. |
| 2004/0095359 A1 | 5/2004 | Simon et al. |
| 2004/0117239 A1 | 6/2004 | Mittal et al. |
| 2004/0117443 A1 | 6/2004 | Barsness |
| 2004/0122810 A1 | 6/2004 | Mayer |
| 2004/0179039 A1* | 9/2004 | Blattner et al. ............... 345/758 |
| 2004/0181401 A1 | 9/2004 | Pachet et al. |
| 2004/0185885 A1* | 9/2004 | Kock ............................ 455/466 |
| 2004/0189691 A1 | 9/2004 | Jojic et al. |
| 2004/0215721 A1 | 10/2004 | Szeto et al. |
| 2004/0235531 A1* | 11/2004 | Anzawa et al. .............. 455/563 |
| 2005/0050143 A1 | 3/2005 | Guster et al. |
| 2005/0060377 A1* | 3/2005 | Lo et al. ....................... 709/206 |
| 2005/0076241 A1 | 4/2005 | Appelman |
| 2005/0114229 A1 | 5/2005 | Ackley et al. |
| 2005/0216529 A1 | 9/2005 | Ashtekar et al. |
| 2005/0221807 A1* | 10/2005 | Karlsson et al. ............. 455/418 |
| 2005/0223328 A1* | 10/2005 | Ashtekar et al. ............. 715/706 |
| 2005/0273496 A1* | 12/2005 | Jean et al. .................... 709/206 |
| 2006/0098027 A1* | 5/2006 | Rice et al. .................... 345/619 |
| 2007/0064911 A1 | 3/2007 | Bedingfield, Sr. et al. |

FOREIGN PATENT DOCUMENTS

| | | |
|---|---|---|
| EP | 1176840 A1 | 1/2002 |
| GB | 2357932 A | 7/2001 |
| GB | 2368747 | 5/2002 |
| WO | WO 97/10558 | 3/1997 |
| WO | WO 97/46955 | 12/1997 |
| WO | WO 98/16045 | 4/1998 |
| WO | WO 99/08434 | 2/1999 |
| WO | WO 00/79396 | 12/2000 |
| WO | 01/06748 | 1/2001 |
| WO | WO 01/67787 | 9/2001 |
| WO | 02/03216 | 1/2002 |
| WO | 02/073886 | 9/2002 |

OTHER PUBLICATIONS

"YAHOO! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.
America Online Inc., "New AIM 4.7", Sep. 27, 2001, Internet: http://aim.aol.com.
America Online Inc., "AOL Instant Messenger", Aug. 29, 2000, Internet: www.aol.com/aim/.
CNET Networks Inc., "PopUp Killer", Sep. 13, 2001, Internet: download.cnet.com/downloads/0-10059-100-6932612.html.
Steven Michael Pierce "Scorebot: Theory and Design of an Automated Film Scoring Application", thesis submitted in accordance with the requirement for the degree of Master of Arts, The University of Leeds, Department of Music, Aug. 2000.
WebmasterWorld.com Inc., "HTML and Browsers", Mar. 5, 2001, Internet: www.webmasterworld.com/forum21/367.htm.
Office Action of U.S. Appl. No. 10/448,316, dated Dec. 15, 2005, (92 pages).
Office Action of U.S. Appl. No. 10/448,316, dated May 10, 2006, (94 pages).
Eschenburg, Wo laufen sie denn?, Oct. 26, 1998, pp. 92-95.
Kohda et al., IMPP: A New Instant Messaging Standard and Its Impact on Internet Business, Dec. 2000, Fujitsu Sci. Tech. J., 36, 2, pp. 147-153.
"What's new about exchanging information over the Internet," Outlook 2000 SR-1 (9.0.0.4527) Help File, on or before Aug. 10, 2001, p. 1.
"About Internet directory services," Outlook 2000 SR-1 (9.0.0. 4527) Help File, or or before Aug. 10, 2001, p. 1.
"Set up LDAP directory services," Outlook 2000 SR-1 (i.0.0. 4527) Help File, on or before Aug. 10, 2001, p. 1.
"Look up contact information from an item," Outlook 2000 SR-1 (9.0.0. 4527) Help File, on or before Aug. 10, 2001, p. 1.
J.C. Cannon, "Design Guide for Directory-Enabled Applications," [online], Apr. 2001 [retrieved on 2003]. Retrieved from the Internet http://msdn.microsoft.com/library/enus/dnactdir/html/BuildingADApps.asp?frame=true, pp. 1-18.
Microsoft Corporation, "Using ADSI, LDAP, and Network Management Functions With Active Directory," [online], Feb. 2002 [retrieved on May 13, 2003]. Retrieved from the Internet http://msdn.microsoft.com/library/enus/dnactdir/html/BuildingADApps.asp?frame=true, pp. 1-9.
Microsoft Corporation, "Comparing Microsoft Active Directory to Novell's NDS," [online], Sep. 1998 [retrieved on May 13, 2003]. Retrieved from the Internet http://msdn.microsoft.-com/library/enus/dnactdir/html/msdn_activedirvsnds.asp?frame=true, pp. 1-17.
Microsoft Corporation, "Active Directory Services Interface in the Microsoft Exchange 5.5 Environment," [online], Nov. 1997 [retrieved on May 13, 2003]. Retrieved from the Internet http://msdn.microsoft.com/library/enus/dnactdir/html/msdn_adsiexch.asp?frame=true, pp. 1-12.
"Active Directory Service Overview," [online], Nov. 30, 2001 [retrieved on May 13, 2003]. Retrieved from the Internet http://www.microsoft.com/windows2000/server/evaluation/business/-addatasheet.asp, pp. 105.
"Integrating Microsoft Metadirectory Services and Active Directory," [online], Aug. 31, 2000 [retrieved on May 13, 2003]. Retrieved from the Internet http://www.microsoft.com/windows2000/-server/evaluation/business/adwin2k.asp, p. 1.
"Benefits of Active Directory in a Windows 2000 Environment," [online], Sep. 20, 2001 [retrieved on May 13, 2003]. Retrieved from the Internet http://www.microsoft.com/windows2000/-server/evaluation/business/adwin2k.asp, p. 1-9.
"Active Directory," [online], retrieved on May 13, 2003]. Retrieved from the Internet http://www.microsoft.com/windows2000/technologies/directory/AD/default.asp, pp. 1-13.
Microsoft Corporation, "Introduction to Active Directory Application Mode," Microsoft Windows Server 2003, Aug. 2002, pp. 1-13.
"Active Directory Features," [online], Jun. 15, 1999 [retrieved on May 13, 2003]. Retrieved from the Internet http://www.microsoft.com/windows2000/server/evaluation/features/adlist.asp, pp. 1-4.
"Windows 2000 Directory Services," [online], [retrieved on May 13, 2003]. Retrieved from the Internet http://www.microsoft.com/windows2000/technologies/directory/default.asp, pp. 1-2.
"Directory Integration Can Lower Total Cost of Ownership and Increase Application Functionality," [online], Jul. 27, 1998 [retrieved on May 13, 2003]. Retrieved from the Internet http://www.microsoft.com/presspass/press/1998/Jul98/ActivDPR.asp, pp. 1 of 4.
William R. Stanek, Microsoft Windows 2000 Administrator's Pocket Consultant [online]. Microsoft Corporation, 1999 [retrieved on May 8, 2003]. Retrieved from the Internet <http://www.microsoft.-com/technet/prodtechnol/ad/windows2000/evaluate/05w2kada.asp?fr...>, pp. 1-6.
"Enterprise Identity Management with Windows 2000 and Active Directory," [online], 1999 [retrieved on May 13, 2003]. Retrieved from the Internet <http://www.microsoft.com/technet/prodtechnol/ad/windows2000/evaluate/w2keims.asp?fra...>, pp. 1-16.
William R. Stanek, Microsoft Windows 2000 Administrator's Pocket Consultant [online]. Microsoft Corporation, 1999 [retrieved on May 8, 2003}. Retrieved from the Internet <http://www.microsoft.com/technet/prodtechnol/ad/windows2000/evaluate/05w2kadb.asp?fra...>, pp. 1-10.
"Integrating Applications with Windows 2000 and Active Directory," [online], Oct. 2000 [retrieved on May 8, 2003]. Retrieved from the Internet <http://www.microsoft.com/technet/- prodtechnol/ad/windows2000/evaluate/adappstr.asp?fra...>, pp. 1-12.
"Part I: Active Directory Operations," Active Directory Operations Guide, Microsoft Corporation, Microsoft Windows 2000, Version 1.5, pp. 1-187.
"Part II: Tasks and Procedures Appendices," Active Directory Operations Guide, Microsoft Corporation, Microsoft Windows 2000, Version 1.5, pp. 1-131.
"The LP Wireless Messenger", Messenger Documentation, http://www.lpwireless.com/messengerhelp.htm, pp. 1-7 (Nov. 22, 2002).
Viegas et al., "Digital Artifacts for Remembering and Storytelling: PostHistory and Social Network Fragments." Retrieved from the World Wide Web: http://web.media.mit.edu/~fviegas/papers/posthistory_snf.pdf, 10 total pages, 2004.
"Icq.anywhere, Email Features—Email Center—ICQ.com." Retrieved Apr. 29, 2004 from the World Wide Web: http://www.icq.com/email/popular-features.html, pp. 1-5.
"Trillian Discussion Forums—HOWTO: Import ICQ 2003a Contact List." Retrieved Apr. 29, 2004 from the World Wide Web: http://trillian.cc/forums/showthread.php?s+&threadid=36475, pp. 1-2.
"Lotus Instant Messaging Everyplace FAQ." Retrieved Apr. 29, 2004 from the World Wide Web: http://www.lotus.com/products/product4.nsf/wdocs/249c6f083166cd3e85256d7300714407, pp. 1-3.
"RIM Road: Software: Internet & Network: Webmessenger RIM J2ME/Instant Messaging." Retrieved Apr. 29, 2004 from the World Wide Web: http://www.rimroad.com/software/rim1/Webmessenger-RIM-J2ME-Instant-Messaging-20, pp. 1-4.
"CrushParty.com: Help," retrieved Jun. 12, 2002 from the World Wide Web: http://www.crushparty.com/help.jsp, 3 pages.
"BestCalls.com Announces the BestCalls Technology Index," Business Wire, Jun. 30, 1999, Business Wire, p. 1.
"A Reputation System for Peer-to-Peer Networks," Gupta et al., Jun. 1-3, 2003, NOSSDAV'03, Monterey, California, pp. 144-152.
"Socialware: Multiagent Systems for Supporting Network Communities," Hattori et al., Mar. 1999, Association for Computing Machinery, Communications of the ACM, vol. 42, Issue 3, pp. 55ff.
"Finding Others Online: Reputation Systems for Social Online Spaces," Jensen et al., Apr. 20-25, 2002, CHI, Minneapolis, Minnesota, vol. 4, Issue 1, pp. 447-454.
"SWF Seeks Attractive Head Shot; To Stand Out, Online Daters Pay for Professional Photos; Cropping out the Ex-Wife," Leiber, Nov. 19, 2003, The Wall Street Journal, p. D.1.
"Reputation Systems," Resnick et al., Dec. 2000, Communications of the ACM, vol. 43, No. 12, pp. 45-48.
"Business at Cyberspeed; Brainstorm Becomes Quick Internet Hit," Walker, Jan. 24, 1999, The Washington Post, p. A.01 (4 total pages).
"Hottie or Nottie? Web Site Voters Let You Know Whether You Sizzle or Fizzle," Marino, Jul. 11, 2001, Florida Times Union, p. C.1. (2 total pages).

"Technology Journal—Are You Satisfied? EBay's Battle Against Fraud Rests Primarily on a Simple Concept: Customer Feedback," Wingfield, Sep. 23, 2002, Asian Wall Street Journal, p. T.8, (4 total pages).

"PieSpy—Inferring and Visualizing Social Network on IRC," PieSpy Social Network Bot, reprinted from http://lister.linux-srv.anlx.net/piespy printed on Mar. 11, 2004 (18 pages).

"Instant Messaging for Gamers," PC Gamer, May 2004, vol. 11, No. 5, p. 28.

"Degrees of Separation Email Spam Protection," Halfbakery: Degrees of Separation Email Spam Protection, reprinted from http://halfbakery.com/idea/Degrees_20of_20Separation_20Email_20Spam_20Protecti . . . printed on Mar. 1, 2004 (3 pages).

"Spoke Builds on Social Networking Patent Portfolio," Spoke Builds on Social Networking Patent Portfolio, reprinted from http://www.internetnews.com/ent-news/print.php/3073621 printed on Nov. 5, 2004 (3 pages).

"Idea for Online Networking Brings Two Entrepreneurs Together," Patents: Idea for Online Networking Brings Two Entrepreneurs Together, reprinted from http://www.nytimes.com/2003/12/01/technology/01patt.html?adxnnl+0&athunnlx=107029 . . . , printed on Nov. 5, 2004 (3 pages).

"Social Sites Clicking With Investors," Washingtonpost.com: Social Sites Clicking With Investors, reprinted from http://www.washingtonpost.com/ac2/wp-dyn/A32066-2003Nov12?language=printer printed on Nov. 5, 2004.

"Welcome to Huminity World of Connections," Huminity-Home, reprinted from http://web.archive.org/web/20030228131435/www.huminity.com/default.php?internationa... printed on Nov. 5, 2004 (available on Feb. 2, 2003) (1 page).

"The first Social Software . . . a true Social Adventure," Huminity-Social Networking, Chat Software, Create Personal Free Blogs and My Group . . . , reprinted from http://www.huminity.com/ printed on Nov. 5, 2004 (2 pages).

"Plaxo-Update Your Address Book," Plaxo Contact Networks, reprinted from http://web.archive.org/web/20030218233638/http://www.plaxo.com/ printed on Nov. 5, 2004 (available on Feb. 18, 2003) (1 page).

"plaxo," Plaxo, reprinted from http://web.archive.org/web/20041105072256/http://www.plaxo.com/ printed on Nov. 5, 2004 (available on Feb. 14, 2004) (2 pages).

"A Countermeasure to Duplicate-detecting Anti-spam Techniques," Robert J. Hall, AT&T Labs Technical Report 99.9.1, 1999, Abst. and pp. 1-26.

"SVM-based Filtering of E-mail Spam with Content-specific Misclassification Costs," Aleksander Kolcz et al., *TextDM'2001* (*IEEE ICDM-2001 Workshop on Text Mining*), San Jose, CA, 2001, pp. 1-14.

"Announce: Implementation of E-mail Spam Proposal," Maurice L. Marvin, news.admin.net-abuse.misc, Aug. 3, 1996, 2 pages.

"Technical Solutions for Controlling Spam," Shane Hird, Proceedings of AUUG2002, Melbourne, Sep. 4-6, 2002, 17 pages.

"Support Vector Machines," Marti Hearst, IEEE Intelligent Systems, Jul./Aug. 1998, pp. 18-28.

"Support Vector Machines for Spam Categorization," Harris Drucker et al., IEEE Transactions on Neural Networks, vol. 10, No. 5, Sep. 1999, pp. 1048-1054.

"Text Categorization with Support Vector Machines: Learning with Many Relevant Features," Thorsten Joachims, University of Dortmund, Computer Science Dept., LS-8 Report 23, 1998, 18 pages.

"Telstra targets Net spammers," J. Dudley, news.com.au, Dec. 2, 2003, 2 pages.

"Learning Spam: Simple Techniques for Freely-Available Software," Bart Massey et al, Computer Science Dept., Portland, OR USA, 2003, pp. 1-14.

"Will You Buy a Car From This Man?," Leander Kahney, Oct. 6, 2003, pp. 1-3.

"Social Nets Find Friends in VCs," Joanna Glasner, http://www.wired.com/news, Nov. 17, 2003, pp. 1-3.

"Learning to Filter Spam E-Mail: A Comparison of a Naïve Bayesian and a Memory-Based Approach," Ion Adroutsopoulos et al., University of Athens, Sep. 2000, pp. 1-12.

"Better Bayesian Filtering," Paul Graham, Jan. 2003, pp. 1-11, http://www.paulgraham.com/better.html.

"Social Network Fragments: An Interactive Tool for Exploring Digital Social Connections." Danah Boyd, Jeff Potter. Sketch at *SIGGRAPH 2003*. San Diego, California: ACM, Jul. 27-31, 2003.

"Reflections on Friendster, Trust and Intimacy," Danah Boyd. *Ubicomp 2003*, Workshop Application for the Intimate Ubiquitous Computing Workshop. Seattle, WA, Oct. 12-15, 2003.

Home-tribe.net, http://washingtondc.tribe.net/message/24434d1b-817b-4580-aa42-3bffa15f26a?page=1 (4 total pages), Dec. 13, 2004.

http://www.friendster.com (17 pages) Dec. 12, 2004.

Office Action, mailed Jan. 26, 2009, in U.S. Appl. No. 11/025,881, 18 pages.

Office Action, mailed Aug. 6, 2009, in U.S. Appl. No. 11/025,881, 7 pages.

Office Action, U.S. Appl. No. 10/448,469, dated Jul. 16, 2007, 25 pages.

International Search Report, Application No. PCT/US06/49386, dated Apr. 17, 2008, 10 pages.

Bott, E., et al., "Special Edition: Using Windows® 95 with Internet Explorer™ 4", Que Corporation, 1998, 1,097 pgs.

* cited by examiner

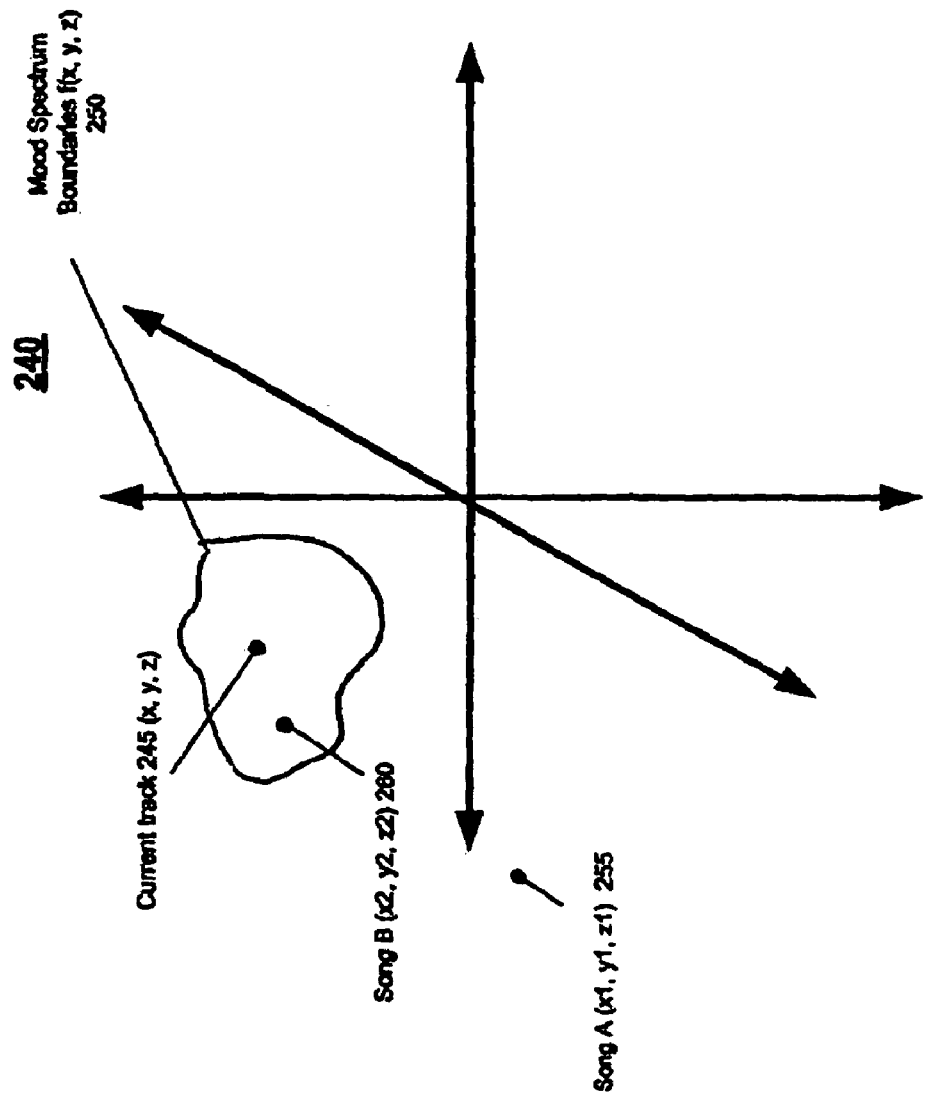

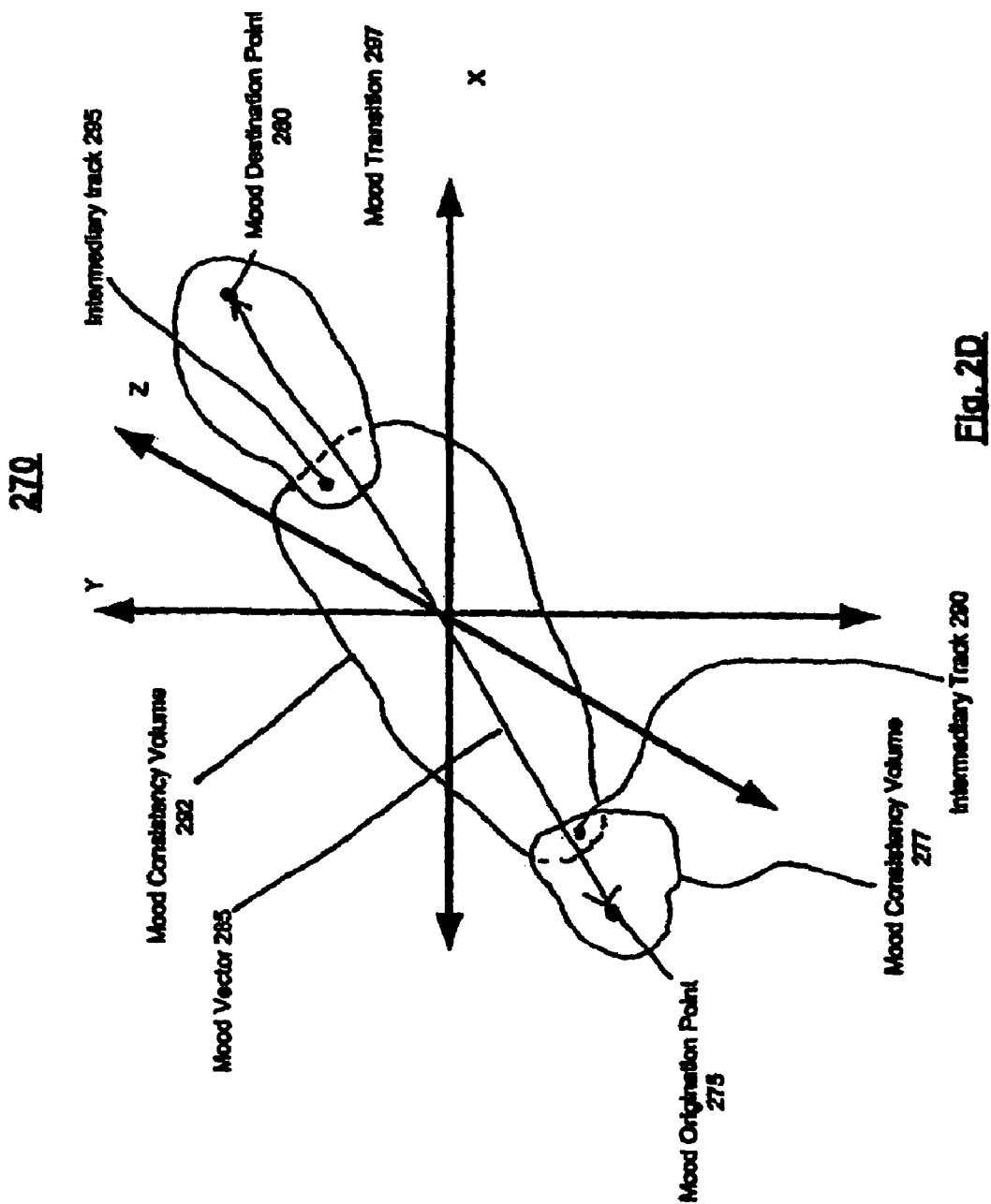

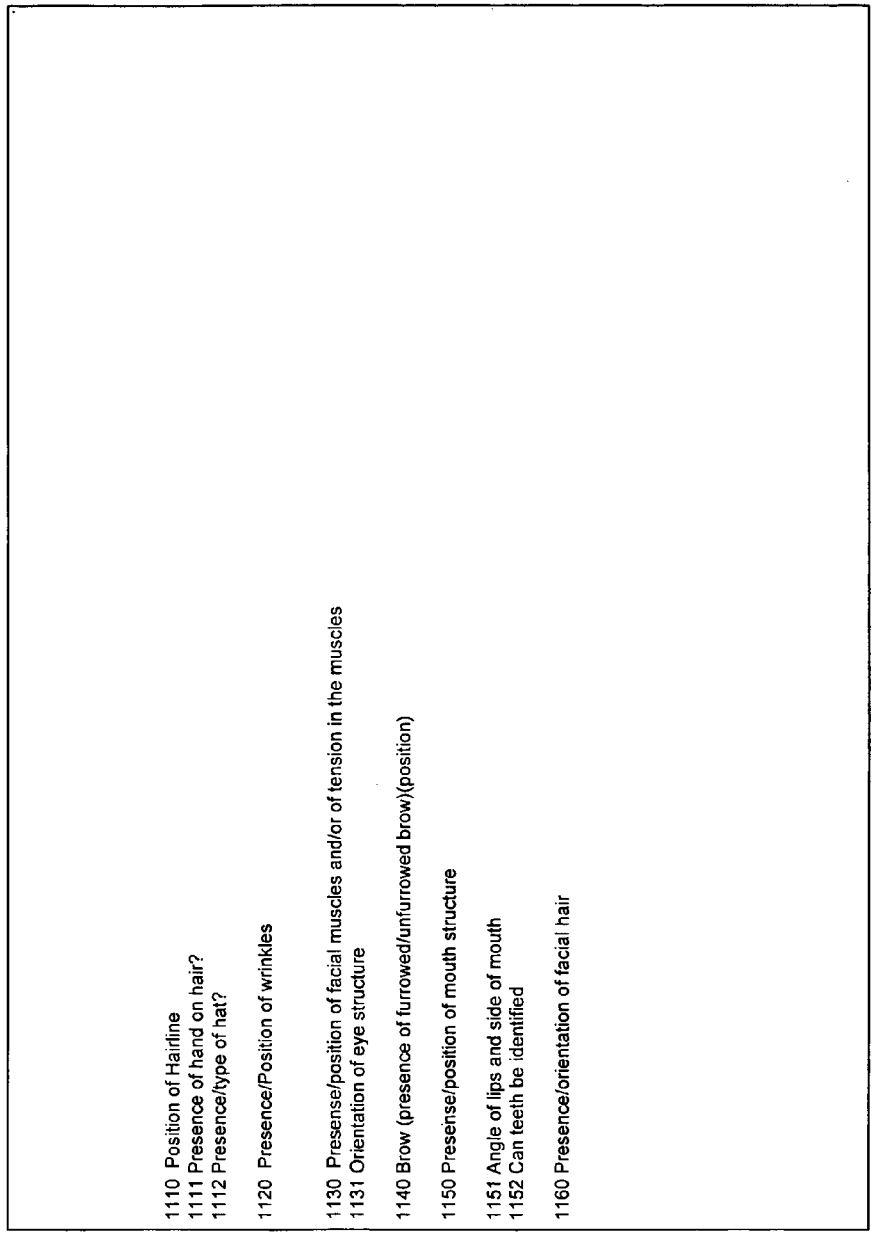

1110 Position of Hairline
1111 Presence of hand on hair?
1112 Presence/type of hat?

1120 Presence/Position of wrinkles

1130 Presense/position of facial muscles and/or of tension in the muscles
1131 Orientation of eye structure 1140 Brow (presence of furrowed/unfurrowed brow)(position)

1150 Presense/position of mouth structure

1151 Angle of lips and side of mouth
1152 Can teeth be identified

1160 Presence/orientation of facial hair

1200

User profile for SCREEN_NAME

1210 Position of Hairline
   Default Rule applies (forward =relaxed)
                    (set back= tense (anger, anxiety, upset))
1211 Presence of hand on hair?
   Default Rule applies (if YES then SCREEN_NAME is tense)

1212 Presence/type of hat?
   IF baseball cap then mood = relaxed or happy

1220 Presence/Position of wrinkles
   If WRINKLES_EXIST_IN_FOREHEAD then MOOD = tense (anger, anxiety, upset)
   If VERTICAL_WRINKLES EXIST outside MOUTH then mood= anger
   If VERTICAL_WRINKLES_EXIST outside of EYE then mood=pain 1230 Presense/position of facial muscles and/or of tension in the muscles If CHEEK_TENSE then mood = business (anxiety, focus)
   If CHEEK_RELAXED then mood=NOT business and NOT tense 1231 Orientation of eye structure
   IF EYE_SQUINT then mood= nonresponsive (skeptical, dislike, pain)
   IF EYE_CLOSED then mood= slow (sleep, bored, relax)
   If EYE_WIDE_OPEN then mood= wonder (shock, amaze, curiosity)

1240 Brow (presence of furrowed/unfurrowed brow)(position)
   BROW_FURROWED=(BROW_DOWNWARD or BROW_ANGLE>45 degrees)
   If BROW_FURROWED then MOOD = tense
   BROW_UNFURROWED=BROW_UPWARD or BROW_ANGLE<45 degrees)
   If BROW_UNFURROWED then mood=relaxed or happy 1250 Presense/position of mouth structure
1251 Angle of lips and side of mouth
1252 Can teeth be identified
   SMILE=END_OF_MOUTH_POINTED_UP OR TEETH_TOGETHER
   If SMILE then mood= relaxed or happy
   BUT
         IF TEETH AND NOT_TOGETHER AND AUDIO_SIGNAL=YELL
         THEN mood=anger 1260 Presence/orientation of hair facial hair
   IF DREADLOCKS_EXIST then mood=REGGAE
   If UNSHAVEN then mood= NOT CLASSICAL or POP
   If FULL_BEARD then mood= (ROCK, METAL, COUNTRY)

1270 Miscellaneous
   IF PIPE then mood= RELAXED, CLASSICAL, JAZZ, NATIONAL_PUBLIC_RADIO 1280 PRIORITIZATION
   FAVOR business over happy
   FAVOR nonresponsive over tense
   IF KIDS_AROUND(AUDIO_SIGNAL, CAMERA) THEN NO METAL 1290 CUSTOMIZATION
   IN ROCK=EXCLUDE (ARTIST1, ARTIST2)
   IN TALK=EXCLUDE (TALK_SHOW_HOST_1)
   HAPPY=INCLUDES (METAL, ROCK)
   HAPPY=EXCLUDES (POP) UNLESS ARTIST3 OR SONG4

| | Screen Name | Happy Value [0..10] | Energy Value [0..10] | Busy Value [0..10] |
|---|---|---|---|---|
| 1910 → | (header) | 1911 → | 1912 → | 1913 → |
| 1920 | Anne | 3 | 5 | 9 |
| 1921 | Murray | 1 | 3 | 6 |
| 1922 | Sara | 8 | 9 | 1 |
| 1923 | Klaus | 5 | 5 | 5 |
| 1924 | Veronica | 1 | 10 | 8 |
| 1925 | Arthur | 10 | 1 | 1 |
| 1926 | Thelonius | 10 | 10 | 10 |

| | Mood Type | Happy Value | Energy Value | Busy Value |
|---|---|---|---|---|
| 2010 → | (header) | 2011 → | 2012 → | 2013 → |
| 2020 | Very Happy | 10 | 7 | 5 |
| 2021 | Happy | 7 | 5 | 5 |
| 2022 | Happy | 8 | 3 | 3 |
| 2023 | Neutral | 5 | 5 | 5 |
| 2024 | Sad | 3 | 5 | 5 |
| 2025 | Depressed | 0 | 0 | 0 |
| 2026 | Hyperactive | 10 | 10 | 10 |
| 2027 | Silly | 10 | 10 | 5 |
| 2028 | Busy | 5 | 5 | 10 |
| 2029 | Calm | 6 | 4 | 1 |
| 2030 | Angry | 0 | 8 | 5 |
| 2031 | Very Angry | 0 | 10 | 8 |

| | 2110 | 2111 | 2112 |
|---|---|---|---|
| | Screen Name | Full Name | Group |
| 2120 | Anne | Anne Smith | Friend |
| 2121 | Murray | Murray Fields | Friend |
| 2122 | Sara | Sara Callaha | Coworker |
| 2133 | Klaus | Klaus VonBulow | Coworked |
| 2124 | Veronica | Veronica Charles | Friend |
| 2125 | Arthur | Arthur Goldstein | Family |
| 2126 | Thelonius | Thelonius Monk | Family |

FIG. 21

| Mood | Icon | Font Name | Font Size | Font Color | Sound |
|---|---|---|---|---|---|
| ↓2410 | ↓2411 | ↓2412 | ↓2400 2413 | ↓2414 | ↓2415 |
| 2420→ Happy 2410a | ☺ 2411a | Times New Roman 2412a | 12 2413a | Black 2414a | Happy.wav 2415a |
| 2421→ Sad | ☹ | Zen St. Charles | 12 | Blue | Sad.wav |
| 2422→ Cool | 😎 | Arial | 12 | Black | Cool.wav |
| 2423→ Silly | ☺ | Goudy Stout | 12 | Green | Silly.wav |
| 2424→ Angry | 😠 | Chiller | 12 | Red | Angry.wav |

FIG. 24

MOOD-BASED ORGANIZATION AND DISPLAY OF INSTANT MESSENGER BUDDY LISTS

CROSS-REFERENCE TO RELATED APPLICATIONS

This application is a continuation-in-part application of and claims priority under 35 U.S.C. §119(e) to U.S. application Ser. No. 11/025,881, filed on Dec. 30, 2004 now U.S. Pat. No. 7,764,311, "Personalizing Content Based on Mood" the entire contents of which are hereby incorporated by reference.

TECHNICAL FIELD

This document relates to the presentation of mood information.

BACKGROUND

Digital content is distributed on a wide variety of devices and in a wide variety of formats. The digital content may include movies, music, slides, games and other forms of electronic content.

One way that users communicate over a distributed computer network is through an instant messenger service such as AOL Instant Messenger. Any network program which allows communication between multiple network users may include a co-user display such as the buddy list interface for the AOL Instant Messenger. A co-user display may include one or more representations of co-users.

SUMMARY

In one general aspect, a graphical user interface is configured to display information about more than one co-user. The graphical user interface includes one or more co-user elements. Each co-user element includes an identity element structured and arranged to enable a user to perceive a co-user identity and an online status of the co-user identity. The graphical user interface also includes one or more mood elements structured and arranged to enable a user to perceive a mood associated with the co-user identity.

With respect to at least the first general aspect, implementations may include one or more of the following. For example, the identity unit may be a screen name associated with the co-user identity or a name associated with the co-user identity.

The one or more mood elements may include a visual indicator related to the mood associated with the co-user identity. The visual indicator related to the mood associated with the co-user identity may include an animation related to the mood associated with the co-user identity. The animation may be animated in response to a current mood associated with the co-user identity or a change in mood associated with the co-user identity. The visual indicator may include an icon displayed adjacent to a corresponding co-user element. The icon may visually reflect the mood associated with the co-user identity indicated by the co-user element. The visual indicator may include an indicator of a mood category, such that a co-user element of at least one co-user identity associated with the mood of the mood category may be displayed beneath the visual indicator.

The one or more mood elements may include a textual description of a mood associated with the co-user identity. The one or more mood elements may be associated with the co-user element that includes an identity element. The identity element may be formatted with text having a style, where the style may be a font, a color, and/or a size. The style may be related to the mood associated with the co-user identity.

The mood associated with the co-user identity may be based on a mood value. The mood value may be represented as a multi-dimensional rating, such that each rating may be associated with a particular aspect of the mood associated with the mood value. The graphical user interface may be configured such that the co-user elements are visually arranged based on a difference between the mood value associated with the co-user identity and a reference mood value.

The graphical user interface may include a user feedback element structured and arranged to receive user feedback regarding accuracy of the mood determined and associated with the co-user identity. The user feedback element may be configured to reflect positive and negative user feedback. The negative user feedback reflected by the user feedback element may be used to correct the mood determined and associated with the co-user identity, while the positive and negative feedback reflected by the user feedback element may be used to improve the accuracy of the mood determining element.

The graphical user interface may include a privacy control that may be structured and arranged to allow a co-user to selectively block the display of the one or more mood elements from being perceived in the graphical user interface. The graphical user interface may include a contact list for facilitating instant messaging communications. The mood associated with a co-user identity may include a mood of happy, sad, tired, worried, angry, mad, busy, nervous, anxious, content, depressed, lonely, sick, annoyed, frustrated, ecstatic, amused, silly and/or lazy.

In a second general aspect, co-users having a particular mood are determined based on a search among a group of co-users each having an associated mood. A mood value for at least one co-user is accessed. Reference mood values and corresponding moods are accessed. The mood value for the co-user is compared with the reference mood values. Based on a result of the comparison between the mood value for the co-user and the reference mood values a mood is associated with the co-user. A search query that includes at least some query parameter that is based on mood information is received. The search query is applied to the mood associated with one or more of the co-users. Which, if any, co-users have an associated mood that satisfies the search query is determined. An indication of a co-user identity for co-users who have an associated mood that satisfies the search query is returned.

With respect to at least the second general aspect, implementations may include one or more of the following. For example, associating the mood with the co-user may include, for at least one of several moods, determining whether the mood value for the co-user is within a range of mood values associated with a mood with which reference values have been accessed. If so, the mood may be added to a list of moods associated with a co-user.

In a third general aspect, information about more than one co-user is displayed. One or more co-user elements is rendered. Each co-user element includes an identity element structured and arranged to enable a user to perceive a co-user identity and an online status of the co-user identity. One or more mood elements structured and arranged to enable a user to perceive a mood associated with the co-user identity is rendered.

With respect to at least the third general aspect, implementations may include one or more of the following. For example, the mood associated with the co-user identity may be determined by calculating a mood value associated with the co-user identity, comparing the mood value to a list of moods and determining the mood associated with the co-user identity based on the calculated mood value. The mood value associated with a co-user identity may be represented as a multi-dimensional rating, such that each rating may be associated with a particular aspect of the mood associated with the mood value. The ratings may be associated with the particular aspects of the mood and may be used as a basis to arrange the co-user elements. The mood values associated with the more than one co-user identities may be used as a basis to arrange the co-user elements.

The more than one co-user elements may be arranged based on their corresponding mood values to hierarchically present the co-user elements. As such, the user may perceive a difference in mood, as represented by the mood value, among more than one co-users associated with a same mood.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 2C is a graph illustrating a three-dimensional mood management system that illustrates how mood consistency may be maintained using three or more factors.

FIG. 2D is a graph illustrating how mood transitions may incorporate intermediate tracks to create a more successful transition in reaching a mood destination.

FIG. 11 is an exemplary listing of variables illustrating how facial components may be used to generate a mood.

FIG. 12 is an exemplary user profile for a screen name that relates a component in a facial expression to a mood that may be used in a mood-based playlisting system.

FIG. 19 is an exemplary data structure for storing the mood values of co-users.

FIG. 20 is an exemplary data structure configured to define moods in terms of mood values.

FIG. 21 is an exemplary data structure for storing a list of co-users.

FIG. 24 is an exemplary data structure of a configuration indicating how a mood may be expressed within a co-user element.

DETAILED DESCRIPTION

Figure 1:
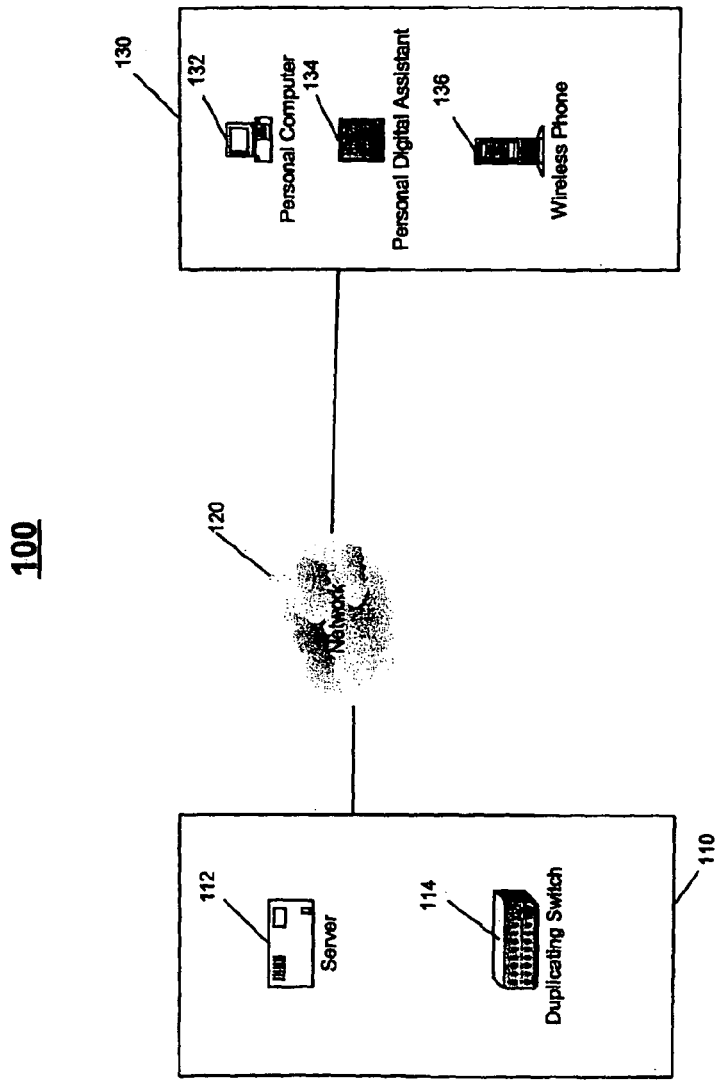
FIG. 1 is a block diagram of a communications system that enables electronic content to be distributed.

A mood state may be modeled using mood information for a content selection (e.g., a digitally-encoded song) and/or by using mood information determined by how a user is interacting with a media player. For example, a playlist engine on a host may determine that a particular song is associated with an uplifting mood, thus determining that a user who has selected that particular song currently is in an uplifting mood, and correspondingly may select additional songs and advertisements consistent with, or responsive to, the uplifting mood. Mood information also may be used to present a mood state of users (e.g., co-users) in a network for display in a graphical user interface (GUI). For example, a user's screen name appearing in an America Online (AOL) Instant Messenger's Buddy List may indicate a determined user's mood, such as "happy", "sad", "silly", or "angry." In another example, a user's mood may be detected to be more subtly defined as a combination of moods or a particular point on a spectrum of a mood from "happy" to "sad", from "tired" to "energetic", or from "good" to "evil."

A user's mood may be determined based on express or implicit information in a variety of ways. Mood information may be determined based on information expressly provided by the user. For example, a user may provide a current mood (e.g., "happy") using a GUI, or by some other form of input. Mood information also may be determined based on information expressly identified from content perceived as being currently accessed by a user. For example, a user may be listening to a particular song that is associated with an "unhappy" mood. Based on the "unhappy" mood of the content, the user's mood then may be determined as also "unhappy." Additionally, even if the content does not bear directly on mood (e.g., a song without an associated mood), information related to the content may help determine a user's mood. For example, a mood may be determined using metadata associated with content (e.g., a mood tag indicating "happy" that may be attached to the content), information about the content itself, such as text within a document or song lyrics (e.g., happy words, such as "smile," "dance," or "sunny"), information related to the content file name or content title (e.g., "my happy song" as a content file name, or "love song" as a content title), attributes related to a source of the content (e.g., a radio station name or classification, as well as the type of content being broadcast by the radio station (e.g., sports vs. music) if the content is a radio broadcast), and/or general information (e.g., time of day or weather).

Once a user's mood is determined, the mood information may be used to control playlisting. More particularly, a user's current mood may be enhanced or changed (e.g., transitioned) by careful selection of content. For example, a user who is currently in a "content" mood may be transitioned to a "happy" mood by playing more up-beat songs. In another example, a user who is currently in a "sad" mood may be transitioned to a "happy" mood by playing up-beat songs or songs from the user's favorite album or by the user's favorite artist. In both cases, playlist changes may be subtle in order to easily transition the user's mood. For example, for a user currently in a "sad" mood, slightly more up-beat songs may be played, followed by much more up-beat songs, followed by the "cheeriest" music in the playlist to slowly transition the user to a "happy" mood.

In addition to using mood information to control playlisting, determined mood information also may be displayed to other users (e.g., co-users) via a co-user list. A co-user list may have co-user elements and mood elements. Co-user elements relate to an identity of a co-user, such as a screen name or nickname associated with the co-user. Mood elements relate to an indication of a current mood of a particular co-user. Mood elements may include an icon (e.g., a smiley face icon for a happy co-user and a frowning face icon for a sad co-user), a graphical representation of a mood in a co-user-centric interface (e.g., presenting graphical mood information in response to a mouse-over or right-click on a co-user element), three-dimensional depiction of a mood, an appearance of the co-user element (e.g., large, bright colored lettering when a co-user is happy and small, dingy colored lettering when a co-user is sad), inclusion or exclusion from a group of co-users (e.g., all co-users in a happy mood are displayed in the co-user list under a "happy" group), an indication of factors contributing to mood (e.g., it is raining at a co-user's location and hence the co-user is in a glum mood), explicit indication of one or more particular moods (e.g., the word "happy" being placed next to the co-user element), and/or an identification of a co-user's mood along one or more continuums of moods or composite scores (e.g., an indication that a co-user is 90% happy or that the co-user is happy, but not as happy as another co-user).

Furthermore, social networking aspects related to mood information also may be displayed in the co-user list. More particularly, co-users having similar moods may be grouped together in the co-user list. For example, a co-user list may have different groups, such as "happy," "sad," "angry," or "ecstatic" such that co-user elements associated with co-users having one of the mentioned moods may be located under the appropriate heading in the co-user list. In addition, within the mood groups, a co-user's relative mood (e.g., mood relative to moods of other co-users) may be displayed. For example, a co-user element may get brighter as the co-user's mood intensifies, a co-user within the "happy" group who is the happiest of the co-users in the "happy" group may have be listed at the top of the group, or a numerical indication (e.g., a vector) of a co-user's mood may be displayed alongside the co-user element to indicate the intensity of the co-user's mood.

Another social networking aspect related to mood information may include blocking display or access to co-users on the co-user list based on mood information. For example, a user may set a preference for displaying and enabling communication exclusively with co-users in a happy mood. In one configuration, only co-users in a happy mood appear on the co-user list. In another configuration, a user may set a preference for displaying only co-users in the co-user list who are currently in the same mood as the user. In this way, some, but less than all determined moods, may be optionally displayed in a co-user list.

Furthermore, a user may set the display preferences on a co-user, co-user group, class of co-user, or entire community of co-users basis. For example, a user may choose to display all co-workers regardless of their mood, but may display friends, or a sub-set of all friends, based on mood information. In another example, a user may set preferences on a per-co-user basis, such that a particularly annoying friend may only be displayed when that friend is in a good mood.

A user also may search for co-users having a particular mood. For example, a happy user may search for happy co-users. Users also may be notified when the mood of co-users changes. For example, a clip from a happy song may be played when a co-user in the co-user list moves from a sad mood to a happy mood. Additionally, a user may seek to influence the mood of a co-user. For example, the user may tell a funny joke or send a funny picture in order to cheer up a co-user currently in a sad mood.

Identification of Mood and Playlisting Based on Mood

Digital content such as digitally encoded songs (e.g., MP3 and NSV files) and video may be accessed on a variety of platforms through a variety of distribution channels. Examples of the platforms include personal computers, specialized appliances (e.g., a compact digital audio player such as Apple's iPod™), home stereo systems, and other devices. Examples of the distribution channels include Internet radio and television stations, network-based on demand services, Internet and retail outlet purchasing, and promotional distribution (e.g., an optical disk provided in a magazine).

The plethora of digital content, distribution channels and content providers make it very easy for a user to identify and select different content sources that are more responsive to the user's particular interest at a particular time. For instance, to select content responsive to the user's particular interest at a particular time, a user's mood or emotional zone may be mathematically modeled. A media player (e.g., a jukebox or an application on a personal computer) may be used to select content responsive to the determined mood. The mood-based playlisting system may be used to select or plan a sequence of tracks (e.g., a playlist) to achieve or preserve a desired mood-state for the user. A mood transition may be planned so that any mood change between different 'tracks' comports with a determined mood transition specification.

Content (e.g., a song or track) may be associated with a particular mood such that the content may be accurately selected in response to a determined mood. In some implementations, a mood may be associated with particular content based on objective criteria. That is, particular content may be associated with a mood independent of observed listening habits of a particular user. For example, a song entitled "Shiny Happy People" (by the band R.E.M.) may be associated with a happy mood because the word "happy" is in the song title and/or the melody is upbeat. Other criteria may be used to associate particular content with a mood, such as, for example, a genre related to the content (e.g., a blues song may be associated with a sad mood) or individual song lyrics (e.g., the lyric "how sweet it is to be loved by you" may cause the James Taylor song to be associated with a love struck mood). Alternatively, or additionally, particular content may be associated with a mood based at least in part on user attributes or listening habits. In this configuration, for instance, a song may be associated with a particular mood because the song has been played by one or a threshold number of users identified as being in the particular mood while requesting or receiving or listening to the song. For example, if a user in a happy mood plays the song "Dancing on the Ceiling" by Lionel Richie, the song may be associated with a happy mood and presented to other users identified as having a happy mood.

A likelihood exists that an actual mood for a user may differ from the predicted mood for the user. For instance, a user may be listening to classical music as the user is frantically packing last-minute for a vacation. The output of classical music may indicate a relaxed mood for the predicted mood, but the actual mood may differ, as the user is anxious, stressed, and/or panicked with last-minute vacation preparations.

In order to increase the efficacy of a mood-based playlisting system, a mood sensor such as a camera may be used to provide mood information to the mood model. When the mood sensor includes a camera, a camera may be used to capture an image of the user. The image is analyzed to determine a mood for the user so that content may be selected responsive to the mood of the user.

For example, a user listens to an internet radio station. The user may initially select one of several Internet radio stations before settling on a 1980s-oriented station. The personal computer may include a desktop video camera that captures imagery of the user in front of the personal computer.

The 1980s-oriented station is flexibly configured to enable access to different content based on the mood of the user. Thus, if a user does not 'like' a first selection (e.g., WHAM's "Wake Me Up"), the user may advance to another selection, either explicitly (e.g., by selecting a next-track feature) or implicitly (e.g., by determining that the user is in a different mood). In particular, the media player or a host accessed by the media player may analyze imagery provided by the desktop video camera and determine a mood for the user. When the user's facial expression indicates disgust, anger, or upset moods, the media player may select different content, for example, by selecting a different track at the conclusion of the first selection, or by advancing to another song altogether in the middle of the song.

In one implementation, the Internet radio station places an advertisement responsive to a mood state, or controls the mood state of previous songs to place an advertisement. For example, no Internet radio station may precede a desired advertisement with a specified sequence of one or more content selections that foster the desired mood. A camera may be used to evaluate whether the desired or predicted mood along the preceding sequence represents an actual mood for the user. When the actual mood differs from the predicted mood, the media player may select a different track or sequence of tracks to foster the desired mood or selects a different advertisement.

FIG. 1 illustrates a media-based communications system 100 that may distribute content electronically. The media-based communications system 100 includes a content source 110, a network 120, and a player 130. Although the media-based communications system 100 is shown as a network-based system, the media-based playlisting system may access media files residing in a standalone device or in a different configuration. For example, a mobile jukebox may play content in the form of music encoded in a media file format.

The content source 110 generally includes one or more devices configured to distribute digital content. For example, as shown, the content source 110 includes a server 112 and a duplicating switch 114.

Typically, a content source 110 includes a collection or library of content for distribution. Alternatively, or in addition, the content source may convert a media source (e g., a video or audio feed) into a first feed of data units for transmission across the network 120. The content source 110 may include a general-purpose computer having a central processor unit (CPU), and memory/storage devices that store data and various programs such as an operating system and one or more application programs. Other examples of a content source 110 include a workstation, a server 112, a special purpose device or component, a broadcast system, other equipment, or some combination thereof capable of responding to and executing instructions in a defined manner. The content source 110 also may include an input/output (I/O) device (e.g., video and audio input and conversion capability), and peripheral equipment such as a communications card or device (e.g., a modem or a network adapter) for exchanging data with the network 120.

The content source 110 includes playlisting software configured to manage the distribution of content. The playlisting software organizes or enables access to content by a user community. For example, the content source 110 may be operated by an Internet radio station that is supporting a user community by streaming an audio signal, and may arrange a sequence of songs accessed by the user community.

The playlisting software includes mood-based playlisting software that maintains a consistent mood in selecting content. Generally, the mood-based playlisting software selects content so that any related mood transition between different content components is acceptable.

The content source includes a duplicating switch 114. Generally, a duplicating switch 114 includes a device that performs network operations and functions in hardware (e.g., in a chip or part of chip). In some implementations, the duplicating switch may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and an ASIC are both generally capable of performing the same operations.

The network 120 may include hardware and/or software capable of enabling direct or indirect communications between the content source 110 and the player 130. As such, the network 120 may include a direct link between the content source and the player, or it may include one or more networks or subnetworks between the content source and the player (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The player 130 may include one or more devices capable of accessing content on the content source 110. The player 130 may include a controller (not shown) that processes instructions received from or generated by a software application, a program, a piece of code, a device, a computer, a computer system, or a combination thereof, which independently or collectively direct operations of the player 130. The instructions may be embodied permanently or temporarily in any type of machine, component, equipment, storage medium, or propagated signal that is capable of being delivered to the player 130 or that may reside with the controller at player 130. Player 130 may include a general-purpose computer (e.g., a personal computer (PC) 132) capable of responding to and executing instructions in a defined manner, a workstation, a notebook computer, a PDA ("Personal Digital Assistant") 134, a wireless phone 136, a component, other equipment, or some combination of these items that is capable of responding to and executing instructions.

In one implementation, the player 130 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, player 130 may include a wireless telephone running a micro-browser application on a reduced operating system with general purpose and specialized hardware capable of operating in mobile environments.

The player 130 may include one or more media applications. For example, the player 130 may include a software application that enables the player 130 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The media application includes mood-based playlisting software. The mood-based playlisting software may work independently of, or in conjunction with, playlisting software residing on the content source 110. The mood-based playlisting software may mitigate the mood transition created when the content changes. In one example, the playlisting software permits the user to select from a recommended list of content that is consistent with the previous or present track. In another example, the mood-based playlist software may seamlessly manage the transition of content.

Figure 2A:
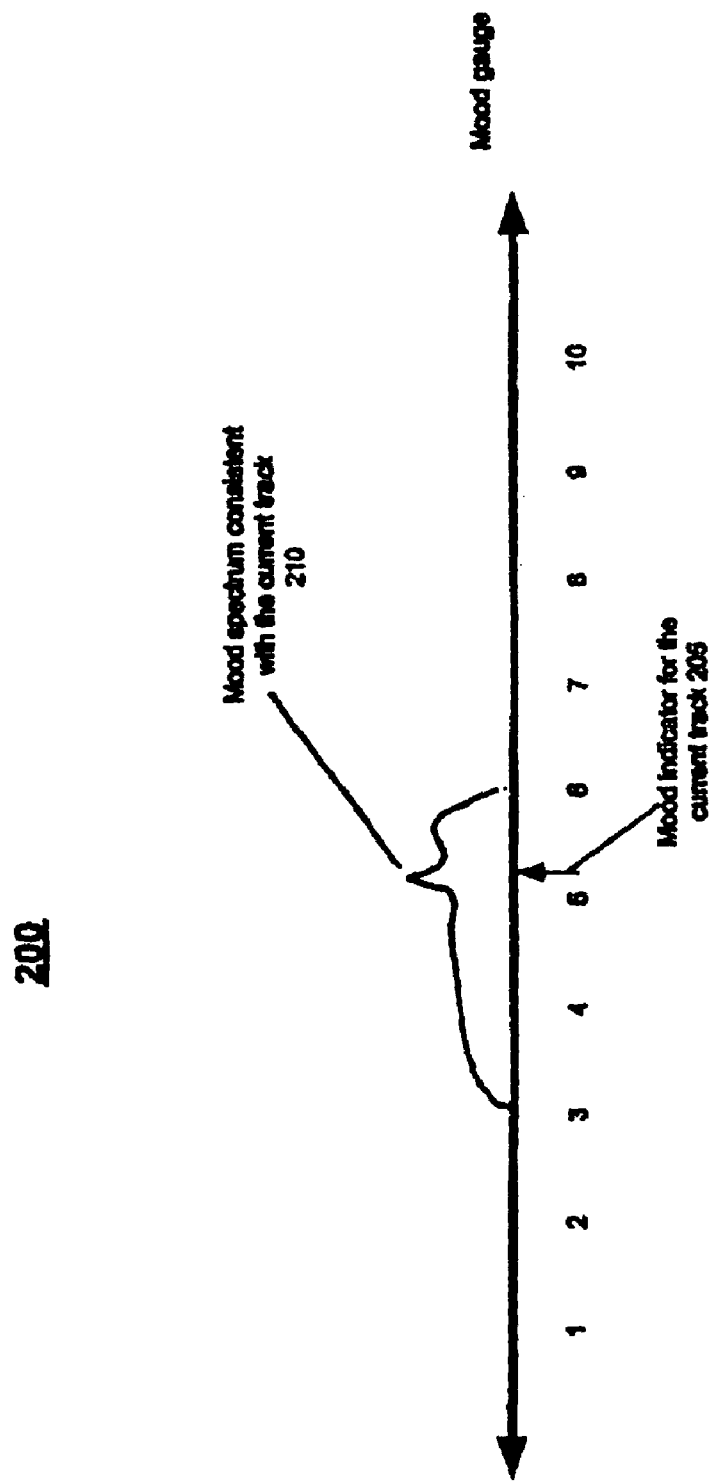
FIG. 2A is a graph of a mood spectrum that illustrates how a selection of content may be scored to quantify the mood in an automated manner.

FIGS. 2A-2D describe a mood modeling system that may be used by the systems described with respect to FIG. 1. FIG. 2A illustrates a mood spectrum 200 that may be used to determine a mood consistency between a selection of content and planned future content. Mood spectrum 200 has been abstracted to be independent of the underlying mood, and has been normalized in the range from 0 to 10. In mood spectrum 200, the mood indicator 205 for the current track has a value of approximately 5 on the mood spectrum 200. The mood indicator 205 for the current track is related to the mood spectrum 210 consistent with the current track, which indicates mood values for content that may be selected consistent with the mood value for the current track under consideration. In one example, the playlist and content selection is being planned and the current track under consideration has not been distributed. In another example, the current track under consideration has been or is being distributed (e.g., across the Internet by an Internet radio station).

Figure 2B:
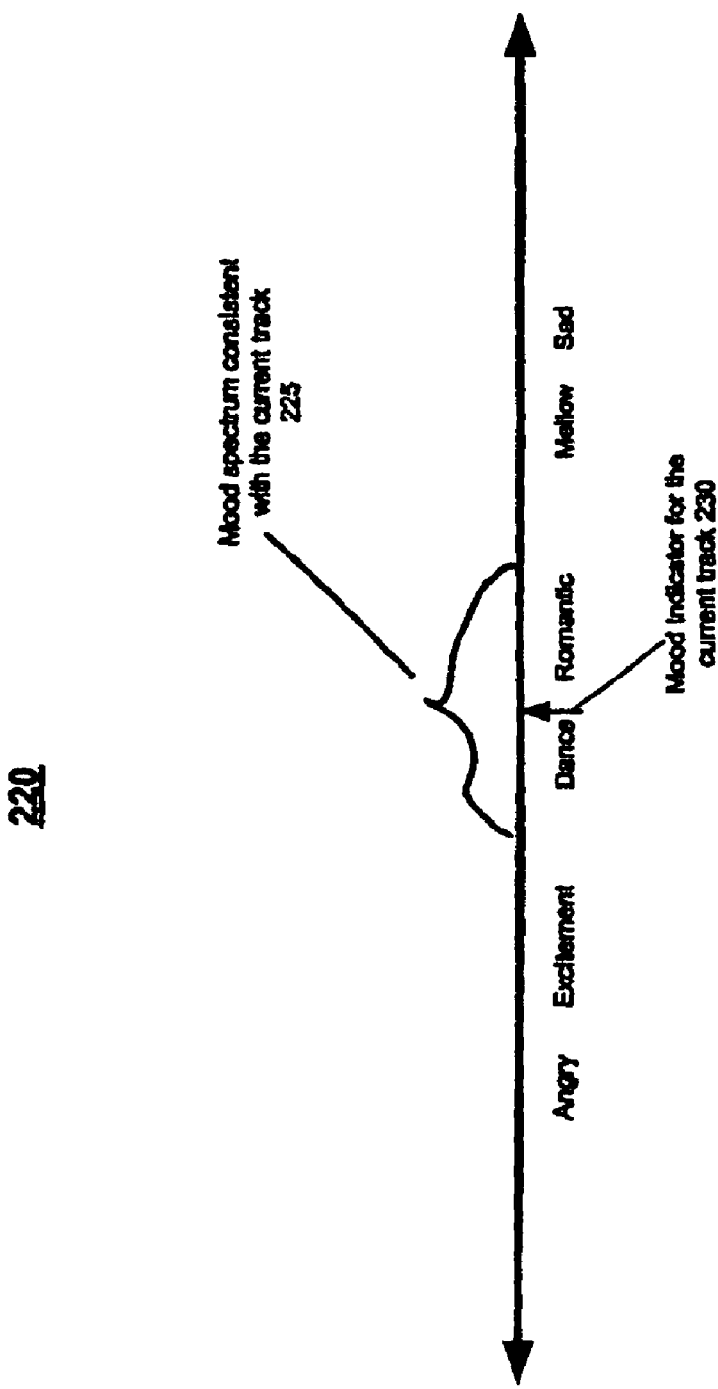
FIG. 2B is a graph illustrating how a mood spectrum and scoring system may be used to associate content with an actual mood.

FIG. 2B illustrates a graph 220 how content may be categorized using one or more moods and specifically describes how the mood indicator associated with a particular piece of content may span multiple moods. As shown, the moods include "angry," "excitement," "dance," "romantic," "mellow," and "sad." FIG. 2B uses a 1-dimensional axis to categorize content along the mood spectrum 225. Specifically, the content in FIG. 2B spans two of the moods, specifically, dance and romance. Other dimensioning systems relating to more than two moods may be used. For example, an X dimensional system may gauge X moods across X axes. Nevertheless, regardless of the number of axes that are used, a selection of content may be related to various moods to identify future content that is consistent with the mood of the content that has been selected.

FIG. 2B includes a mood indicator 230 for the current track. The mood indicator 230 describes a particular mood rating for a piece of content that has been identified. The content that has been identified may include a selection of content that is actually being played or one that is destined for one or more users. Alternatively, the mood indicator for a current track may be used to create a user playlist to better identify desired content deemed compatible for a user. As is shown in FIG. 2B, the mood indicator 230 for the current track lies within the mood spectrum 225 consistent with the current track. This mood spectrum 225 indicates that content that falls within dance and romantic themes is deemed consistent with the mood indicator for the current track.

In one implementation, the consistency with the current track and the identification of a particular mood spectrum may be determined by scoring the current track and a proposed next track and determining the relationship between the score for the current track and the score for the proposed next track. Alternatively, a selection of content may be associated with one or more discrete values that describe the content. For example, a song may be associated with letters, each of which describes one or more themes that may be used to characterize the song. Thus, as is shown in FIG. 2B, if D and R were used to identify, respectively, dance and romantic themes, a record describing the current track could have a D and an R in its record/metadata.

Referring to FIG. 2C, a three-dimensional mood management graph 240 is shown that illustrates how mood spectrum consistency may be determined across three factors, influences, or moods. Specifically, the three-dimensional coordinate system for the current track 245 is shown within a three-dimensional volume describing the mood spectrum boundary 250 as a function of three coordinates. Also shown is a first song 255 that does not fall within the volume of the mood spectrum boundaries 250 and a second song 260 that lies within the mood spectrum boundary 255. Thus, when content is being selected, if the mood spectrum boundary 250 is being used as the determining criteria, song 255 may be excluded as it lies outside the mood spectrum boundary 250, while song 260 may be included in the playlist as it lies within the mood spectrum boundary 250.

Depending on the implementation and the configuration, the mood spectrum boundary may represent a simpler function such as a cone or a sphere. For example, a sphere may be used to identify equidistant points that fall within a certain mood range of the current track. However, the mood spectrum boundary 250 need not include a simple function. For example, if detailed analytics are used to measure mood spectrum consistency and user response, a more detailed and non-symmetrical volume may be used to measure the mood spectrum boundary 250. One illustration of this may include content that may be very consistent across one axis for multiple themes, but inconsistent with minor changes across a different axis in mood spectrum. For example, if the content is being scored across lyrics, tempo and intensity, lyrics that may contain age-appropriate suggestions may only be consistent with content that is similarly appropriate for the identified age. In contrast, content that features a slower tempo may be consistent with music across multiple themes with a similar tempo. Accordingly, the function that describes the mood spectrum boundary 250 of the current track 240 may incorporate analytics that permit a small tolerable deviation in the lyrical deviation while also permitting a wider variation in the tempo axis.

FIG. 2D illustrates a graph of a three-dimensional mood consistency scoring system 270 that illustrates how mood transitions may be planned so that the mood may be changed from a current mood originating point to a mood destination. The transitions may be structured such that a transition directly from a mood originating point to a mood destination that otherwise appears difficult or unsuccessful may be made more successful by using one or more intermediate transitions. Thus, the likelihood of a successful transition between the mood originating point and the mood destination point is increased.

Mood scoring system 270 illustrates a mood originating point 275 and a mood destination 280. The general mood transition that is required is illustrated by the vector 285 from the mood originating point 275 to the mood destination point 280. However, the mood consistency volume 277 for mood originating point 275 does not include the mood destination point 280. Accordingly, one or more intermediary tracks may be used to successfully transition one or more users to the mood destination point.

To accomplish this transition, intermediary track 290 is used as the next content selection to create a mood that is closer to the mood destination point 280, even though the consistency volume 292 for the intermediary track 290 does not actually reach or include the mood destination 280. After the intermediary track 290 is selected, a second intermediary track 295 is added to the playlist to move the current mood indicator closer to the mood destination 280. As is shown in FIG. 2D, the intermediary tracks 290 and 295 both lie within the same transition volume 292, thus preserving a consistent mood transition from the intermediary track 290 to the intermediary track 295. From the intermediary track 295, the system may transition directly to the mood destination point 280 and preserve the consistent mood as both the intermediary track 295 and the mood destination point 280 lie within the mood transition volume 297.

Although the transition from the mood originating point 275 to the mood destination point 280 features the use of two intermediary tracks, the implementation of a successful transition need not be limited to the two intermediary tracks that are shown. For example, depending on the configuration, no intermediary tracks may be required to successfully transition from the mood originating point 275 to the mood destination point 280. Alternatively, one, two, three, or more intermediary tracks may be used to successfully transition from the mood originating point 275 to the mood destination point 280.

The intermediary tracks need not resemble similar forms of content. For example, the mood originating point for the current track may include a song that is being transmitted, a first intermediary track may include a commercial, a second intermediary track may include a second song, and the mood destination point may relate to a planned advertisement that has been targeted for increased chances of success.

Also, the volumes that describe the mood consistency may be configured to reflect probabilistic chances of success and may change, based on the desired chance of success. For example, the mood consistency volume 277 may be planned on a model of mood consistency such that transitioning from the mood originating point 275 to the intermediary track 290 will preserve 90% of the audience upon that transition. Alternatively, if fewer intermediary tracks are desired, a larger mood consistency volume that covers more distance may be used based upon a modeled probability of 50%. Thus, in this model, fewer intermediary tracks may be required to reach the mood destination point.

Finally, the transitions that are shown may include real-time feedback to better predict the actual user response to be transitioned. For example, a test audience may be sent the intermediary track in advance of the larger audience. If the response of the test audience indicates that the transition is not as successful as was expected, an alternate path may be plotted to increase the chance that the transition will preserve the audience. For example, an intermediary track may be chosen that lies closer to the mood originating point. Another example of an alternative path that may be chosen includes a trusted transition that has been used previously and is associated with what is believed to be a higher success rate in transitioning.

Figure 3:
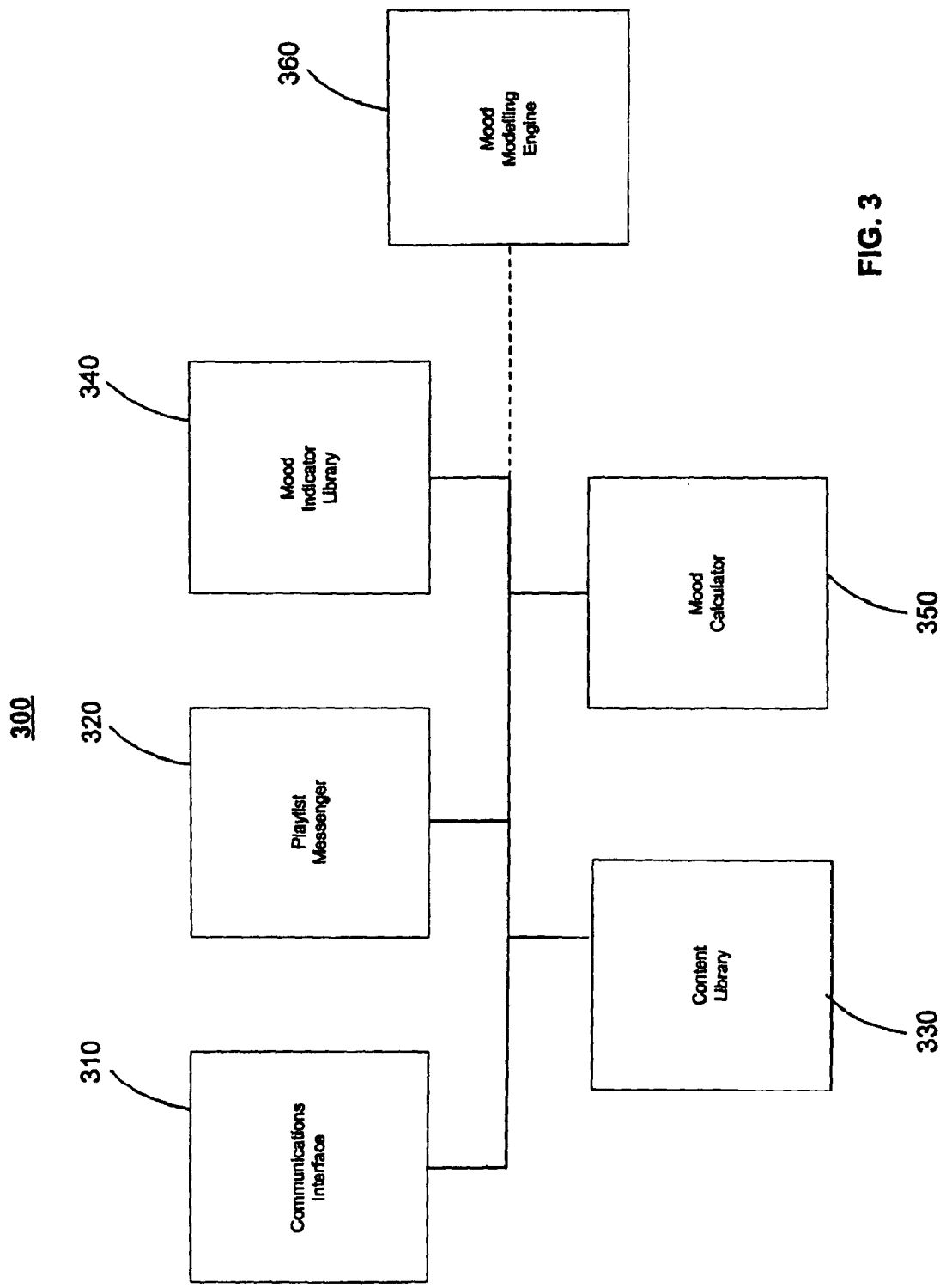
FIG. 3 is a block diagram of a mood-based playlisting system.

FIG. 3 illustrates a mood-based playlisting system 300 that may be used to generate a playlist with consistent moods between two or more selections. The mood-based playlisting system 300 includes a communications interface 310, a playlist manager 320, a content library 330, a mood indicator library 340, a mood calculator 350, and an optional mood-modeling engine 360. Generally, the mood base playlisting system 300 manages the playlist for one or more pieces of content to be transmitted to an audience. The communications interface 310 receives data describing the audience and one or more content goals to be incorporated, so that the playlist manager 320 may put together a playlist of selections from the content library 330 by using the mood indicator library 340 to determine a score for the content and maintaining consistency between the selected content using the mood calculator 350.

The communications interface 310 may be used to exchange data describing the audience that is being managed and/or to distribute playlist information. The communication interface 310 also may be used to receive updates to the content library 330, the mood indicator library 340, and different algorithms and models used by the mood calculator 350.

The communications interface 310 receives updates from one or more partners or other devices to exchange content for incorporation into a playlist. For example, a newly-released song may be distributed, along with advertisements for incorporation into the playlist. Similarly, mood indicator information related to the content and/or advertising to be distributed also may be received by the communications interface 310 for transmission to the mood indicator library 340. Audience data associated with content may be modeled, described electronically, and transmitted to the mood calculator 350 to better select content to be incorporated into the playlist. The playlist manager 320 includes a code segment that identifies content to be used in a playlist. For example, the playlist manager 320 may generate a playlist that describes a piece of content to be accessed and reference information so that the content may be accessed using the reference information.

Alternatively, the playlist manager 320 may generate a playlist to be used by a distribution point. For example, an Internet-based radio system may receive the playlist from the playlist manager for transmission to the listening audience. Depending on the configuration of the mood-based playlisting system and whether the mood-based playlisting system is determining the playlist and distributing the content, the playlist manager 320 also may transmit the content to be used in the playlist (e.g., through communications interface 310).

The content library 330 may include one or more selections of content for incorporation into a transmission for a receiving audience. Depending on the nature of the content, the content library may be adjusted to accommodate the particular media and/or audio demands. For example, the content library may include digitally encoded songs and related music videos for broadband users. The content library also may include metadata that describes the content. In the case of songs, the metadata may include, for example, artist, album, and track information. When the content library includes video information, the video information may include different bit rates for different audiences. Thus, a user with a high bandwidth connection may be able to access a selection encoded for a higher bit rate and having relatively higher quality, while a user with a slower connection may be able to access the same content encoded using a lower bit rate and having relatively lower quality. The content library and the metadata in the content library also may be associated with one or more rules that may be used in the content selection. Thus, a particular selection of content in the content library may have detailed licensing information that governs how the selection of content may be accessed. For example, a particular selection of content may be available for promotional purposes during a limited time and may be unavailable thereafter. Other examples of restrictions that may be incorporated in the content library include ASCAP licensing restrictions that control the number of times a selection or content may be accessed in a particular period, and preclude a selection of content from being accessed in a particular manner. For example, a selection of content may be precluded from being incorporated in a playlist twice in a row.

The mood indicator library 340 may include one or more values designed to describe the mood for a selection of content. Depending on the configuration of the mood-based playlisting system, different metrics may be stored in the mood indicator library 340. Thus, one example of the value stored in the mood indicator library may describe a selection of content and a mood indicator that scores the content in a specified numerical range. Another metric may include different values that indicate whether a selection of content is compatible with a chosen theme or genre.

Although the mood-based playlisting system has been described as maintaining consistency within a desired mood for a selection of content, other non-mood-based elements may be modeled and incorporated into the content selection process and stored in the mood indicator library. For example, a user pool may be divided into premium and non-premium communities. The premium community may be allowed to access exclusive content that is not available to the non-premium community. This premium status for content that may be available may be stored in the mood indicator library. Other non-mood-based metrics may be used.

For example, the mood indicator library 340 may include advertising effectiveness data. Examples advertising effectiveness data may include, but are not limited to, an indication of which advertisements should be used with specified moods, the effect of using an advertisement with the different moods, projected and past advertisement efficacy (both retaining a user and receiving a response) for both a user and a demographic, and reimbursement.

The mood indicator library 340 may be configured to incorporate feedback based on a user or a community of user's response to content. For example, the actual response by users to content may be tracked so that efficacy data may be updated to reflect the users' actual responses. While an original data set may be used to predict a mood, the users' prior actions may be used in generating and consulting a mood model that more accurately predicts the users' response. Old rules that are not accurate may be replaced by new rules determined to be more accurate. The new rules may be used to generate future playlists and/or select content in the future for the user.

The mood calculator 350 may be used to receive values describing a current playlist, access the mood indicator library 340, and assist the playlist manager 320 in generating the playlist. Depending on the configuration of the playlist manager 320, the structure of the mood calculator 350 may differ. For example, in one configuration, the playlist manager 320 may suggest a particular piece of content and poll the mood calculator 350 to determine if the selection of content is appropriate and consistent with the current mood. The mood calculator then may respond with an indicator of whether the suggested content is consistent.

Alternatively, the playlist manager 320 may provide an indicator of a current track that is being transmitted and may poll the mood calculator 350 for a suggested piece of content. In response, the mood calculator 350 may poll the mood indicator library 340 to retrieve a consistent piece of content. The mood calculator 350 then may transmit the identity of the consistent content to the playlist manager 320, which may retrieve the content from the content library 330.

As an optional element, the mood-based playlisting system 300 may include a mood-modeling engine 360. For example, as content is being added to the content library 330, the mood-based playlisting system 300 may interface with the mood-modeling engine 360 to determine and gauge the mood spectrum for the newly-added content. The mood-modeling engine 360 may use the communications interface 310 to develop an appropriate mood analytic for the newly added content. For example, the selected content may be sent to a testing code segment to determine an anticipated user response. Alternatively, the mood-modeling engine 360 may interface with the playlist manager to add the proposed content to a test group of listeners to gauge their response to the selected content.

Other analytics that may be used by the mood-modeling engine 360 may include content analysis that may evaluate lyrics, the tempo, or other elements relating to the content. In one example, the tempo for a newly-received piece of content may be "scored" using a frequency analyzer to determine the theme and mood with which the content is consistent.

Although the mood-based playlisting system 300 is shown as an interconnected group of sub-systems, the configuration of the mood-based playlisting system 300 may include elements that have allocated the functionality in a different manner. For example, the content library 330 may be co-located or merged with the mood indicator library 340. Thus, the mood indicator for a selection of content may be stored as an element of metadata residing with the content record. Alternatively, the elements described in mood-based playlisting system 300 may reside in a larger code segment with constituent code segments described by the elements shown in FIG. 3.

Figure 4:
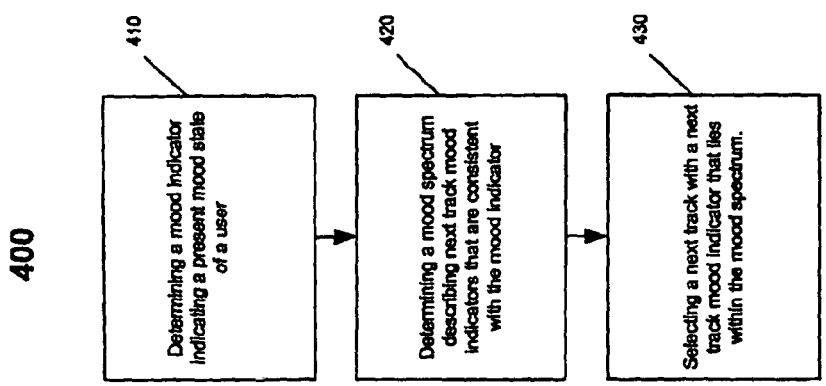
FIG. 4 is a flow chart showing how mood consistency may be maintained between two tracks.

FIG. 4 is a flow chart 400 that illustrates how a track of content may be selected in a way that maintains mood consistency. Specifically, the flow chart 400 may be implemented using the mood-based playlisting system such as was described previously. In general, a mood-based playlisting system determines a mood indicator that indicates a present mood state of a user (step 410), determines a mood indicator describing a next track mood spectrum that is consistent with the mood indicator for the current track (step 420) and selects a next track that lies within the next track spectrum for the current track (step 430).

Initially, the mood-based playlisting system determines a mood indicator that indicates a present mood state of a user (step 410). Typically, this will include creating a score that describes the track of content under analysis. For example, a song being distributed on the radio could be given a score from 0 to 10. In a multi-dimensional scoring system, the mood indicator could include a multi-dimensional coordinate that describes the mood indicator with regard to several variables.

The mood indicator may be determined in advance of distributing the track. For example, the system may assemble a user playlist with a sequence of tracks for distribution.

This sequence may be distributed to distribution nodes (e.g., local radio stations or regional Internet servers). Alternatively, the mood indicator may be determined for a track that is being or has been distributed. For example, the mood indicator may be determined for a song that is being played over the airwaves.

A mood spectrum may be determined for the track for which a mood indicator has just been determined (step 420). The mood spectrum may be used to select the next track such that the next track lies within the boundaries of the mood spectrum. As has been described previously, the mood spectrum may include multiple variables and may relate to a likelihood of success that a user may stay with the current distribution (e.g., the same channel) upon the playing of the next content selection.

With the mood indicator and the mood spectrum for the current track determined, a next track is selected that lies within the mood spectrum (step 430). In one implementation, the next track may be selected by finding the track that is closest to the current track. For example, if the current track has a score of 5.17, the next closest track that may be selected may have a score of 5.18.

Alternatively, a content programmer may wish to have some variation within a mood spectrum, and the selection criteria may include a requirement that the next song differ by more than a specified variation threshold while still being within the specified mood spectrum. In the previous example, the content could be selected to be at least 0.5 units away from the current selection of 5.17 but still lies within the variation describing the mood spectrum of 1.0.

Within the range of values that are acceptable, the content may be selected randomly or the content may be selected based on identifying content that matches the criteria (e.g., is the furthest or closest away within the spectrum). If there is not a track that lies within the mood spectrum, the mood-based playlisting system 300 may alter its configuration to generate a selection of content. For example, the mood spectrum may be expanded so that more content lies within the mood spectrum. This may be accomplished by, for example, decreasing the threshold percentage of a success that is required in the transition or increasing the values that define the threshold for success. For example, if the mood spectrum only covered 70's rock, the mood spectrum may be expanded to include 70's and 80's rock.

Figure 5:
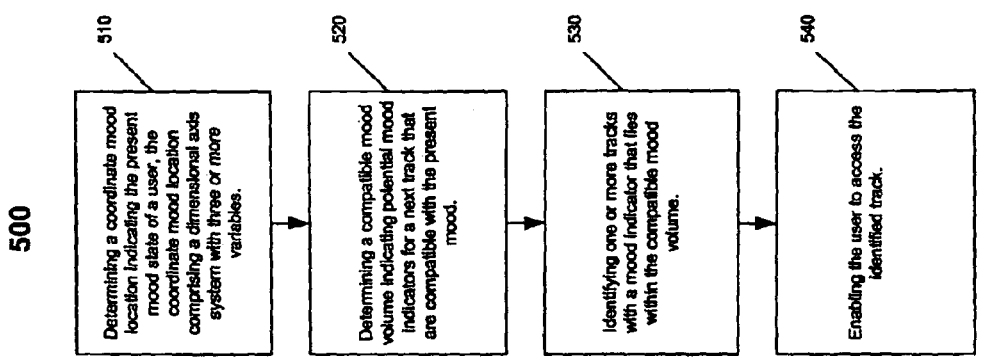
FIG. 5 is a flow chart showing how mood consistency may be maintained using a three-dimensional model to determine mood consistency.

FIG. 5 illustrates a flow chart 500 showing a mood-based playlisting system that incorporates a three-dimensional mood-based modeling system. In general, the three-dimensional mood-based playlisting system operates by determining a coordinate mood location for a current track that is being played. This may include or be described as the present mood state of a user. With the coordinate mood location determined, a compatible mood volume may be determined that describes future content selections that are deemed consistent with the present mood state. With the compatible mood volume identified, one or more tracks that lie within the compatible mood volume may be identified and a user may be able to access the identified tracks.

Initially, a coordinate mood location that indicates the present mood state of a content selection is determined (step 510). For example, the mood state may be described on X, Y and Z axes. In one example, the coordinate mood location is described in the context of the content that is being distributed. For example, the mood coordinates may measure the songs lyrics, tempo, and/or style. Alternatively, the coordinate mood location also may measure or describe the mood of the audience. For example, a particular song may be associated with a human emotion such as sadness, joy, excitement, or happiness. The human emotions may be measured independent of the underlying theme of the music. For example, some music whose theme is described as "golden oldies" may be associated with sadness while other music may be associated with joy.

With the coordinate mood location determined, a compatible mood volume describing compatible and consistent future content may be determined (step 520). For example, a sphere around a coordinate mood location may be identified that describes content compatible with the present track. With the compatible mood volume described, one or more tracks that lie within the mood volume may be identified (step 530). With the track identified, a user may be enabled to access the identified track (step 540).

Figure 6:
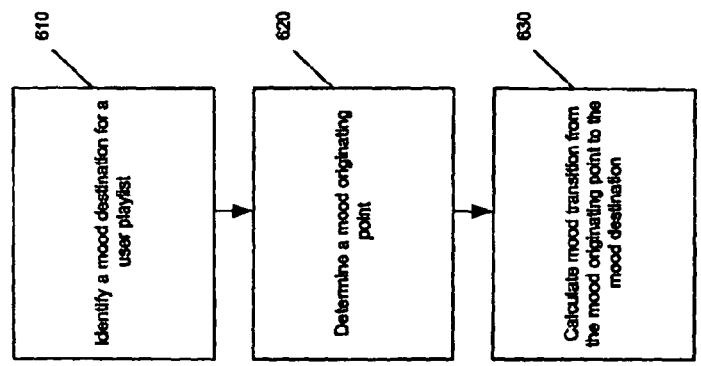
FIG. 6 is a flow chart showing how a playlist of content may be transitioned from a mood originating point to a mood destination using intermediate tracks.

In FIG. 6, flow chart 600 illustrates how an audience may be transitioned from an originating piece of content to a destination piece of content. This may be used, for example, to transition a user from a particular piece of programming (i.e., the originating content) to a targeted advertisement (i.e., the destination content) by tailoring the transitions from the originating content to the destination content. Accordingly, the likelihood of success and the effectiveness of the transition may be pursued.

Generally, the operations described in flow chart 600 may be performed using the systems and models described with respect to FIGS. 1-3. For example, the mood-based playlisting system 300 may be used to generate the playlist that transitions the user from the originating piece of content to the destination. Similarly, the transition and intermediate tracks described in FIG. 2D may be used to increase the effectiveness of the transitions. However, depending on the characteristics of the originating and destination content, the selection of the mood-based transition path may differ.

Generally, a mood-based playlisting system identifies a mood destination for a user playlist. A mood originating point is determined. With the originating point and destination paths known, a mood transition may be calculated from the mood originating point to the mood destination.

Initially, a mood destination for a user playlist is identified (step 610). Generally, identifying a mood destination includes identifying a selection of content to be included in the user playlist. For example, a distributor may wish to place a certain advertisement. Alternatively, a system administrator may wish to have an optimal lead-in for a particular piece of programming for the purpose of, for example, achieving optimal ratings for network content. This content to be inserted in the user playlist has an associated mood that relates to the content being distributed. In yet another example, a system administrator for a mood-based playlisting system may wish to have an optimal lead-in to increase the effectiveness and response of the audience to identified content that is to be transmitted in the future.

Separately or in parallel, a mood originating point may be determined (step 620). Determining a mood originating point may include identifying content that is being distributed or will be distributed to an audience prior to the transmission of the content associated with the mood destination. A mood originating point may be determined for the content that is being distributed. If the mood originating point differs from the mood destination of the content being transmitted (or to be transmitted), the resulting differential may create a mood transition that may create a less responsive result due to differences in the moods of the particular content. The mood transition from the mood originating point to the mood destination is calculated (step 630). Depending on the variation between the mood destination and the mood originating point, the transition may include one or more intermediary tracks. The intermediary tracks may be selected so that the mood metric for the intermediary tracks lies within the mood-consistency spectrum or volume of the previous track. Using the previous content or track as a baseline, the next content or track may be selected to minimize the number of intermediary tracks between the originating content and the destination content.

Figure 7:
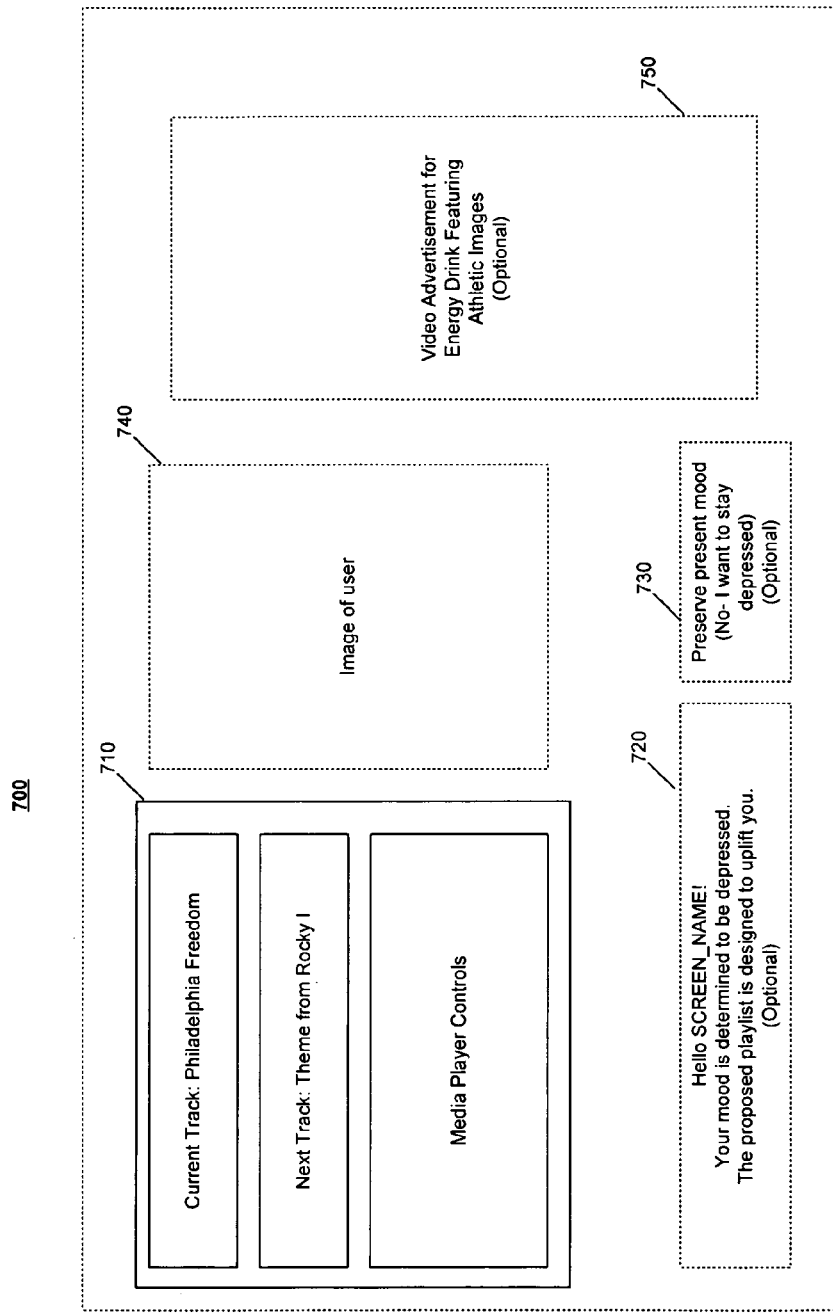
FIG. 7 is an exemplary graphical user interface (GUI) that may be presented to a user accessing a mood-based playlisting system.

FIG. 7 is an exemplary GUI 700 that may be presented to a user accessing a mood-based playlisting system. For convenience, particular components and messaging formats described earlier are referenced as performing the process. However, similar methodologies may be applied in other implementations where different components are used to define the structure of the system, or where the functionality is distributed differently among the components shown.

GUI 700 includes track and media player controls 710, a mood indicator 720, a mood preservation control 730, a mood correction control 740, and an advertisement display 750.

The track and media player controls 710 display the current and next tracks, and enable the user to control a media player (e.g., volume controls, rewind or fast forward, advance to a next-track). Track and media player controls 710 indicate that the current track is Elton John's Philadelphia Freedom and the next track is the "Theme from Rocky."

The optional mood indicator 720 features a display that informs a user as to their mood state/status as determined by with respect to a mood-based playlisting system. The mood indicator 720 greets the user by screen name ("Hello SCREEN_NAME"), indicates the mood state (in this case that the user is determined to be depressed), and also indicates the mood destination (that the proposed playlist is designed to uplift the user). The screen name may be used to personalize the mood-based playlisting system to a user's identity. For example, a furrowed brow for a first user may be associated with an upset mood while a similarly furrowed brow for a second user may be associated with a neutral or even pleased mood. Although the analysis of moods or facial expressions may be personalized, a mood-based playlisting system may use normative analysis that is believed to be valid for large portions of the population. The normative analysis may be enhanced by analyzing multiple portions of a facial expression so that uncommon facial expressions/moods may be accounted for.

The optional mood preservation control 730 enables a user to preserve a present mood. In the example shown, the user may click on a "I want to stay depressed" button to select content consistent with the depressed mood.

The mood correction control 740 enables a user to specify that their actual mood is different from a mood that has been attributed to the user. For example, if a user is actually happy while listening to the current track ("Philadelphia Freedom"), the user may access a drop down menu (not shown) and indicate their actual mood, which in this case is happy. As shown, the mood correction control 740 renders an image of the user.

Activating the mood correction controls may enable a user to identify, select, or highlight one or more features in a facial expression. For example, in response to activating a drop down menu to indicate the user is happy, the media player may present the image (e.g., in mood connection control 740) and ask the user to select one or more features associated with a happy mood. The user then may interact with the image and select a facial structure, such as a brow or smile, to indicate that detection of the selected facial structure reveals a particular mood. The indicated facial structure then may be stored and used in future analysis to identify a user's mood.

An optional image may appear in mood correction control 740 enabling a user to perceive a visual display. Presenting the visual display may be used in training the mood-based playlisting system to be responsive to the actual mood of the user, or to illustrate to a user whether one or more moods (e.g., a predicted mood) represents an actual mood.

The optional advertisement display 750 is used to present an image, or an audio/video clip. In the example shown, the optional advertisement display 750 features a video advertisement for an energy drink with athletic images. In one implementation, the video clip is played while the audio content selection is playing. In another example, the video clip is played upon the completion of the audio selection. Note that the advertisement may be coupled to the mood, as indicated in GUI 700 where an athletic advertisement is linked to an uplifting mood.

Figure 8:
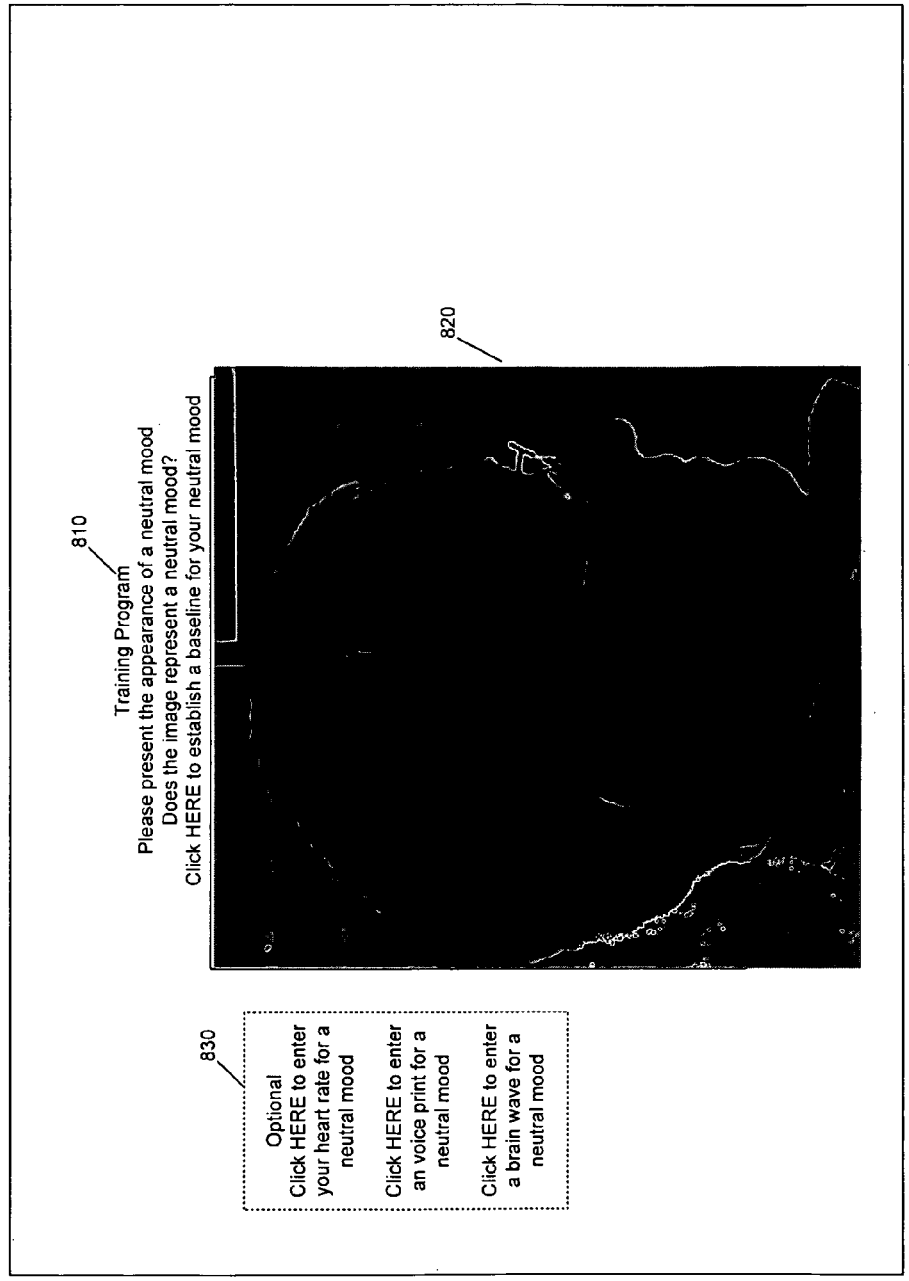
FIGS. 8-10 illustrate exemplary GUIs that may be presented to a user in training a mood recognition engine used in a mood-based playlisting system.
Figure 9:
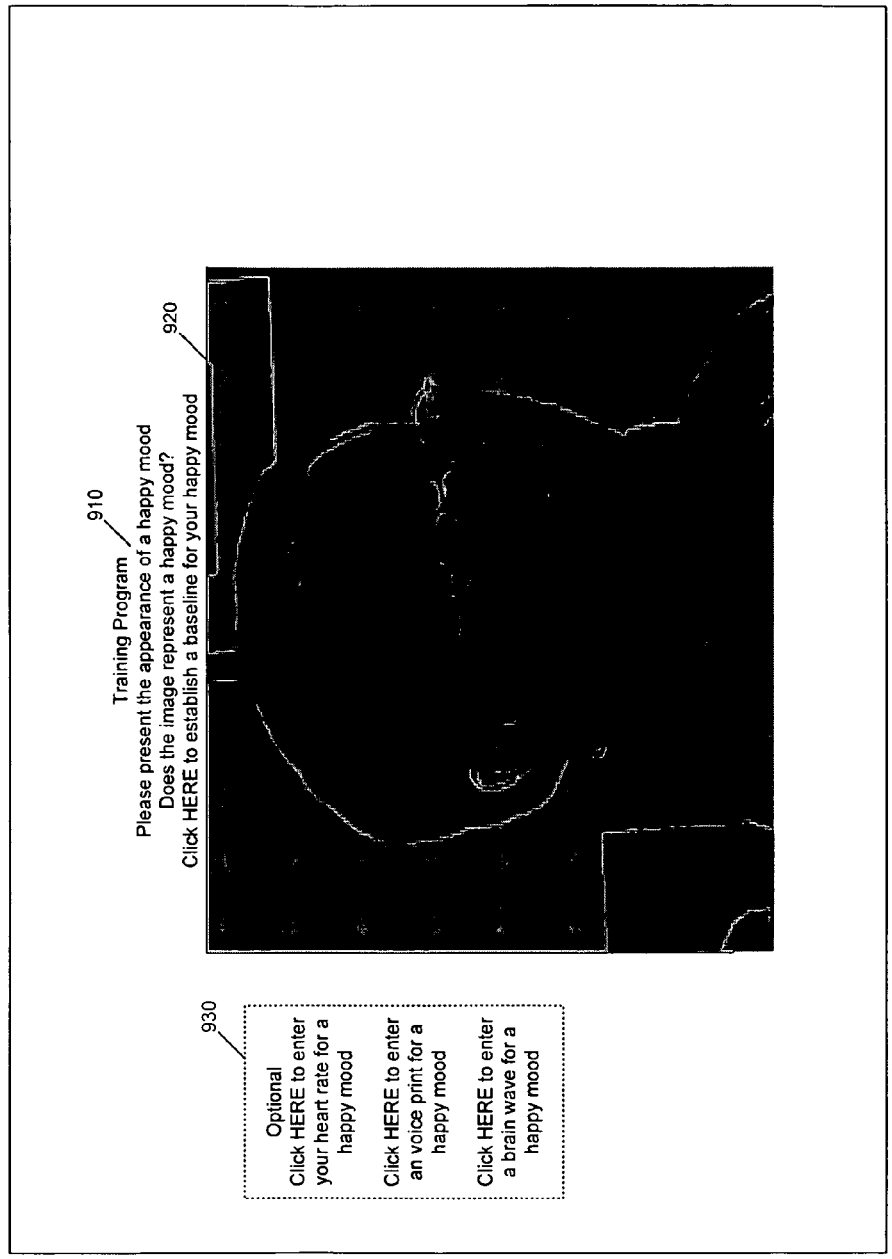
Figure 10:
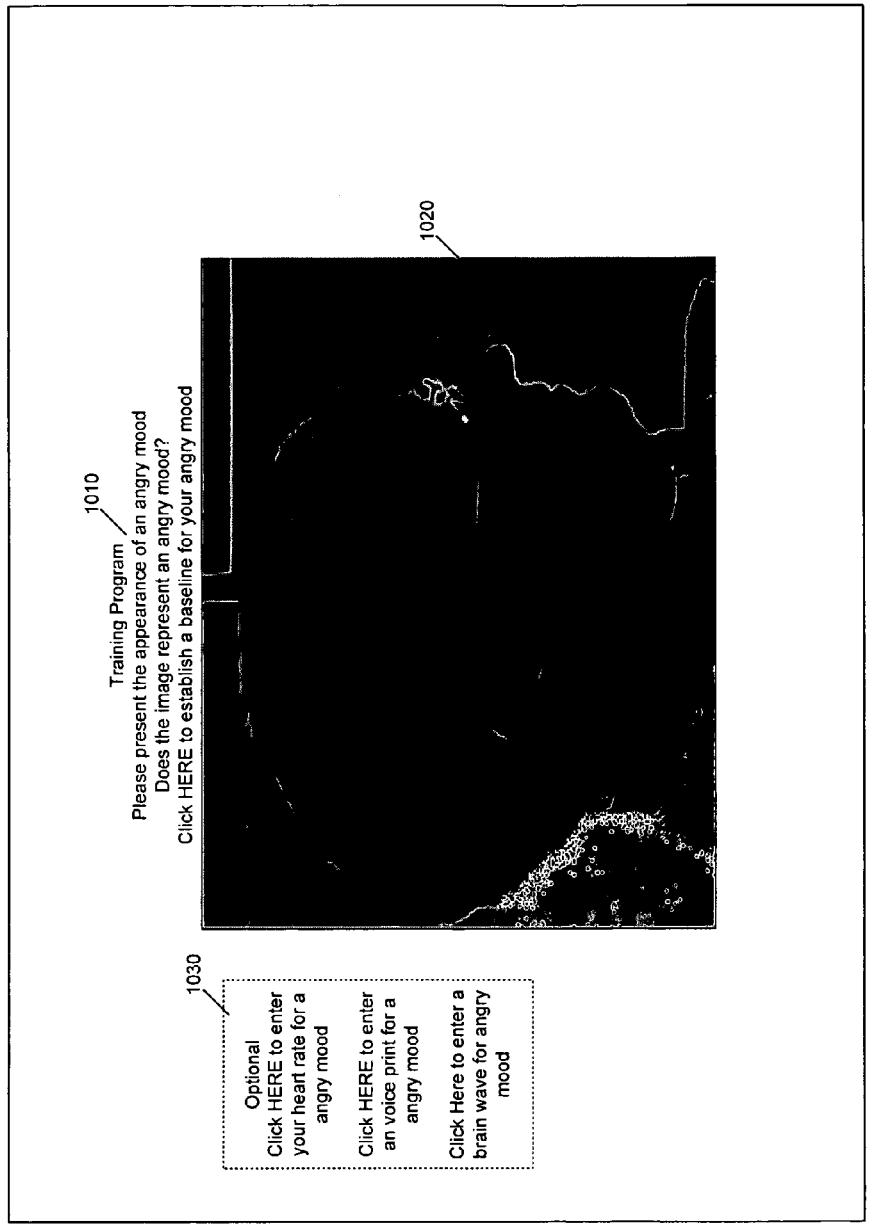

FIGS. 8-10 illustrate exemplary GUIs 800, 900, and 1000 that may be presented to a user while in training a mood recognition engine used in a mood-based playlisting system.

Although mood recognition engine may be able to adequately recognize a mood for a particular user, a training program may be used to make the mood recognition engine more accurate, account for a nonstandard facial expression/mood indication, and/or to identify which components in a facial expression should be used to determine a mood state. Generally, the exemplary training program, shown in GUIs 800, 900, and 1000, prompts a user to present a neutral, happy, and angry mood, as specified by mood prompter 810, 910, and 1010, respectively. Feedback displays 820, 920, and 1020 present an image of the user rendering the desired mood. In feedback display 820, a user's neutral mood may be determined by detecting that (1) the brow structure and lips are parallel to the user's shoulder plane of the (parallel to the horizon); (2) the lack of wrinkles around the mouth; (3) the neutral position of the eyelid; and (4) the lack of tension present in the cheeks. In contrast, feedback display 920 illustrates how the presence of the user's happy mood may be determined by detecting (1) the presence of teeth, elliptical structure of the mouth, and pronounced angular structure between the mouth and the nose indicate a smile, and thus, a happy mood state; (2) the eyelids are retracted; and (3) the brow structure is curved around the eye. Finally, feedback display 1020 illustrates how the presence of the user's angry mood may be determined by detecting (1) the declining dip at the peripheral of the mouth; (2) the tension of muscles in the forehead and the cheek; (3) the orientation of the eyelid over the eye; and (4) the downward structure of the interior portion of the brow over the nose. Note that FIGS. 8-10 illustrate how both frontal and portrait (from the side) images may be used to determine the actual mood.

The pronouncement of the features used to identify a mood may vary between users. For example, in some users, anger may not be determined unless pronounced wrinkles are detected in the forehead, while in other users (e.g., the user shown in FIG. 10) minimal tension may be used to determine anger. Also, FIGS. 9 and 10 illustrate that even when a common feature is present in more than one mood (e.g., the presence of the pronounced angular structure between the peripheral of the mouth and the nose), other facial features may be used to infer mood. In response to viewing the feedback display, a user may alter a facial expression to present a mood likely to be responsive and/or likely to resemble an actual mood.

The user may provide additional mood determination information using alternate sensor gateways 830, 930, and 1030. The alternate sensor gateway allows a user to enter a heart rate, voice print and/or brain wave during the mood training process so that the heart rate, voice print, and brain wave metrics may be used in the future to better determine a mood.

Although FIGS. 8-10 described a user actively training a mood recognition engine, a mood-based playlisting system may use passive training techniques and/or more subtle training techniques. To illustrate a passive training system, a mood-based playlisting system may play a content selection, and analyze the responsive facial expressions as a baseline indicative of a particular mood. In a slightly more active training system, a content selection is played without asking the user to present a particular expression during which an image of the user is captured. In response to the content selection, and/or perceiving their image, the user is prompted to indicate a mood during the content selection. The mood-based playlisting system then may ask the user if the image is indicative of the mood provided by the user. Moreover, if the image is not indicative of expressed mood, the user may advance through a series of images captured during the rendering of the content selection to identify an image associated with the indicated mood. Another example used separately or addition to previously described examples allows a user to identify one or more components in a facial expression indicative of the desired mood (e.g., by allowing the user to highlight a brow structure, a lip structure such as a smile, or an existence of wrinkles in a particular portion).

FIG. 11 is an exemplary listing of variables 1100 illustrating how facial components may be used to generate a mood. Although listing 1100 relates to an exemplary configuration variables, the listing 1100 also may be presented in a GUI enabling a user to identify which components may be used in a mood-based playlisting system.

Listing 1100 includes hair-related descriptors including a position of hairline 1110, a presence of hand on the hair 1111, and a presence/type of hat 1112. Examples of using the position of the hairline 1110 may indicate an incredulous/surprised mood when the position of the hairline is forward, a stressed/expressed expression when the hairline is pulled back, and an indeterminate mood when the hairline is in a neutral position. The presence of a hand on the head 1111 may indicate a stressed mood (e.g., pulling hair out in frustration), tired (e.g., running two hands through the hair), or 'cool' (e.g., running one hand through the hair). A presence/type of hat indicator 1112 may indicate an athletic mood when the hat is a baseball cap (e.g., upbeat, excited), cockiness/arrogance (e.g., wearing a hat backwards), or formality (e.g., a Sunday bonnet).

The presence/existence/position of wrinkles 1120 may indicate mood and/or state, for example, through the indication of pain when wrinkles appear in the cheek, happiness when angled wrinkles appear around a smile, skepticism/bewilderment when wrinkles appear in the forehead, and unease when concentric wrinkles appear around the mouth.

The presence/position of facial muscles and/or of tension in the muscles 1130 may be used to indicate intensity or determination when the lateral facial or forehead muscles are tense, or relaxedness/contentment when the muscles are not being used.

The orientation of the eye structure 1131 may indicate unease/skepticism with a squint, shock or unbelief with an open eye structure, anger with a slight squint, and a neutral or content mood with a normal eye orientation. Eye structure may be determined by identifying the relative positioning between constituent components (e.g., eyelash, eye line, eye-originating wrinkles, and/or the eye itself).

The brow 1140 may indicate anger/skepticism/dislike when furrowed, surprise when raised, and neutrality/happiness when raised. The angle of a furrow may indicate an intensity and/or distinguish between anger/skepticism/dislike.

The mouth structure 1150 may indicate whether a user is responsive to a content selection by mouthing the words, such as the case when the facial structure changes at a frequency appearing in a content selection. The angle of the lips and side of the mouth 1151 and the presence of teeth 1152 may further refine/identify a mood. A smile may indicate happiness, a frown may indicate unhappiness, yelling may indicate anger, and clenched lips may indicate intensity or discomfort.

The presence and/or orientation of facial hair may be used to indicate a mood, or used in conjunction with other components described previously. For example, a presence of muscles may be difficult to determine due to minimal variation in skin color or surface location. However, the tracking the movement of facial hair that mimics or corresponds to the underlying component may be easier to detect given the texture inherent in many forms of facial hair.

In addition to using a component (e.g., a beard, a mustache, a style of glasses, a hat, an earring, a piercing, and/or a tobacco product) to identify a mood, the presence or absence of a component may be used to identify a personality. For example, a goatee may be used to indicate an easygoing personality with a preference for jazz, a full beard may be used to indicate a preference for country, sunglasses may be used to indicate a personality striving for a cool appearance, a set of bifocals may be used to indicate a preference for older or classical genres of music, an earring or piercing may be used to indicate a preference for content on the fringes, a pipe may be used to indicate a preference for classical music, and a cigar may be used to indicate a preference for talk radio.

FIG. 12 is an exemplary user profile for SCREEN_NAME that relates a component in a facial expression to a mood that may be used in a mood-based playlisting system. The mood/facial components are described in a programming construct that may appear in a configuration file or that may be used as a script in a programming construct.

Rule 1210 indicates how a position of a hairline may be used to determine a mood. In the example shown, a default rule indicates that a forward hairline indicates a relaxed mood. When the hairline is set back, a tense mood is inferred which includes the set of anger, anxiety, upset and upset moods. Rule 1211 indicates how the presence of a hand on hair includes a default rule where SCREEN_NAME is deemed tense when a hand lies on the hair. Similarly, rule 1212 indicates that when a baseball cap is being used, then a mood is believed to be relaxed or happy.

Rule 1220 uses a presence and/or position of wrinkles to determine mood information. If wrinkles exist in the forehead, then the mood is determined to include a tense set that includes anger, anxiety, and/or upset moods. If vertical wrinkles exist outside a structure identified as a mouth, then the mood is determined to be anger. If vertical wrinkles exist outside of the eye, then the mood is determined to include pain.

Rule 1230 uses the presence and/or position of facial features (e.g., facial muscles) and/or of tension in the muscles to determine mood information. For example, if the cheeks are believed to be tense, then the mood may be determined to include business moods, which includes the set of anxiety and focus moods. In contrast, when the cheeks are believed to be relaxed, the mood may be described as NOT business and NOT tense moods (e.g., any or all moods except the moods found in business and tense mood sets).

Rule 1231 indicates that the orientation of eye structure may be used to determine a mood. In particular, if an eye is squinted, the mood may be deemed non-responsive, which includes skeptical, dislike, and/or pain moods. If the eye is closed, the mood is determined to include slow moods, which includes sleep, bored, and/or relaxed moods. If the eyes are believed to be wide opened, then the moods are determined to include wonder moods that include the moods of shock, amaze, and/or curiosity.

Rule 1240 indicates how brow information may be used in determining a mood. For example, brow information may include a presence of furrowed/unfurrowed brow structures and/or relate to position information. As shown, a furrowed brow is described as a downward brow or a brow with an angle less than 135 degrees.

If a brow is furrowed, then the mood is determined to include a tense mood. In contrast, an unfurrowed brow is defined as an upward brow or a brow at an angle of less than 135 degrees. If the brow is unfurrowed, then the mood is determined to include a relaxed or happy mood.

Rule 1250 describes how the presence/position of a mouth structure may be used to determine mood information. Rule 1251 indicates that the angle of lips and side of mouth may be used in determining a mood. Rule 1252 indicates that the presence of teeth in an image can be used to identify a mood. A smile is determined to exist when the end of the mouth is pointed up or teeth are determined to be together. If a smile is identified, then a mood is determined to include relaxed and happy moods. However, if teeth are identified, but the teeth are not together and a microphone detects yelling, the mood is determined to include angry moods.

As discussed earlier, rule 1260 indicates how the presence or orientation of hair facial hair may be used to determine a mood. When dreadlocks exist, the mood is determined to be reggae. If the user is unshaven, a mood may not include classical or pop. If a full beard is detected, then the mood may include rock, metal, or country music.

Rule 1270 indicates miscellaneous factors that may be used to indicate a mood. For example, when a pipe is detected, the mood may include relaxed, classical, jazz, and national public radio states.

Rule 1280 prioritizes between different moods. Depending on how the underlying mood is modeled, elements of different moods may be detected. Prioritization provides rules that resolve competing, inconsistent, or differing mood states. For example, a business mood may be favored over a happy mood. A non-responsive mood may be favored over a tense mood. If children are detected (e.g., background audio signals are identified as screaming or yelling) using the camera or microphone, then no metal music may be played.

Mood conflicts may be resolved using a number of different models. In one model, a dominant mood is identified and content responsive to the dominant mood is selected in response. For instance, imagery provided by a camera may include a smile indicating happiness, strained facial muscles indicating tension, and a set back hair line also indicating tension. In one implementation of the dominant mood model, tension is identified as a dominant mood since the majority of the detected moods indicate the user is experiencing tension. In another variation, tension may be defined as a dominant mood over happiness by virtue a rule that specifies that tension should be used as the mood even when happiness is detected. Identifying the dominant mood may include using a ranked list of moods, or a collection of relative mood preferences. Yet another variation may include deriving metrics for the magnitude of any one mood state and comparing the metrics associated with the mood. Thus if a user has a larger smile or maintains a smile over a longer duration while momentarily presenting a tense appearance, the happiness associated with the smile of the longer duration may be identified as the dominant mood.

In another model, the mood-based playlisting system may select one of several identified moods to accomplish the objective. For instance, if the mood-based playlisting system determines that a user may be experiencing tiredness, happiness, and shock, the mood-based playlisting system may attempt to work with the happiness mood to realize objectives. When a user is non-responsive to content oriented towards the happiness mood, another mood may be used.

In one implementation, several models for resolving conflicts may be used. For example, a hybrid of models may be used so that, if assimilating multiple models indicates a prevailing mood state, suggests a particular transition, or identifies a particular content selection, the indicated state, transition, or selection may be used. Separately or in addition, if user responsiveness indicates that one model is more effective than another model, the more effective model may be used for those configurations and environments for which the more effective model is deemed effective. When configuration and environmental data indicates that another model is more effective, then the other model may be used.

Rule 1290 allows a mood state to be more customized, that is, more precisely tailored to associate content with a mood. The customization may be applied to a subscriber community, a listening audience associated with an Internet radio station, a demographic, or user. For example, rock has been modified to exclude ARTIST1 and ARTIST2. A talk mood has been modified to exclude TALK_SHOW_HOST_1. Happy includes METAL and ROCK and does not include POP unless ARTIST3 is singing or SONG4 is provided.

Figure 13:
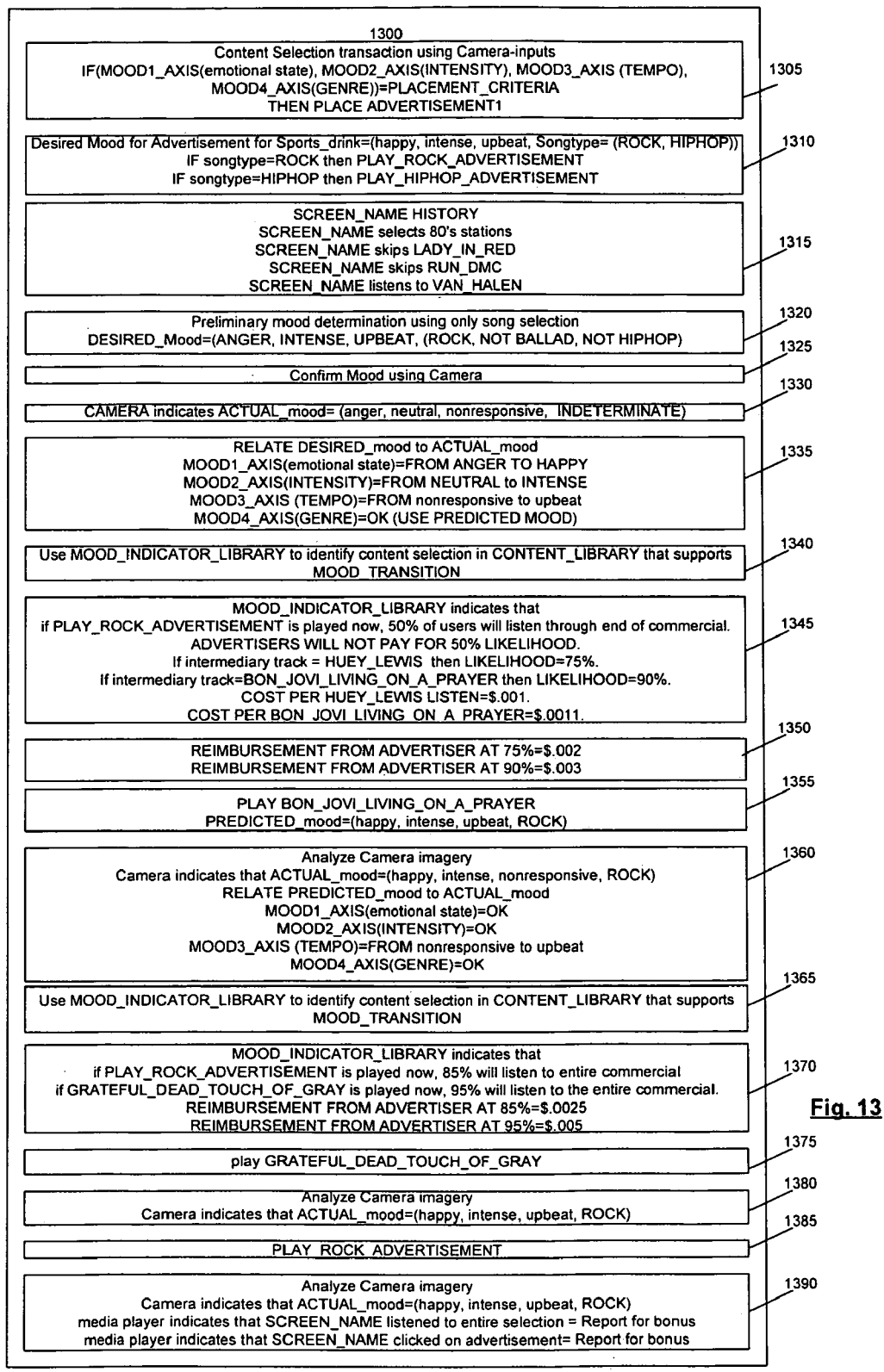
FIG. 13 illustrates an exemplary scripted sequence of operations for a mood-based playlisting system configured to provide content using mood-based selection criteria based in part on a camera to provide mood information.

FIG. 13 illustrates an exemplary scripted sequence of operations 1300 for a mood-based playlisting system configured to provide content using mood-based selection criteria based, relying in part, on a camera to provide mood information. Generally, sequence 1300 represents the operations that are performed and the results that are realized using the mood-based playlisting system with camera inputs. In one implementation, the sequence of operations 1300 represents actual entries appearing in a log used by a mood-based playlisting system. In another example, the sequence of operations 1300 represents a sequence of procedural calls and resultant data.

Operation 1305 is a conditional function that specifies placement of ADVERTISEMENT1 in response to the condition that an emotional state, an intensity, a tempo, a genre lead to PLACEMENT_CRITERIA. For example, rule 1305 may be invoked in anticipation of or upon reaching of a commercial break at the end of a sequence of content selections.

Operation 1310 indicates that an advertisement for a sports drink should be played when the mood is happy, intense, upbeat, and the song type (e.g., genre) is rock or hip hop. When the song type is rock, then a rock advertisement should be placed. When the song type is hip hop, then a hip hop advertisement may be placed.

Operation 1315 provides a history for an online identity identified as SCREEN_NAME. The history may be used to understand or determine a user's perceived mood state and/or recent transitions in mood. Thus, a user may have selected an 80's station, skipped the "The Lady in Red" and Run DMC, and listened to Van Halen in the preceding sequence. A preliminary mood determination is made using only the previous sequence. As a result, operation 1320 predicts a mood state as anger, intense, upbeat, rock, not ballad (e.g., based on the user skipping the ballad "The Lady in Red"), and not hip hop (e.g., based on the user skipping hip hop songs by Run DMC). Thus, past perceived mood transitions may be used as a basis for future determination of how/whether/when to invoke transitions from their current mood to a desired mood. A log of past perceived mood transitions may be recorded for a user (or community of users). The log may record a user's facial expressions captured during the course of the rendering content selections so that the perceived mood transition is based on imagery-based mood state determinations.

Operation 1325 specifies that the mood should be confirmed using a camera. In operation 1330, the camera indicates that the actual mood is anger, neutral, non-responsive, and indeterminate.

Thus, as a result, the desired mood state may be related to the actual mood state. As shown in operation 1335, differences between the desired mood state and the actual mood state may be used to indicate that the user needs to transition from anger to happy, from neutral to intense, and from non-responsive to upbeat. If the genre is ok, and the existing mood may be used.

In operation 1340, the mood indicator library is queried to identify a content selection that supports the transition.

In response to the query, in operation 1345, the mood indicator library (e.g., mood indicator library 340 in FIG. 3) returns data indicating that if a rock advertisement is placed, 50% of users will listen through the end of commercial. The mood indicator library also indicates that advertisers will not pay for a 50% retention. If Huey Lewis is used as an intermediary track before the commercial, then the retention likelihood becomes 75%. On the other hand, if the intermediary track includes Bon Jovi's "Living on a Prayer", the likelihood is 90%. The cost per Huey Lewis is $0.0001 per listener, the cost per Bon Jovi is $0.0011. The reimbursement from the advertiser is 75% while the reimbursement at 90% is $0.003

As a result, Bon Jovi living on a prayer is selected in operation 1355. The predicted mood is happy, intense, upbeat, and rock. The differences in cost compared to efficiency need not be the determinative factor. For example, some advertisers may go to extraordinary lengths to preserve brand awareness or perception (e.g., is the advertised product deem "cool"). One measure of brand awareness may include retention rates. Thus, an advertiser concerned about brand perception may pay a premium to ensure the highest retention.

In operation 1360, imagery data is analyzed to determine the actual mood. For example, data from the camera indicates that the actual mood is happy, intense, non-responsive, and rock. The predicted mood is related to the actual mood. The emotional state, tempo, and genre are acceptable. However, the intensity needs to change from non-responsive to upbeat.

To change the intensity from non-responsive to upbeat, the mood indicator library is queried to provide a content selection that supports the mood transition. In operation 1370, the mood indicator library indicates that 85% will listen to entire commercial if the rock advertisement is played now, and that 95% will listen to the entire commercial if the Grateful Dead's "Touch of Gray" is played. As a result, the advertiser reimbursement at 85% is $0.0025 while the reimbursement at 95% is $0.005. To realize the increased reimbursement, a "Touch of Gray" is played in operation 1375.

The camera is used confirm that the actual mood is in fact happy, intense, upbeat, and rock (in operation 1380), and that the rock advertisement is played in operation 1385.

To confirm recipient response, the camera is used to generate imagery data, which confirms that the actual mood during the rock advertisement was happy, intense, upbeat, and rock. In operation 1390, the media player indicates that SCREEN_NAME listened to entire selection and that the user selected the advertisement, entitling advertiser to a bonus.

Figure 14:
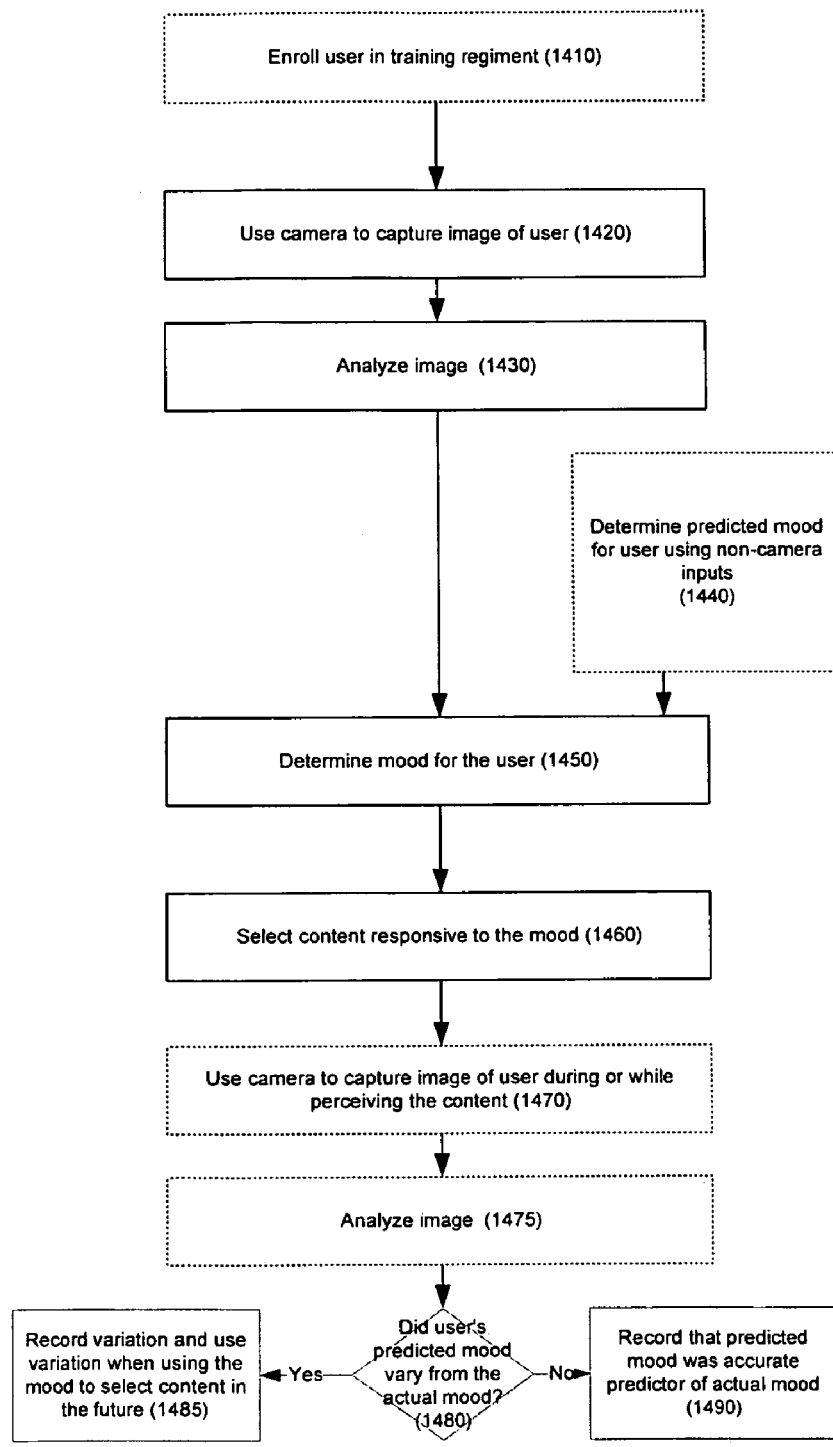
FIG. 14 is a flow chart of an exemplary process by which a user's mood variations may be recorded.

FIG. 14 is a flow chart of an exemplary process 1400 by which a user's mood variations may be recorded. Generally, the operations in process 1400 may be used in conjunction with the systems and configures described elsewhere in the document. For example, at operation 1450, the underlying mood models described with respect to FIGS. 2A-2D, 12, and 13 may be used to determine a mood for the user and select content responsive to the mood. Moreover, the operations may be performed on the player 130 and/or the mood-based playlisting system 300 described in FIGS. 1 and 3, respectively. For convenience, particular components and messaging formats described earlier are referenced as performing the process. However, similar methodologies may be applied in other implementations where different components are used to define the structure of the system, or where the functionality is distributed differently among the components shown.

Initially, a user is enrolled in a training regimen (1410). For example, a user may be presented with a content selection and asked to specify a resultant mood. In another example, a user is asked to present a face associated with different moods. One example of a training regimen is shown in FIGS. 8-10.

Once the mood-based playlisting system has been trained, a camera is used to capture an image of the user (1420) and the image is analyzed (1430). For example, the image may be analyzed using the rules and configures described in FIGS. 12 and 13. In addition, the predicted mood may be optionally determined using non-camera inputs (1440). For example, the mood-based playlisting system may determine a mood based on a selected station or channel or by reference a past historical reference for a user's mood.

The mood is determined for the user (1450), and content responsive to the mood is selected (1460). A camera is used to capture an image of the user during or while perceiving the content (1470), and the image is analyzed to determine an actual mood state (1480).

The mood-based playlisting system determines whether a predicted mood varies from the actual mood (1480). If so, the variation is recorded and used when selecting content in the future (1485). If not, the mood-based playlisting system may record that the predicted mood was an accurate predictor of the actual mood (1490). For example, the variation or accuracy may be provided to the mood indicator library 340 described in FIG. 3.

Figure 15:
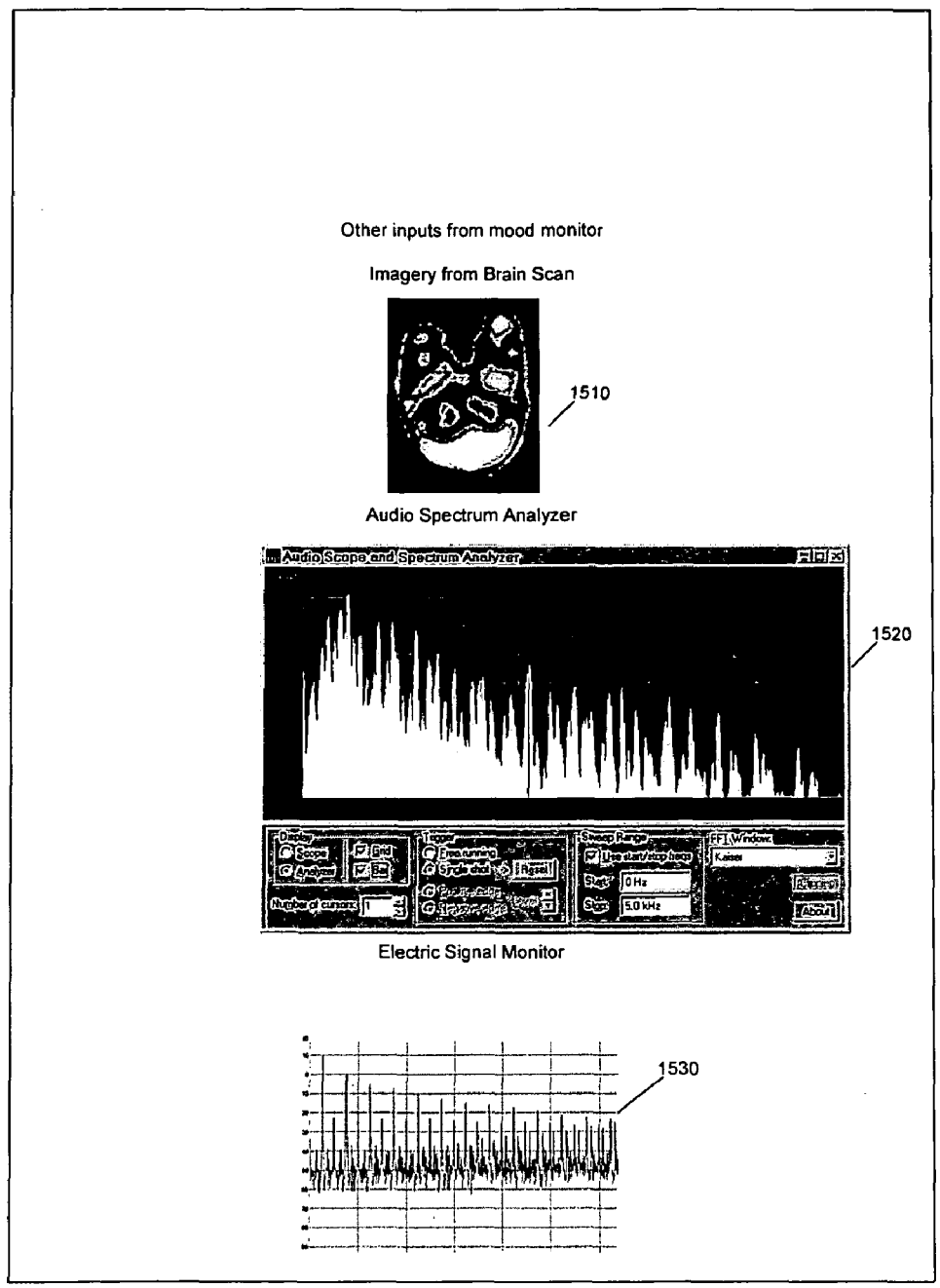
FIG. 15 is an exemplary GUI that illustrates how different inputs may be used as a mood sensor into a mood-based playlisting system.

FIG. 15 is an exemplary GUI 1500 that illustrates how different inputs may be used as a mood sensor into a mood-based playlisting system. While data provided by the sensors may differ from other data provided by other sensors in the mood-based playlisting system, the data provided by the sensors shown in GUI 1500 may be associated with different mood states and used in a mood-based playlisting system. Furthermore, while some sensors may use a different form factor that constrains where the sensors may be used, using different sensors in different circumstances enables the mood-based playlisting system to realize feature sets difficult to otherwise achieve. For example, interface 1510 illustrates neural activity in imagery provided by a brain scan. In some implementations, the form factor of the radiology equipment may limit the use of the radiology equipment to laboratory and medical environments. However, the radiology equipment may provide a degree of accuracy not easily obtained through other sensors. And, the data provided by the radiology equipment may be used to generate a more sophisticated model, which in turn may lead to more accurate results. As shown, the interface 1510 indicates neural activity in a particular area of the brain associated with a particular mood.

Interface 1520 illustrates data provided by an audio spectrum analyzer. Mood information may be derived by associating a certain frequency or arrangement of frequencies with a mood.

Interface 1530 illustrates data provided by an electronic signal monitor. For example, synaptic activity indicative of a mood state may be detected by a probe attached to the user. The relative intensity or frequency may be used to indicate a mood state for the attached user. In one implementation, a degree of tension may be determined and used to generate the mood state.

Other implementations are within the scope of the following claims. For example, although the mood-based playlisting system has been described in the context of a distributed system that may support multiple devices, the mood-based playlisting system may be distributed across multiple systems and/or reside at a client device. One example of the mood-based playlisting system being distributed across multiple devices may include having a portion of the mood-based playlisting system that operates in a data center where the content library and mood indicator library reside. The data center systems may interface with software that operates a mood calculator and content retrieval program to retrieve the content library from the central systems.

Alternatively, the mood-based playlisting system may be more client-focused and may perform more operations on the client. For example, the mood-based playlisting system described in FIG. 3 may be implemented on a personal audio system. The personal audio system may store multiple selections of content in memory and generate the playlist that maintains the mood of the content that has been stored. Alternatively, the mood-based playlisting system may include a network-based device that implements the content selection and playlisting on the client device but retrieves content from a network-based content library.

The mood-based playlisting system may be configured to preserve some measure of variation within the playlist. Thus, the mood-based playlisting system may be configured to recognize that if three country ballads having moods that have been gauged as depressing are played, the playlist should then select a country song having a mood that has been gauged as uplifting. The variation rules may be described digitally and distributed as programming criteria alongside or in conjunction with other licensing restrictions. For example, a license may govern the frequency with which an artist or song may be played. In addition to the frequency licensing restrictions, the content distributor may distribute a mood-based playlisting rule set along with an electronic library to regulate access to the content.

Although the mood has been described in the context of content being played, other techniques may be used to infer the mood. For example, the client device may monitor how the user interfaces with the media player. Monitoring a volume level, monitoring changes to the volume level, and monitoring whether a user changes an Internet radio station are examples of operations that may be used to infer the mood. For example, when a media player detects that a user reduces the volume level when a new track begins, the media player may determine that the user is experiencing a less intense mood. In contrast, when the user increases the volume, the media player may determine that the user's mood intensifies.

The user interaction with the media player also may be analyzed with respect to the content that is accessed. For example, if the user skips to the next track immediately after accessing a new track, the media player may determine that the user's mood does not like the skipped track. The user's action may be extrapolated so that a mood that is the inverse of the mood of the rejected content is inferred. To illustrate, a user may initially select a country music Internet Radio station. The sequence of content transmitted to the user may include a country rock song, followed by a country ballad, followed by a country rock song. When the user listens to the first country rock song, skips the country ballad, and listens to the second country rock song, the media player (or host) may determine that the user's mood reflects a preference for country rock.

Although the description of a mood indication made distinctions between the style and genre, the mood indications also may be made with respect to other factors, including the artist, the tempo, the era in which the content originated, the album, and/or other categorization. For other forms of media (e.g., video or data), the mood indications may include moods related to the identity of the producer, director, actors, and/or content rating (child, teen, all-ages) in addition to the category of the programming.

Analyzing the user's interactions to determine the mood is not limited to the user's interaction with a media player. A user's interaction with an Instant Messaging program, an electronic mail program, or an Internet Web browser are examples of other user activities that may be used to determine the mood. Thus, when a user is typing quickly and exchanging messages with many other users, an intense mood may be inferred. In contrast, when the user is determined to be reading web pages at a slower pace, a relaxed mood may be inferred. The content in the user interaction also may be used in determining the mood. Thus, the content appearing in a web page accessed by the user may be used to determine the mood for the user.

Although many of the previously described examples link a certain activity or type of content with a certain mood, the examples illustrate just one mood that can be associated with an activity. Other moods may be associated with the activity or type of content. A selection of content or a user activity also may be associated with multiple moods. An example of content with multiple moods may include a song with an uplifting melody and depressing lyrics. A mood-based playlisting system may use either or both moods in selecting future content. If the mood-based playlisting system sought to place an advertisement/product with the uplifting mood indication, the mood-based playlisting system may incorporate the uplifting mood in the transition. If the mood-based playlisting system did not have an intended mood destination in mind, the mood-based playlisting system may continue to select content with multiple mood elements to allow for an easier transition to a wider variety of content. A larger mood volume may represent the multiple elements with greater dimensions across multiple axes.

Although the mood-based playlisting system has been described using playlists, the mood-based playlisting system need not assemble an actual playlist of songs. Rather, the content selection may be made on a selection-by-selection basis. The list of songs selected in this manner may form a playlist.

Although the mood-based playlisting system has been described in the context of determining the mood state for a user, the mood-based playlisting system may be used to determine a mood state and select content for a group of users. This may include selecting content for large Internet audiences. For example, the individual mood states for individual members of a large audience may be aggregated to determine a collective mood state for the large audience.

In one example, the determining collective mood state may include sampling individual members of the audience for their mood states and using the sampled mood information to generate a collective mood state. In another example, an audience listening to one content source may be analyzed as a collection of groups. The mood-based playlisting system may analyze each individual group to determine whether the mood state of the group is consistent with the content being selected. When the mood state for one of the groups indicates that the mood state for the group is not compatible with the mood state for a content selection, the mood-based playlisting system may reconfigure the selection of content. In one example, the group experiencing the mood state incompatibility may be transitioned to a different stream/playlist to preserve the mood state compatibility. In another example, the mood-based playlisting system may select different content designed to retain the group experiencing the mood state incompatibility. This may include determining that more users are likely to be retained from the group experiencing the mood state incompatibility than are lost from other groups not experiencing the mood state incompatibility.

The mood-based playlisting system may disperse and group users. Users may be grouped to reduce costs, to take advantage of discounts for larger audiences, and to allow a limited pool of content to serve a larger community. This may include transmitting the same advertisement or segment lead to multiple users. The mood-based playlisting system also may disperse users from a common group. For example, a group of users may be accessing a host to access a popular selection of content. The mood-based playlisting system then may personalize the content based on the determined mood so, that the users are retained at a higher rate using the mood-based playlisting system.

The mood-based playlisting system may normalize a mood indication to a designated location or region. The normalization may be done irrespective of whether targeted content is designated for the user. For example, the mood-based playlisting system may determine that operating a playlist in a certain mood spectrum or volume retains listeners at a greater rate. In another example, the mood indication for the user is operated in a specified range so that the user may be more receptive to communications delivered through other channels. This may include, for example, an advertisement on television, an electronic mail message, a telephone call, a Web-based advertisement, or an instant message. In yet another example, an advertiser may want a certain mood to be associated with a product. For example, a marketing firm may want a 'happy' mood associated with the firm's content.

When calculating a mood transition, the mood-based playlisting system may reexamine the actual mood state during the transition and determine if the actual mood state matches the intended mood state. For example, although the mood state of the content may indicate that a user should be in a relaxed mood, the user's activities on their client may indicate that the user's mood state is not mellow (e.g., the user is experiencing stress or anxiety). The mood-based playlisting system may dynamically respond to the actual mood state. In one example, the mood-based playlisting system may select content associated with a different mood destination that is more compatible with the user's actual mood state. Thus, instead of playing an advertisement associated with a mellow mood, the mood-based playlisting system may select an advertisement with a mood that is compatible with the actual mood of the user.

The mood based-playlisting system may include a detailed records system for reporting and accounting. For example, the mood-based playlisting system may record the moods of the user, the mood transition between tracks, and the percentage of users that are retained for the transition. Other records may include advertising effectiveness based on the mood, and user listening habits (e.g., duration, user preferences). The records may be refined in an automated manner to develop mood trending information. The mood-based playlisting system may generate automated reports for system administrators and advertisers to improve the enjoyment, effectiveness, and/or success of the mood-based playlisting system. This may include a report indicating that a different programming sequence may result in an increased response rate to an advertisement.

The mood-based reporting system may transmit several different sequences of content to determine the relative efficacy of the different sequences. The mood-based reporting system then may present the results to a system administrator and enable the system administrator to control future content selection using the reported relative efficacy information. The reporting system may present results using different mood metrics. For example, a first report may be based on only the mood of the content while a second report may gauge the user interaction with the media player. The reporting system then may analyze the differences, and interpret the variation. The interpretation of the variation then may be used by a system administrator to plan future programming.

In another implementation, a computer program may be configured to manage content accessed by a user by using a mood-based playlisting system to plot a transition from a first track to a second track using at least one intermediary track. A mood originating point may be determined for the first track, and an intermediary track configured to realize a specified mood transition may be selected. The intermediary track may be rendered and a camera may be used to capture an image of the user during the rendering of the content. The image may be analyzed to realize an actual mood state, and the actual mood state may be used to determine if the specified mood transition has been realized. When the specified mood transition has been realized, the transition may proceed. When the specified mood transition has not been realized, the actual mood may be used to select a different transition track.

In still another variation, a computer program may be configured to manage electronic content made available to users. A first content selection may be rendered, and a camera may be used to capture an image of the user during rendering. The image may be analyzed to determine an actual mood indicator for the user. A mood spectrum may be determined to describe other mood indicators that are consistent with the actual mood. Finally, a next content selection may be selected having a second mood indicator that lies within the mood spectrum.

Organization and Display of Visual Interfaces

A graphical user interface (GUI) may present mood information about users in a network. Although earlier parts of this document describe playlisting for users based on a user's mood information, in the context of presenting mood information about more than one user, the term "co-user" is adopted. The term "co-user" indicates that multiple users (e.g., co-users) are each part of a network of co-users and may view mood information about each other. For example, a co-user's screen name appearing in an America Online (AOL) Instant Messenger's Buddy List may indicate the co-user's mood, such as "happy," "sad," "silly," or "angry." In another example, a co-user's mood may be more subtly defined as a combination of moods or a particular point on a spectrum of a mood from "happy" to "sad", from "tired" to "energetic," or from "good" to "evil." The term "user" is adopted to describe a person who "owns," or operates a co-user list in which other users (e.g., "co-users") are listed along with the co-user's mood.

Figure 16:
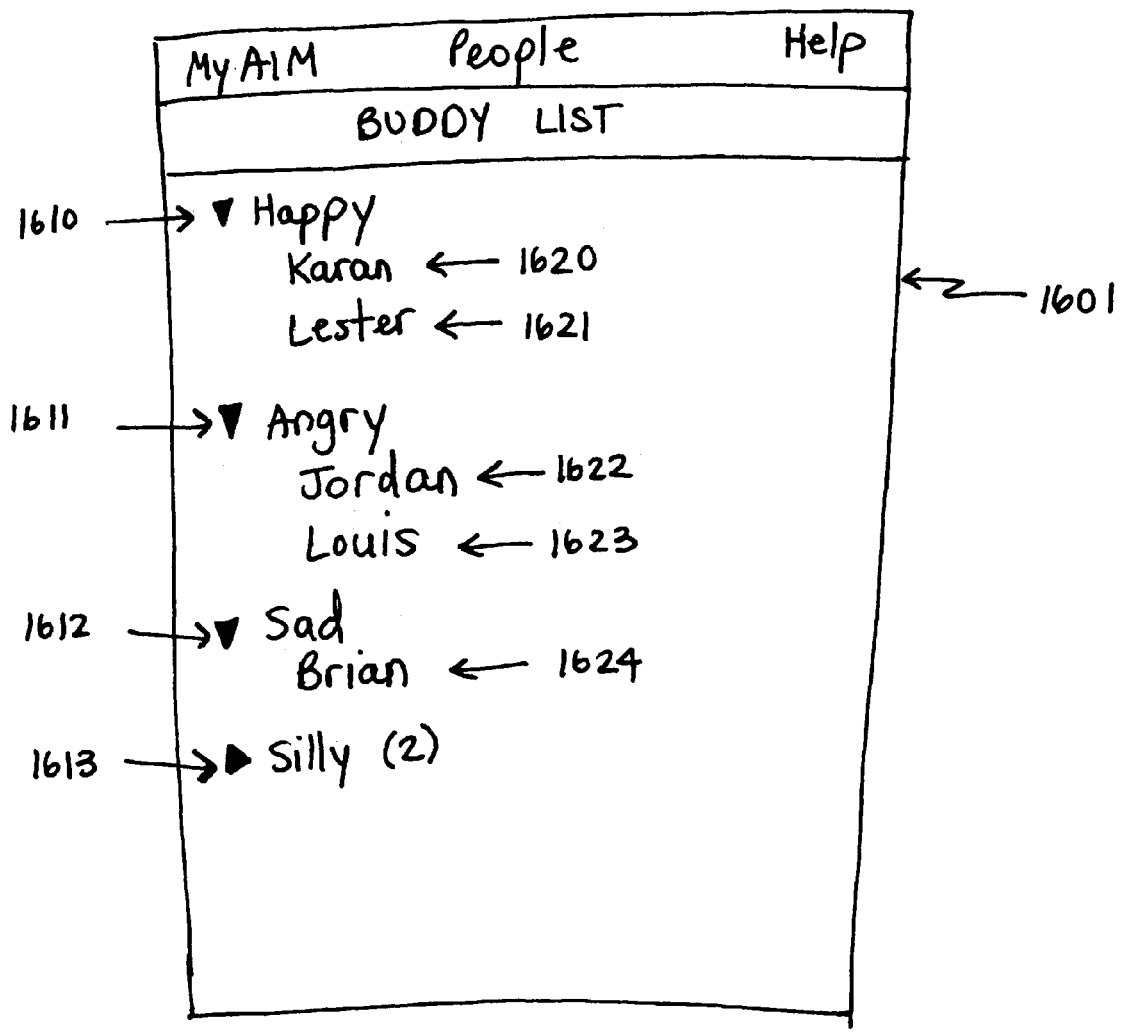
FIGS. 16 and 17 are exemplary graphical user interfaces (GUIs) displaying a list of co-users organized by mood.

FIG. 16 is an exemplary graphical user interface (GUI) 1600 displaying a list of co-users organized by mood. The GUI 1600 includes a co-user list 1601 with mood elements 1610-1613, and co-user elements 1620-1624. A co-user list is user-defined in that the user may determine which co-users are to be part of the user's co-user list. For example, a user may have one hundred co-workers, but may only add fifty of the co-workers to the user's co-user list. Additionally, a co-user list is presence conveying. A user may determine whether a particular co-user is available for communication based on the location of the co-user's name within the co-user list. For example, a co-user listed as "offline," or having a grayed out co-user element, is not currently available for communication, while a co-user having a bright co-user element, or is in an "online" group, is currently available for communication.

Furthermore, a co-user list enables nearly instantaneous communications. The indication of a co-user's presence as available or unavailable for communication takes place in real-time. For example, as soon as a user logs in to the co-user network, co-users having the newly logged in user on their co-user list may automatically and instantaneously perceive the user's new status.

A co-user list is also "noisy" in that the co-user list may overlap any other ongoing application interfaces. For example, a co-user list may be perceivable on a co-user's computer desktop (or other device, such as a cellular phone, personal digital assistant, etc.) regardless of what other applications are currently running and whether the user is constantly, or consistently, paying attention to the co-user list.

The four mood elements shown in FIG. 16 include a happy mood element 1610, an angry mood element 1611, a sad mood element 1612, and a silly mood element 1613. Each mood element represents a mood that may be associated with one or more co-users.

The GUI 1600 also includes co-user elements 1620-1624. The co-user elements 1620-1624 each represent a particular co-user. For example, Karan's co-user element 1620 represents the co-user who maintains Karan as their online identity. The string "Karan" may be a co-user ID, such as an AOL Instant Messenger screen name, or alternatively the co-user may have associated an equivalent network ID with an actual name or nickname.

A co-user may be associated with one of the moods related to the four mood elements. Each of the co-user elements 1620-1624 may be positioned below a particular mood element enabling a viewer to perceive the moods of co-users represented by co-user elements 1620-1624. Karan's co-user element 1620 and Lester's co-user element 1621 are positioned below the happy mood element 1610, indicating that Karan and Lester are each in a happy mood. Jordan's co-user element 1622 and Louis's co-user element 1623 are positioned below the angry mood element 1611 to indicate that Jordan and Louis are each in an angry mood. Brian's co-user element 1624 is positioned below the sad mood element 1612 to indicate that Brian is in a sad mood. The "(2)" 1651 displayed to the right of the silly mood element indicates that two of the co-users are in a silly mood. The rightward facing arrow 1652 indicates that the silly co-users are hidden from display. A co-user may view the silly co-users by clicking on the rightward facing arrow to update the co-user GUI 1600 to include co-user elements for the silly co-users.

In some implementations, a co-user's mood may be represented in a way other than in reference to a correlating mood element, such as mood elements 1610-1613. Changes in a font used to display a co-user element, such as co-user elements 1620-1624, also may be used to indicate mood. For example, bright, large lettering may be used to indicate a happy mood, while small, dingy lettering may be used to indicate a sad mood. Furthermore, a user may be able to right-click on a co-user element to reveal a mood panel. The mood panel may indicate or suggest a mood for the co-user by way of, for example, a mood score (e.g., a mood score of 95 relates to happy, while a mood score of 15 relates to sad), a mood label (e.g., "happy"), or an icon (e.g., a smiley face icon indicates a happy mood). Each of the numerous methods described in this document for indicating a co-user's mood is individually sufficient to indicate the mood of a particular co-user. However, use of more than one of the methods for indicating mood may be desired by a particular co-user and thus may be so provided.

In the implementation depicted in FIG. 16, each mood element represents a particular mood. In another implementation, a mood element may be configured to represent a mood that is a combination of two or more moods. For example, instead of having a single mood element to represent a happy mood, there may be two mood elements: a first mood element serving to identify co-users who are happy and energetic, and a second mood element serving to identify co-users who are happy and relaxed.

In one implementation, a co-user list has an organizational structure that is distinct from an organization based on mood. For example, a co-user list may be organized based on the relationship of each listed co-user to the user who owns the co-user list. Alternatively, the mood-based organization may be displayed in conjunction with the non-mood-based organization. For example, a co-user list may be organized based on relationships and the co-users within each relationship may be further organized based on mood.

Figure 17:
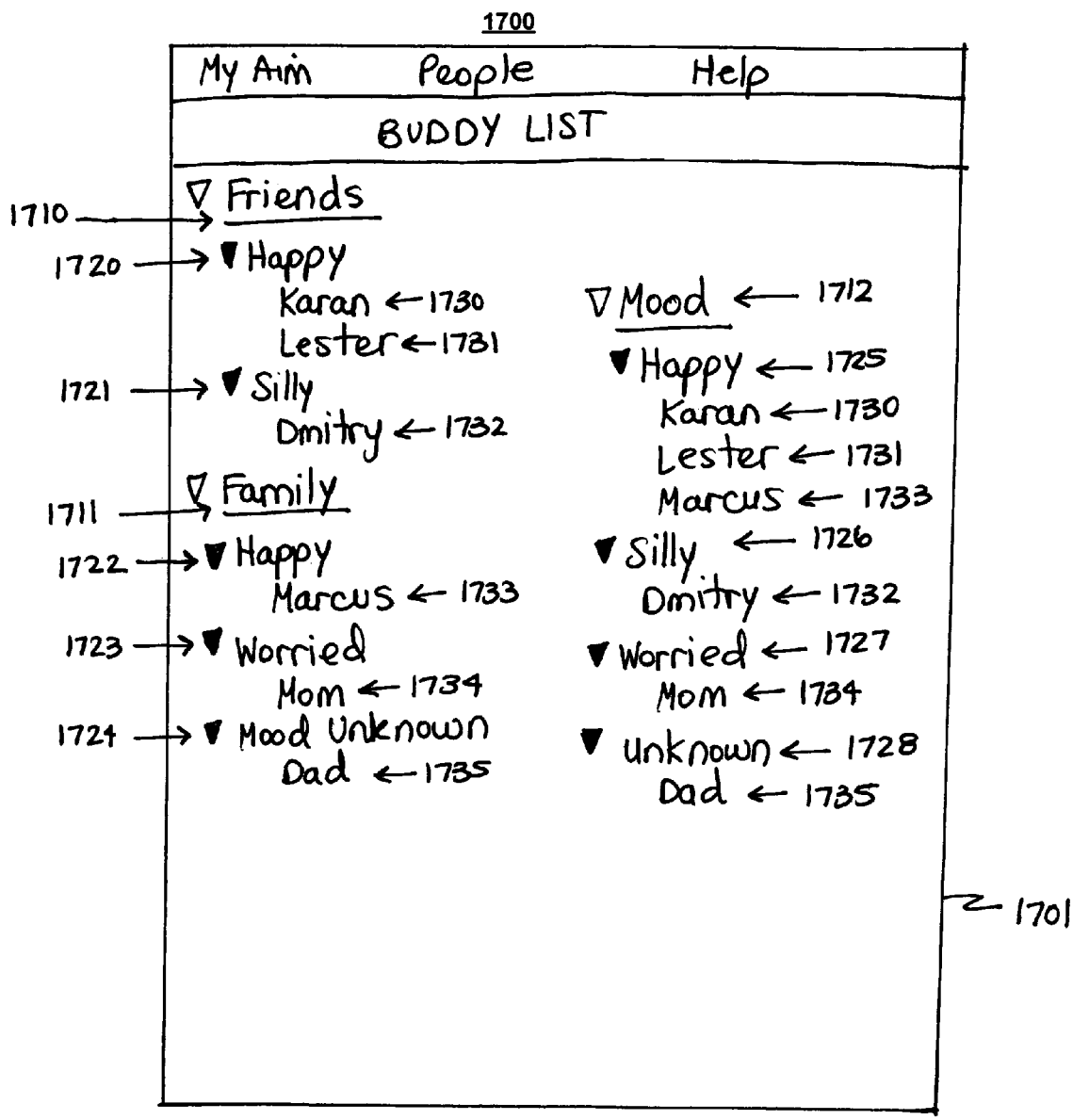

FIG. 17 is an exemplary graphical user interface (GUI) 1700 for a list of co-users organized by mood. More particularly, FIG. 17 shows a co-user list 1701 where co-user elements are displayed hierarchically to categorize users based on both a mood attribute and a non-mood attribute. The top level of the hierarchical display includes non-mood attribute elements 1710-1711. The second level of the hierarchical display includes mood elements 1720-1724, which are similar to mood elements 1610-1613 of FIG. 16. The lowest level of the hierarchical display includes co-user elements 1730-1735, which are similar to co-user elements 1620-1624 of FIG. 16.

The non-mood attribute elements 1710-1711, mood elements 1720-1724, and co-user elements 1730-1735 are arranged in a hierarchical fashion enabling a user to perceive both mood and non-mood attributes of the co-users within the co-user list. For example, because Karan's co-user element 1730 is located below the happy mood element 1720, and the happy mood element 1720 is located below the friends mood element 1710, a user may easily perceive that Karan is a friend (the non-mood attribute), and that Karan is in a happy mood (the mood attribute). Another useful aspect of associating mood organization with non-mood attribute organization is the ability of the user to monitor the moods of only a sub-set of co-users, for example, where a user is only interested in communicating with family members who are happy.

Co-user list 1701 also shows co-user elements categorized based on mood attributes. More particularly, the co-user list 1701 includes a top level category 1712 indicating the portion of co-user list 1701 displaying co-user elements based on mood attribute. The second level of the display beneath category 1712 includes mood elements 1725-1728. Mood elements 1725-1728 correspond to mood elements 1720-1724 in that the mood category of co-user list 1701 includes all moods listed beneath the non-mood attributes 1710-1711. The lowest level of the display beneath category 1712 includes co-user elements 1730-1735, which are the same co-user elements as displayed beneath non-mood attributes 1710-17111.

For example, Karan's co-user element 1730, along with co-user element 1731 for Lester and co-user element 1733 for Marcus, are listed below the happy mood element 1725. A user may perceive that Karan, Lester and Marcus are in a happy mood due to their placement under happy mood elements 1720 and 1722 in the non-mood attribute display portion of co-user list 1701. However, if a user wishes to perceive all co-users that are in a happy mood, top level category 1712 organizes co-user elements within the happy mood element 1725 in the mood-based attribute portion of co-user list 1701. Thus, the user need not scan each of the non-mood attribute element portions of co-user list 1701 seeking co-users in a happy mood.

To group co-user elements by mood within a non-mood group, such as friends, a user may right-click on the non-mood group label. By doing so, the user may be presented with a menu where the user may select an item labeled, for example, "organize co-users within this group by mood." The co-users within the friends group may then be further organized based on mood information associated with each of the friend co-users. Alternatively, if a user no longer wishes to view the co-user list organized based on the mood attributes, the user may again right-click on the friends label and select an item labeled, for example, "do not organize co-users within this group by mood" from the menu. Thus, the display of the co-user list is responsive to the user's request and is based on the user's preferences. Furthermore, the co-user list may be displayed differently in response to a change in the user's preference.

In one implementation, co-users are grouped into moods that are predefined by an intermediary, such as a co-user list. A co-user may be assigned to a particular group by determining which group is associated with a mood that most closely resembles a mood of the co-user. In implementations where moods are defined by a multi-dimensional space, a particular group may be selected, or organized, by finding the minimum distance between the determined mood value for the co-user and a reference mood value for each of more than one particular mood states.

In another implementation, a mood element may be configured to represent a combination of mood and non-mood information. For example, a mood element may indicate (1) that a particular co-user is sad, and (2) the likelihood that the sad co-user may correspond with other co-users while the co-user is in the sad mood, where the likelihood may be represented by, for example, the number of times in the past the sad co-user has corresponded with other co-users while in a sad mood or the percentage of times the co-user has corresponded with other co-users while in a sad mood.

In yet another implementation, some or all of the mood groups may be defined by the user. For example, a user may define a mood group by giving the mood group a name and indicating portions of the multi-dimensional space for which the mood group is representative.

Figure 18:
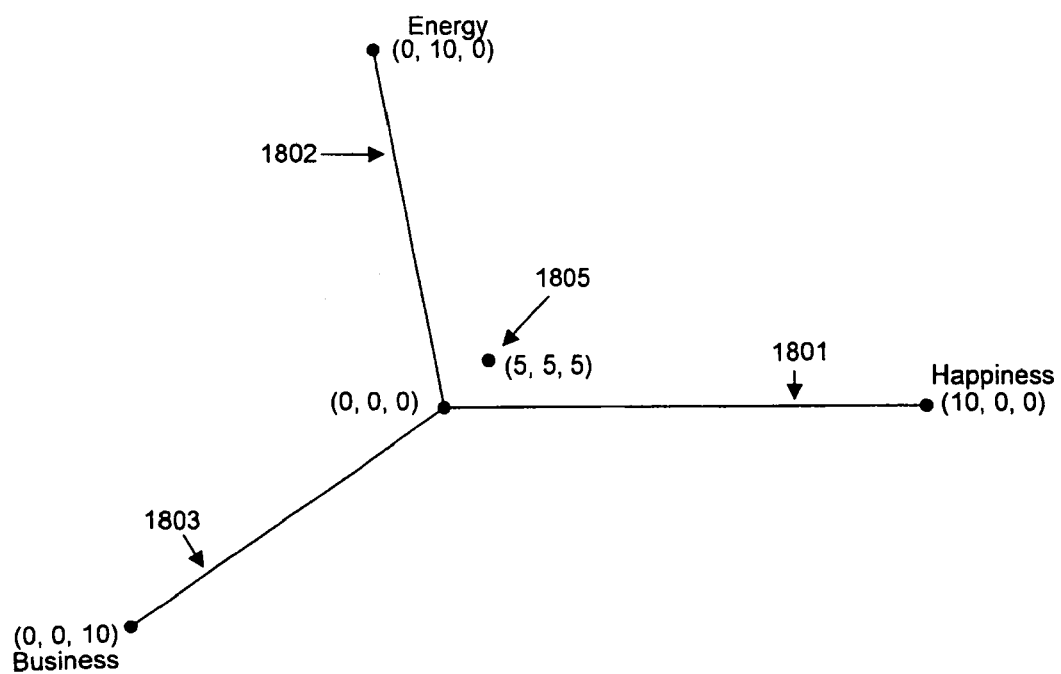
FIG. 18 is a visual representation of mood values in a three dimensional space.

FIG. 18 is a visual representation of mood values in a three dimensional space 1800. More particularly, FIG. 18 shows a three dimensional space (i.e., a mood space) 1800 with three axes 1801-1803, such that each axis corresponds to a particular aspect of a mood. The happiness dimension 1801 ranges from 0 to 10 and is associated with the happiness of a co-user, with 0 being the least happy value, and 10 being the most happy value. The energy dimension 1802 ranges from 0 to 10 and is associated with the energy exhibited by a co-user, with 0 being the least energetic, and 10 being the most energetic. The "busyness" dimension 1803 ranges from 0 to 10 and is associated with an amount of work that a co-user is doing, with 0 being idle, and 10 being extremely busy. An exemplary mood value is illustrated by point 1805, having a value of (5, 5, 5). Point 1805 represents a co-user mood having medium values for all three mood aspects.

In another implementation, a mood space may have dimensions that are different from the exemplary mood space shown in FIG. 18. For example, other mood dimensions may include physical wellness, excitement, or hunger. Furthermore, the range of values for dimensions may differ from the example of FIG. 18. For example, the happiness dimension may range from −10 to +10, with −10 being the least happy value (e.g., miserable), 0 being neutral (e.g., content), and +10 being the most happy value (e.g., ecstatic). In yet another implementation, the mood value associated with a co-user may be represented as string of text describing the mood as calculated by a mood engine. In still another implementation, a mood may be represented as a vector of one or more values, where each value in the vector represents a measurement of a particular aspect of a co-user mood.

The mood value of a co-user may be displayed in conjunction with a co-user element. For example, the mood value of (5, 5, 5) may be displayed next to a co-user element for a co-user having this particular mood value. In another example, the mood value (5, 5, 5) may be displayed in a mood panel that appears when a user mouses over, or right-clicks, the co-user element for the co-user having this mood value.

FIG. 19 is an exemplary data structure 1900 for storing the mood values of co-users. Mood information may be stored in a relational database system that logically organizes data into a database table. The database table arranges data associated with co-user mood values in a series of columns 1910-1913 and rows 1920-1926. Each column 1910-1913 represents an attribute of a co-user's mood value and each row 1920-1926 represents a collection of attribute values for a particular co-user's mood value. The attributes are used to associate co-users with moods, to display users organized by mood, as seen in the co-user UIs of FIGS. 16 and 17, and to sort co-users by mood value.

The attribute 1910 includes a co-user ID to identify a co-user. The co-user ID corresponds to a particular co-user in a co-user list. The co-user mood value data structure 1900 also includes a Happy Value 1911, an Energy Value 1912, and a Busy Value 1913. Each value represents one dimension in a mood space, such as the mood space of FIG. 18. The Happy Value corresponds to the Happiness Axis 1801, the Energy Value 1912 corresponds to the Energy Axis 1802, and the Busy Value 1913 corresponds to the Busy Axis 1803.

FIG. 20 is an exemplary data structure 2000 configured to define moods in terms of mood values. The mood-defining values 2000 may be stored in a relational database system that logically organizes data into a database table. The database table arranges data associated with mood defining values in a series of columns 2010-2013 and rows 2020-2031. Each column 2010-2013 represents an attribute of a mood-defining value and each row 2020-2031 represents a collection of attribute values for a particular mood definition. The attributes may be used to define a particular mood, such as happy or angry, by defining a portion of the mood space corresponding to the particular mood.

The attribute 2010 includes a mood type to identify a mood. The mood defining data structure 2000 also includes a Happy Value 2011, an Energy Value 2012, and a Busy Value 2013. Each value represents the value of one dimension of a point in a mood space, such as the mood space of FIG. 18. As described above with respect to FIG. 19, the Happy Value 2011 corresponds to the Happiness Axis 1801, the Energy Value 2012 corresponds to the Energy Axis 1802, and the Busy Value 2013 corresponds to the Busy Axis 1803. FIG. 21 is an exemplary data structure for storing a list of co-users. The list of co-users may be configured by a user, and stored electronically at the user's location. For example, a user of AOL's Instant Messenger service (AIM) may use AIM to exchange informal messages with friends. The co-user list, and associated values 2100, may be stored in a relational database system that logically organizes data into a database table. The database table arranges data associated with co-users in a series of columns 2110-2112. Each column 2110-2112 represents an attribute of a co-user and each row 2120-2126 represents a collection of attribute values for a particular mood definition. The attributes may be used to describe characteristics of co-users displayed in a co-user list, such as GUI 1600 of FIG. 16.

Each value column 2110 stores a screen name attribute for a particular co-user. The screen name of a co-user is a unique identifier for that co-user. As shown, each row of column 2111 stores a full name attribute for a particular co-user. The full name is the actual name of a co-user. Each row of column 2112 stores a group attribute for a particular co-user. The group attribute places each co-user into a particular group of co-users. For example, a visual element representing a group (non-mood attribute element 1710) may be displayed, as described previously with respect to FIG. 17.

Figure 22:
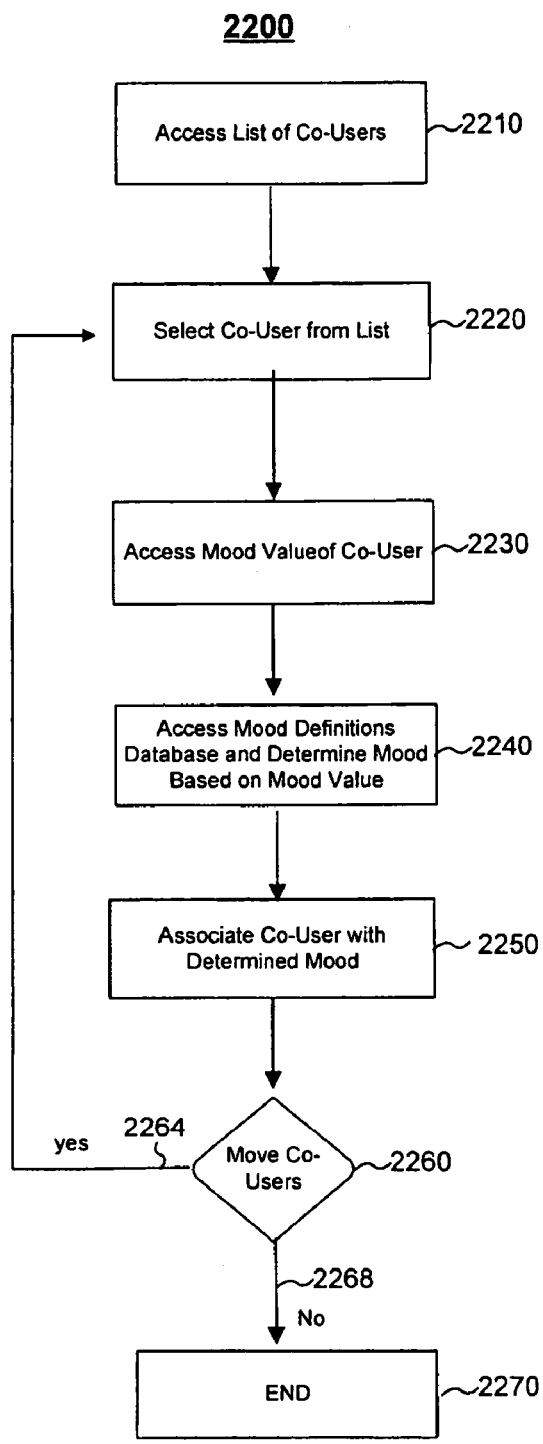
FIG. 22 is a flow chart showing an exemplary process by which a user may be associated with a particular mood.

FIG. 22 is a flow chart 2200 showing an exemplary process by which a co-user may be associated with a particular mood. Generally, the operations shown in flow chart 2200 may be used in conjunction with the systems and configurations described earlier in, for example, FIG. 1. More particularly, the operations shown in flow chart 2200 may be performed on content source 110 of FIG. 1. Similarly, the systems used in flow chart 2200 may use the GUIs described with respect to, for example, FIGS. 16, 17, 23, 25-28. For convenience, particular components and messaging formats described earlier are referenced as performing the process. However, similar methodologies may be applied in other implementations where different components are used to define the structure of the system, or where the functionality is distributed differently among the components shown.

Initially, content source 110 accesses a list of co-users (2210). The list of co-users may be electronically stored at a user location where a user at the user location has preconfigured a list of co-users. For example, as was described with respect to FIG. 21, a list of co-users may be stored in a database at a user location.

Content source 110 then selects a first co-user from the list of co-users (2220). For example, the host may access the first row 2120 of the co-user list 2100, as described with respect to FIG. 21, to select a first co-user.

Content source 110 then accesses the mood value of the first co-user (2230). For example, content source 110 may access the values in the row of co-user mood value database 1900 where the screen name is the same as the screen name of the first co-user selected in 2220. In another implementation, the mood value for a particular co-user may be stored at other locations, such as at the co-user's location or a server controlling network communication between the first co-user and other co-users.

Content source 110 then accesses mood definitions to determine the first co-user's mood (2240). The first co-user's mood is determined based on the mood value accessed in operation 2230 from a relational database, for example, the relational database of FIG. 20. As shown in FIG. 20, the mood definition database 2000 associates moods with a particular mood value. However, a single mood may be associated with more than one mood value. Content source 110 determines the first co-user's mood by retrieving the first co-user's mood value, as accessed in operation 2230, and determining the corresponding mood from the mood definition database 2000.

Next, content source 110 associates the first co-user, as selected in operation 2220, with the mood determined in operation 2240 (2250). To associate a co-user with a mood from the mood definition database, content source 110 may access the mood values in each row of the mood definition database and calculate the vector distance from the co-user's mood value to the reference mood values accessed from the database. When vectors are used, multiple mood calculations are independently made. The mood definition having a reference mood value that has the smallest distance from the mood value of a co-user may be designated as the mood of that co-user.

Content source 110 next determines whether there are more co-users for whom moods should be determined (2260). If so (2264), the host proceeds by analyzing the mood of a second co-user (2220). If the host determines that there are no more co-users whose moods need to be determined (2268), then the association operations described with respect to process 2200 end (2270).

Once a mood has been associated with one or more co-users, a co-user list, such as GUIs 1600 and 1700 of FIGS. 16 and 17, may be configured to organize co-users by mood, for example. In addition to presenting mood information via the organization of the co-user list, a co-user element included in a co-user list may be displayed in a way that enables to the mood of each co-user in the co-user list to be perceived by the user.

Figure 23:
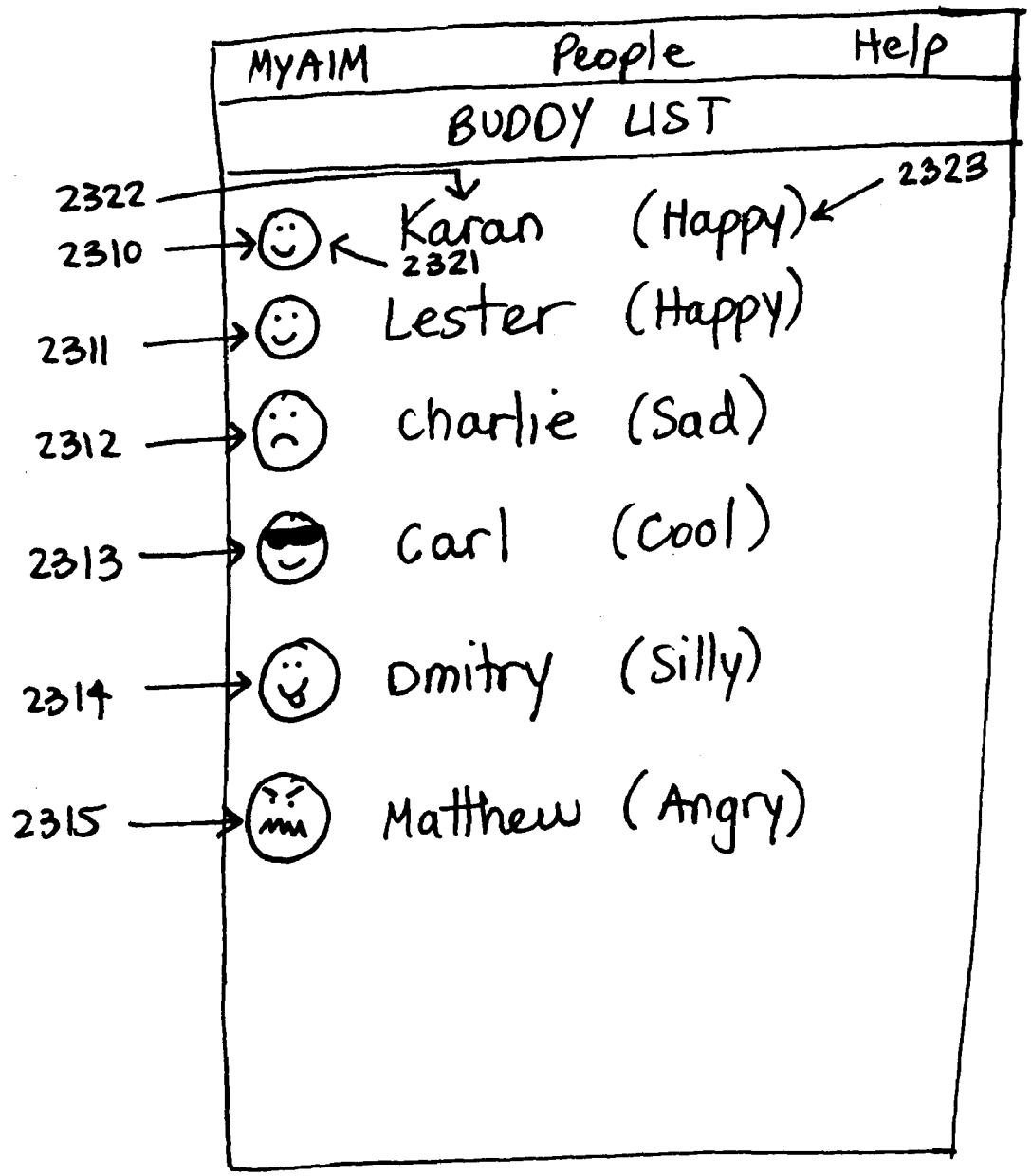
FIG. 23 is an exemplary graphical user interface (GUI) featuring co-user elements in a way representative of a mood.

FIG. 23 is an exemplary graphical user interface (GUI) 2300 featuring co-user elements in a manner that is representative of a mood. GUI 2300 includes a list of co-user elements 2310-2315. Each co-user element is rendered according to the corresponding mood of the co-user. For example, co-user element 2310 represents the co-user with the screen name Karan. The co-user element includes an icon 2321, a screen name 2322, and a mood descriptor 2323.

FIG. 24 is an exemplary data structure 2400 of a configuration indicating how a mood may be expressed within a co-user element. Data structure 2400 includes visualization data associated with different moods. The visualization data is arranged within data structure 2400 in a series of columns 2410-2415 and rows 2420-2424. Each column 2410-2415 represents an attribute of a co-user element GUI, and each row 2420-2424 represents a collection of co-user element GUI values for a particular mood.

Column 2410 includes a list of mood names that identify various moods. The mood name may be used to provide mood information for a co-user using, for example, the mood classifications process described earlier (e.g., process 2200 of FIG. 22).

The visualization data in data structure 2400 also includes column 2411 for icons associated with each mood name; column 2412 for a font name associated with each mood name; column 2413 for a font size associated with each mood name; column 2414 for a font color associated with each mood name; and column 2415 for a sound associated with each mood name. An icon may include an image that is representative of the mood described by the mood name in column 2410. An example of an icon may include a cartoon face with a smile 2410a to indicate a happy mood. The font name 2412 indicates the font to be used for displaying the text portion of the co-user element. The font size 2413 indicates the size of font to be used for displaying the text portion of the co-user element. The font color 2414 indicates the color of the text included in the co-user element. The sound 2415 indicates a sound that may be played when a user interacts with a co-user element through the co-user list. Such an interaction may include mousing-over, clicking upon, or double-clicking upon the co-user element.

Figure 25:
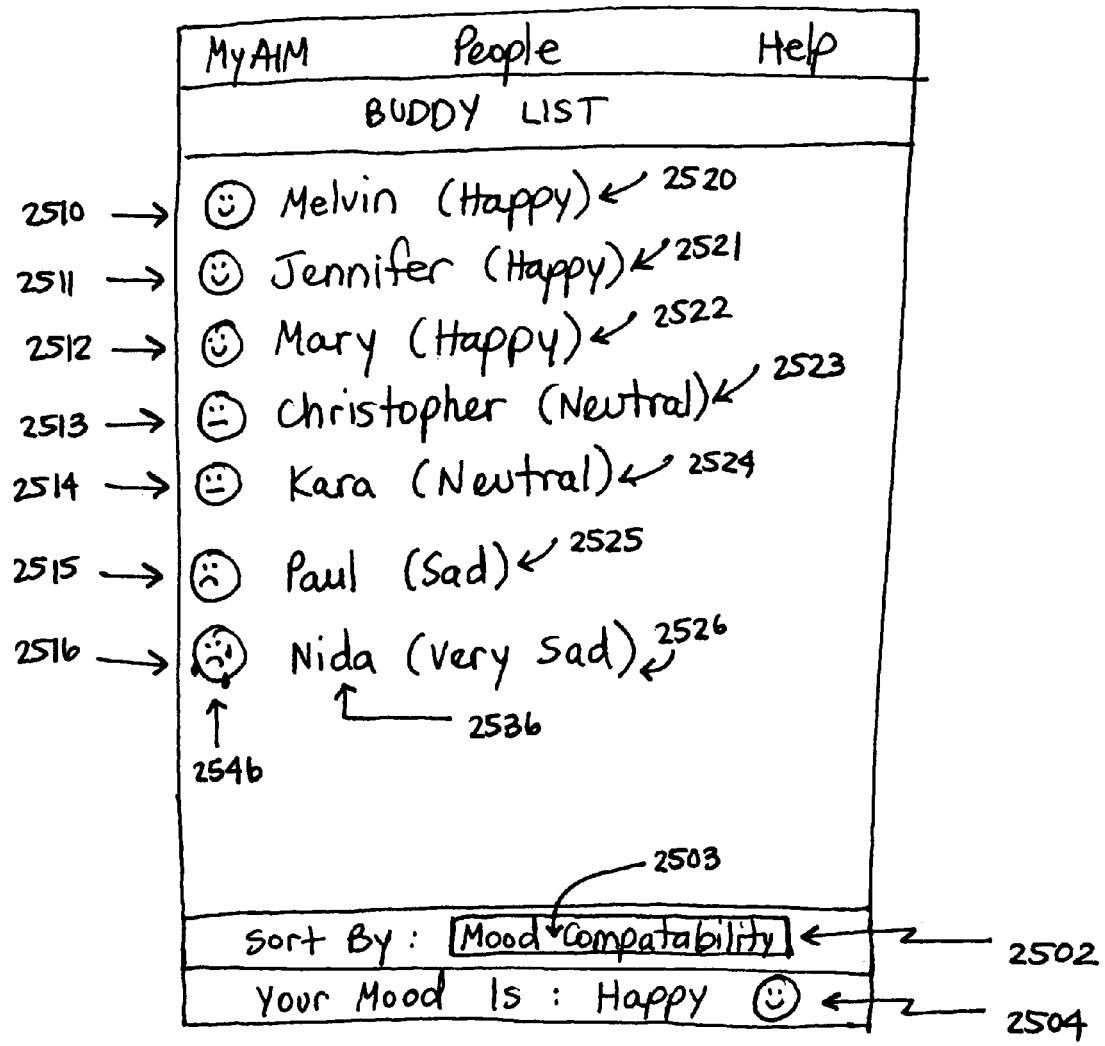
FIG. 25 is an exemplary graphical user interface (GUI) with co-user elements sorted in relation to a mood-based value.

FIG. 25 is an exemplary graphical user interface (GUI) 2500 with co-user elements sorted based on a mood-based value. As shown in GUI 2500, co-user elements are sorted alphabetically by the mood associated with each co-user element. GUI 2500 includes co-user elements 2510-2516. Each of co-user elements 2510-2516 includes an icon, for example, a sad, crying face 2546, a co-user screen name, for example, "Nida" 2536, and a co-user descriptor, for example, "Very Sad" 2526. Mood descriptors 2520-2526 represent a mood-based value, for example, a mood indicator.

The first three co-user elements 2510-2512 displayed represent co-users Melvin, Jennifer and Mary respectively. Melvin, Jennifer and Mary are in a happy mood, represented by co-user descriptors 2520-2522. In one implementation, co-user elements may be sorted based on the distance between a co-user's mood value and a reference mood value. Where mood values are represented as multidimensional vectors, as in the co-user mood value database 1900 of FIG. 19, the difference between the mood value of a co-user and a reference mood value may be the distance calculated between the two values using a standard vector distance calculation. The co-user elements may be sorted from greatest to least distance, or from least to greatest distance. Where a mood value is represented as a vector (e.g., as shown in FIG. 18), Melvin may have a mood value that is more similar to the reference mood value associated with a happy mood than either of Jennifer's or Mary's mood value. Hence, a co-user element associated with Melvin may be placed at a special position in the co-user list to indicate that Melvin is more happy than either of Jennifer or Mary. In another implementation, the mood value may be represented as a string associated with the mood, in which case the order in which co-user elements 2510-2512 are displayed is not indicative of a relative distance between the mood values of Melvin, Jennifer and Mary, and the reference mood value.

GUI 2500 includes a menu 2502 for selecting the sort order of the co-user elements.

The menu selection 2503 is set to sort the moods by "Mood Compatibility." In one implementation, sorting by mood compatibility includes sorting where the mood value is the mood value of the co-user. GUI 2500 includes a co-user mood value display element 2504, which indicates that the co-user is in a happy mood.

In yet another implementation, co-user elements may be sorted by a value that indicates the difference between the mood value of the co-user, and a reference mood value. For example, several co-users may be determined to be in a happy mood because the mood value associated with each co-user is closest in value to a reference value for a happy mood. However, although each of the several co-users have a mood value that is close to the reference value for a happy mood, each of the several co-users may not necessarily have the same mood value. In this case, some co-users may be happier than others in that the mood value associated with some co-users may be mathematically closer to the reference mood value for a happy mood value. Hence, the co-user elements related to the several co-users having a happy mood may be sorted to not only indicate the happy mood, but also to indicate the relative happiness of each co-user based on the distance of each co-user's associated mood value from the happy mood reference mood value.

Figure 26:
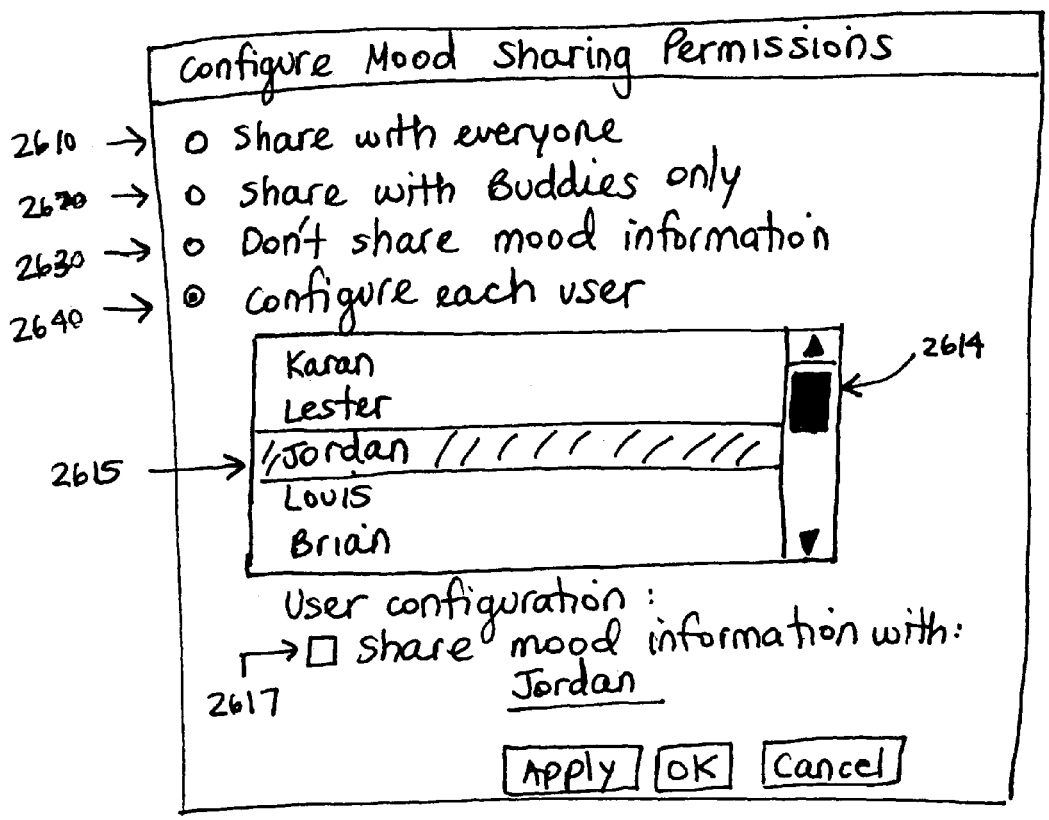
FIG. 26 is an exemplary graphical user interface (GUI) enabling a user to configure how mood information may be shared.

FIG. 26 is an exemplary graphical user interface (GUI) 2600 enabling a user to configure how mood information related to the user may be shared with the co-users in the user's co-user list. Radio buttons 2610-2613 enable a user to select one of four possible modes to share access to mood information. As shown, only one radio button may be selected at a time (e.g., selecting one radio button will un-select any previously selected radio button). Due to privacy concerns, a user may not wish to enable access to the user's mood information by co-users. For example, a user may selectively enable access to the user's mood information by some co-users, but not others, for example, by selecting radio buttons 2620 or 2640. In addition, a user may wish to limit the type of mood information shared with co-users, for example, on a per co-user or group basis, by selecting, for example, radio button 2640.

If the first radio button 2610 is selected, a user's mood value may be accessed by all co-users on the same network. If the second radio button 2611 is selected, a user's mood value may be accessed by "buddies only," in other words, only by co-users that were selected as "buddies" by the user. If the third radio button 2612 is selected, a user's mood value may not be shared with any other network co-users.

Additionally, although not shown in FIG. 26, a user may restrict access to the user's mood value based on a class of co-users. A class may be defined as a group of co-users based on age, demographics, profile information, including likes and dislikes, membership of an organization, subscription to an online service provider, or the like. Furthermore, a user may restrict access to the user's mood value based on a group into which the co-users fall. For example, a user may wish to display the user's mood value to the co-users located in a family group in the co-user list, but not co-users organized into a co-workers group.

The fourth radio button 2613 enables a user to grant permission to view mood information on a per co-user basis. When the fourth radio button 2613 is selected, the list view 2614 is activated. A user may select one or more co-users from the list view. The list view 2614 shows that co-user Jordan is selected 2615. The checkbox 2617 displayed below the list view 2614 enables a user to specify if the selected co-user is able to access the mood information belonging to the user, and is empty if the selected co-user does not have permission to access the mood information. The user may change the accessibility of mood information by the co-user by clicking on the checkbox 2617 insert, or remove, a checkmark.

In one implementation, a user may specify a range of mood values that the user elects to make accessible to a particular co-user, or group of co-users, or block with respect to such a particular co-user or group of co-users. For example, a user may not wish to share moods, such as happy, sad, or angry, with work colleagues because the user has deemed such moods as inappropriate for the work place. At the same time, a user may be willing to share with co-workers a mood which describes the "busyness" level of the user.

In one implementation, a user may be presented with a set of predefined moods from which the user may specify a subset of moods that may be shared. The specified subset of "presentable" moods may be referred to as the projectable mood of the user. Because the projectable moods are user specific, the projectable moods may vary between users.

In other implementations, a user may elect to completely block all co-users from viewing the user's mood. In this configuration, no mood element (e.g., an icon, a text style, etc. as described previously) may be displayed along with the co-user element of a -user who has so elected. In one configuration, when a user searches for co-users having a particular mood or moods, a co-user element, for whom mood information is not available, may not be retrieved as a result of such a search when a blocking configuration is in effect. Alternatively, the co-user element may be retrieved as a result of a search for co-users having a particular mood or moods without any indication of "blocking" a co-user's actual mood. The difference in whether a result is returned may be a default determination or may optionally be designated by the user who has elected to block all mood information.

In addition to seeking co-users within a user's co-user list having a particular mood or moods, a user may search for co-users in the co-user network that are not in the user's co-user list having a particular mood or moods. The user may then add the newly found co-users to the user's co-user list. The search for new co-users to add to the user's co-user list may be based at least in part on mood information. For example, a user may wish to communicate with a co-user in a happy mood, but none of the co-users that are in the user's co-user list and online are currently in a happy mood. Therefore, the user may search for new co-users having a happy mood with whom the user may engage in a single communication session or add to the user's co-user list. In another example, a user may search for new co-users to add to the user's co-user list that are presently in a happy mood or previously identified as being in a happy mood.

Figure 27:
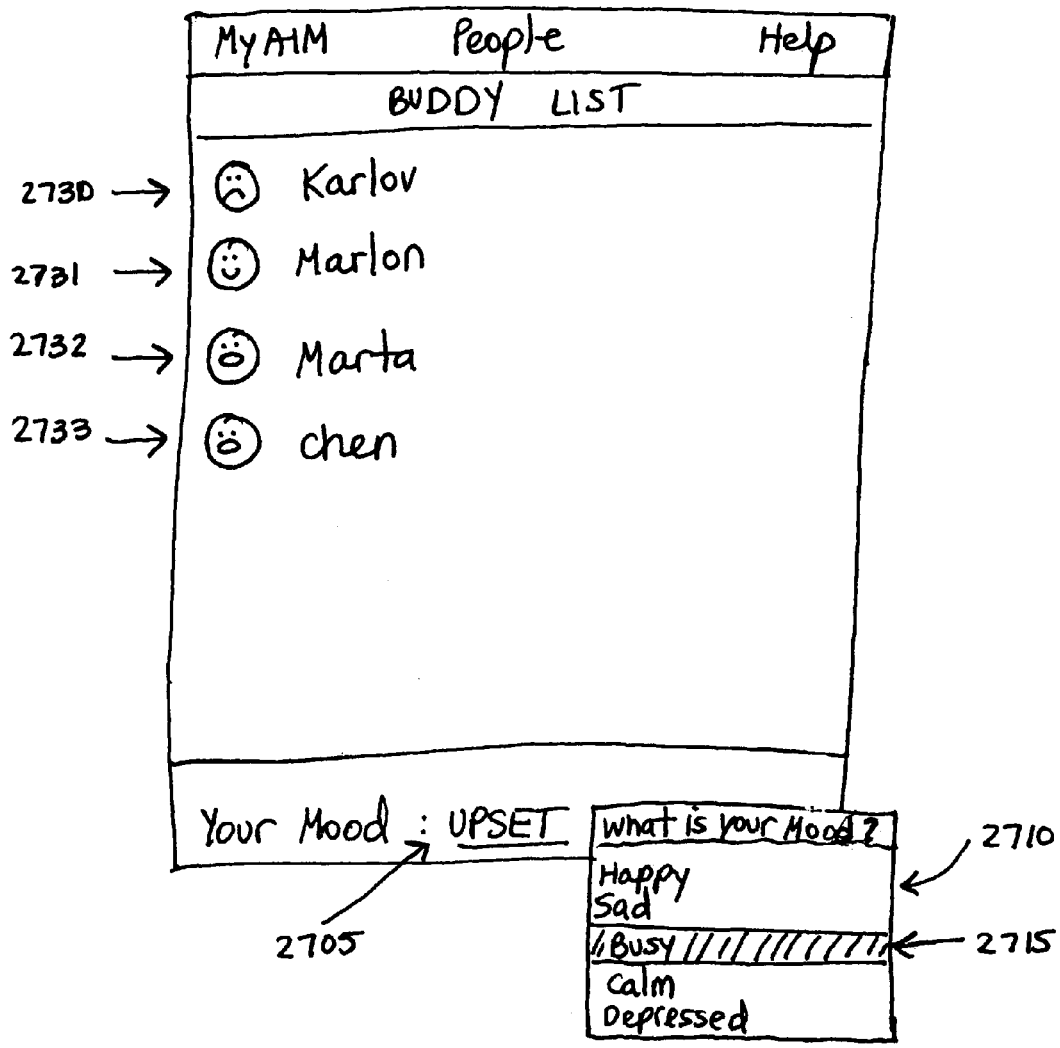
FIG. 27 is an exemplary graphical user interface (GUI) configured to enable a user to provide feedback as to the accuracy of a calculated mood value.

FIG. 27 is an exemplary graphical user interface (GUI) 2700 configured to enable a user to perceive a mood determined for the user (via a calculated mood value) by the system and to provide feedback as to the accuracy of the calculated mood value, thereby correcting or even training the mood determination system. GUI 2700 includes co-user elements 2730-33. GUI 2700 also includes a co-user mood indicator 2705, which indicates that a mood engine has determined that the user is in an "upset" mood 2706. A pop-up menu 2710 may be visible in response to a right click by the user on the co-user mood indicator 2705. The user may specify an actual mood in the pop-up menu 2710 that is different from the mood indicated by the co-user mood indicator 2705. By specifying an actual mood that is different from the determined mood, the user may provide negative feedback. For example, the "busy" mood 2715 may be selected. Alternatively, if a user does not specify an actual mood that is different from the determined mood, the user is implicitly providing positive feedback indicating that the system has correctly identified the user's mood. Enabling a user to specify an actual mood (e.g., provide negative feedback), or inferring a correct mood when the user fails to specify an actual mood (e.g., provide positive feedback) may be used to train the mood recognition engine and improve its accuracy in detecting a user's mood.

Figure 28:
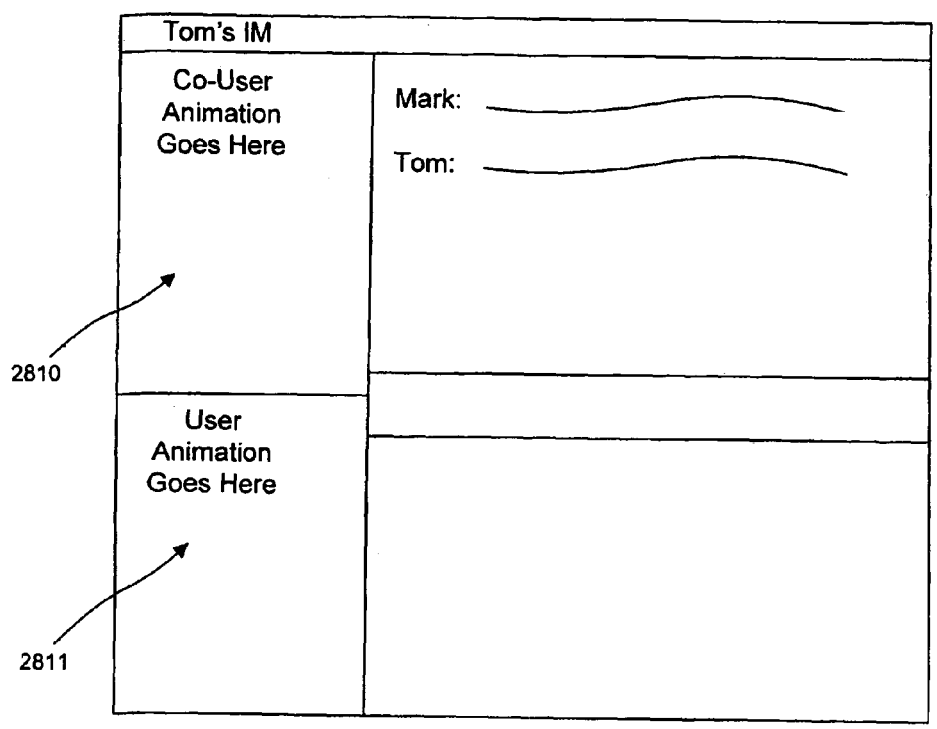
FIG. 28 is an exemplary graphical user interface (GUI) configured to enable a user to specify animations that may be presented with one or more moods for a user.

FIG. 28 is an exemplary graphical user interface (GUI) 2800 configured to enable a user to specify animations that may be presented with one or more moods for a co-user. Animation may be used to represent a co-user's mood. The animation may be associated with a particular co-user. For example, while a stationary smiley face is typically presented in the absence of consideration of mood, a "bouncing smiley face" may be presented when a co-user is happy. Such an animation may only be provided to co-users in the user's friends group if the user has determined, and specifies, that the "bouncing smiley face" animation is not appropriate for co-users in the user's co-workers group. The animation may appear in a co-user list, in a separate GUI element corresponding to a particular co-user, or in an instant messaging conversation window. For example, GUI 2800 includes a co-user animation 2810 and a co-user animation 2811, both of which are displayed in an instant messaging conversation window. The co-user animation 2810 is animated in a way that reflects the mood of a user participating in the conversation and co-user animation 2811 reflects the mood of the co-user, with whom the user is communicating.

The mood-based animation associated with a particular co-user may include an animated character that performs actions based on the mood of the co-user. In another example, an animation may include multiple characters that are each associated with a particular co-user. The multiple characters may interact with one another based upon the mood of the co-users that the characters represent and/or upon attributes of the communication between the co-users.

Although this description has focused on providing mood elements for co-users to indicate a mood of co-users within a co-user list, the use of mood-identifying elements need not be so limited. Mood elements also may be employed in other contexts in order to display a mood for a user. For example, mood elements may be displayed alongside a user element (such as a screen name) in an email message. In another example, a mood element may be provided alongside a user element in an instant messaging window or a chat room window. In yet another example, mood elements may be displayed in association with a user element when the user element indicates that a particular user has visited a webpage, reviewed an article, or purchased an item. In these examples, a mood element for a user may be displayed in association with a user element, but without an indication of an online status of the user.

In some implementations, a mood element for a co-user may be displayed in a co-user list even if an online status of the co-user is unavailable. For example, a co-user may set a privacy setting that prevents users from viewing whether the co-user is online or offline. A co-user list may be configured to display the co-user element for the co-user with an indication that the online status of the co-user is unknown. However, a current mood, or a previous mood, may still be displayed as a mood element associated with the co-user element.

In some implementations, a mood may be associated with a co-user and provided to a user indirectly, rather than being provided as a mood element displayed with a co-user element. For example, a user may wish to send an e-mail message to co-users listed in an address book associated with the user who are in a particular mood, such as a happy mood. The e-mail message may include an e-mail message generated by the user or an e-mail message, such as an electronic party invitation, generated by a third party web site or service that has access to the user's address book for contacts. In this configuration, a user may communicate with a co-user based on a mood associated with the co-user without being provided with, and viewing, the co-user's mood. Other examples include sending a short message service (SMS) text message to a co-user via a cell phone or PDA, based on a mood associated with the co-user. For example, a user may select a short message service (SMS) message "recipient" as "all contacts who are happy." Again, the user may communicate with a co-user based on a mood of the co-user without having the co-user's mood displayed to the user.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components. As another example, a co-user element is used throughout to represent a unique identifier of an account, but any other unique identifier of an account may be used when linking accounts. Accordingly, other implementations are within the scope of the following claims.

What is claimed is:

1. A tangible computer-readable storage medium encoded with a computer program instructions that when executed by a processor generates a graphical user interface for displaying information about more than one co-user, the graphical user interface comprising:
   one or more co-user elements, each co-user element including an identity element structured and arranged to enable a user to perceive a co-user identity and an online status of the co-user identity;
   one or more mood elements structured and arranged to enable a user to perceive a mood associated with the co-user identity; and
   a user feedback element structured and arranged to receive user feedback regarding accuracy of a mood determined and associated with the co-user identity.

2. The tangible computer-readable storage medium of claim 1 wherein the identity element is at least one of a screen name associated with the co-user identity or a name associated with the co-user identity.

3. The tangible computer-readable storage medium of claim 1 wherein the one or more mood elements include a visual indicator related to the mood associated with the co-user identity.

4. The tangible computer-readable storage medium of claim 3 wherein the visual indicator related to the mood associated with the co-user identity comprises an animation related to the mood associated with the co-user identity, wherein the animation is animated in response to at least one of a current mood associated with the co-user identity or a change in mood associated with the co-user identity.

5. The tangible computer-readable storage medium of claim 3 wherein the visual indicator comprises an icon displayed adjacent to a corresponding co-user element, where the icon visually reflects the mood associated with the co-user identity indicated by the co-user element.

6. The tangible computer-readable storage medium of claim 3 wherein the visual indicator comprises an indicator of a mood category, where a co-user element of at least one co-user identity associated with the mood of the mood category is displayed beneath the visual indicator.

7. The tangible computer-readable storage medium of claim 1 wherein the one or more mood elements includes a textual description of a mood associated with the co-user identity.

8. The tangible computer-readable storage medium of claim 1 wherein the one or more mood elements are associated with the co-user element including an identity element, whereby the identity element is formatted with text having a style, including at least one of font, color, and/or size, related to the mood associated with the co-user identity.

9. The tangible computer-readable storage medium of claim 1 wherein the mood associated with the co-user identity is based on a mood value that is represented as a multi-dimensional rating, whereby each rating is associated with a particular aspect of the mood associated with the mood value.

10. The tangible computer-readable storage medium of claim 9 wherein the graphical user interface is configured such that the co-user elements are visually arranged based on a difference between the mood value associated with the co-user identity and a reference mood value.

11. The tangible computer-readable storage medium of claim 1 wherein the user feedback element is configured to reflect positive and negative user feedback, wherein the negative user feedback reflected by the user feedback element is used to correct the mood determined and associated with the co-user identity and the positive and negative feedback reflected by the user feedback element is used to improve the accuracy of the mood determining element.

12. The tangible computer-readable storage medium of claim 1 wherein the graphical user interface includes a privacy control structured and arranged to allow a co-user to selectively block the display of the one or more mood elements from being perceived in the graphical user interface.

13. The tangible computer-readable storage medium of claim 1 wherein the graphical user interface comprises a contact list for facilitating instant messaging communications.

14. The tangible computer-readable storage medium of claim 1 wherein the mood associated with a co-user identity includes at least one of happy, sad, tired, worried, angry, mad, busy, nervous, anxious, content, depressed, lonely, sick, annoyed, frustrated, ecstatic, amused, silly, and lazy.

15. A method for searching among a group of co-users each having an associated mood for co-users having a particular mood, the method comprising:
   accessing a mood value for at least one co-user, wherein the mood value is determined using metadata associated with content currently accessed by the at least one co-user;
   accessing reference mood values and corresponding moods;
   comparing the mood value for the co-user to the reference mood values;
   based on a result of the comparison between the mood value for the co-user and the reference mood values, associating a mood with the co-user;
   receiving a search query that includes at least some query parameter that is based on mood information;
   applying the search query to the mood associated with one or more of the co-users;
   determining which, if any, co-users have an associated mood that satisfies the search query; and
   returning an indication of a co-user identity for co-users who have an associated mood that satisfies the search query.

16. The method of claim 15 wherein associating the mood includes, for at least one of several moods, determining whether the mood value for the co-user is within a range of mood values associated with a mood with which reference values have been accessed, and, if so, adding the mood to a list of moods associated with a co-user.

17. A method, performed at least partially on a computer, for displaying information about more than one co-user, the method comprising:
   rendering one or more co-user elements, each co-user element including an identity element structured and arranged to enable a user to perceive a co-user identity and an online status of the co-user identity;
   rendering one or more mood elements structured and arranged to enable a user to perceive a mood associated with the co-user identity, wherein a mood value associated with the co-user identity is represented as a multi-dimensional rating, whereby each rating is associated with a particular aspect of the mood associated with the mood value;
   using mood values associated with more than one co-user identity as a basis to arrange the one or more co-user elements; and
   arranging more than one co-user elements based on their corresponding mood values to hierarchically present the co-user elements, such that the user may perceive a difference in mood, as represented by the mood value, among more than one co-users associated with a same mood.

18. The method of claim 17 wherein the mood associated with the co-user identity is determined by:
   calculating a mood value associated with the co-user identity;
   comparing the mood value to a list of moods; and
   determining the mood associated with the co-user identity based on the calculated mood value.

19. The method of claim 17 further comprising using the ratings associated with the particular aspects of the mood as a basis to arrange the co-user elements.

20. An apparatus for displaying information about more than one co-user, the apparatus comprising:
   means for rendering one or more co-user elements, each co-user element including an identity element structured and arranged to enable a user to perceive a co-user identity and an online status of the co-user identity;
   means for rendering one or more mood elements structured and arranged to enable a user to perceive a mood associated with the co-user identity; and
   means for rendering a user feedback element structured and arranged to receive user feedback regarding accuracy of the mood determined and associated with the co-user identity.

* * * * *